United States Patent [19]
Sasaki et al.

[11] Patent Number: 6,038,674
[45] Date of Patent: Mar. 14, 2000

[54] MULTIPROCESSOR, MEMORY ACCESSING METHOD FOR MULTIPROCESSOR, TRANSMITTER AND RECEIVER IN DATA TRANSFER SYSTEM, DATA TRANSFER SYSTEM, AND BUS CONTROL METHOD FOR DATA TRANSFER SYSTEM

[75] Inventors: Takatsugu Sasaki; Akira Kabemoto; Hirohide Sugahara; Junji Nishioka; Satoshi Shinohara, all of Kawasaki; Yozo Nakayama, Kahoku-gun; Jun Sakurai, Sendai; Naohiro Shibata, Kawasaki; Toshiyuki Muta, Kawasaki; Takayuki Shimamura, Kawasaki, all of Japan

[73] Assignees: Fujitsu Limited, Kawasaki; PFU Limited, Kahoku-gun, both of Japan

[21] Appl. No.: 09/352,343

[22] Filed: Jul. 13, 1999

Related U.S. Application Data

[62] Division of application No. 08/824,871, Mar. 26, 1997.

[30] Foreign Application Priority Data

Aug. 8, 1996 [JP] Japan .................................. 8-210318

[51] Int. Cl.[7] .................................................. G06F 12/00
[52] U.S. Cl. .............................. 713/500; 710/58; 710/45
[58] Field of Search ................................ 710/58, 45, 25; 711/141; 713/500

[56] References Cited

U.S. PATENT DOCUMENTS

| | | | |
|---|---|---|---|
| 5,361,267 | 11/1994 | Godiwala et al. ................ | 371/40.1 |
| 5,381,544 | 1/1995 | Okazawa et al. ................. | 395/575 |
| 5,524,212 | 6/1996 | Somani et al. ................... | 395/200.08 |
| 5,752,264 | 5/1998 | Blake et al. ..................... | 711/144 |
| 5,784,697 | 7/1998 | Funk et al. ...................... | 711/170 |
| 5,813,030 | 9/1998 | Tubba .............................. | 711/118 |
| 5,884,055 | 3/1999 | Tung ............................... | 710/127 |
| 5,890,217 | 3/1999 | Kabemoto ........................ | 711/141 |
| 5,918,069 | 6/1999 | Matoba ............................ | 710/21 |

FOREIGN PATENT DOCUMENTS

| | | |
|---|---|---|
| 54-542 | 1/1979 | Japan . |
| 58-4468 | 1/1983 | Japan . |
| 62-100855 | 5/1987 | Japan . |
| 64-28736 | 1/1989 | Japan . |
| 4-137054 | 5/1992 | Japan . |

*Primary Examiner*—Eric Coleman
*Attorney, Agent, or Firm*—Armstrong, Westerman, Hattori, McLeland & Naughton

[57] ABSTRACT

A multiprocessor in which a plurality of processors are connected via a system bus. The multiprocessor includes processor groups each having at least one processor, a main storage memory, a cache memory, a cache control unit, a directory memory, and a directory control unit. The directory control unit includes an invalidation command issuing unit that issues a cache line invalidation command to all reference designations stored in the directory memory in cache lines. Thus the device process time can be shortened by reducing the frequency that cache invalidation commands are issued from the cache memory.

4 Claims, 30 Drawing Sheets

F I G. 26
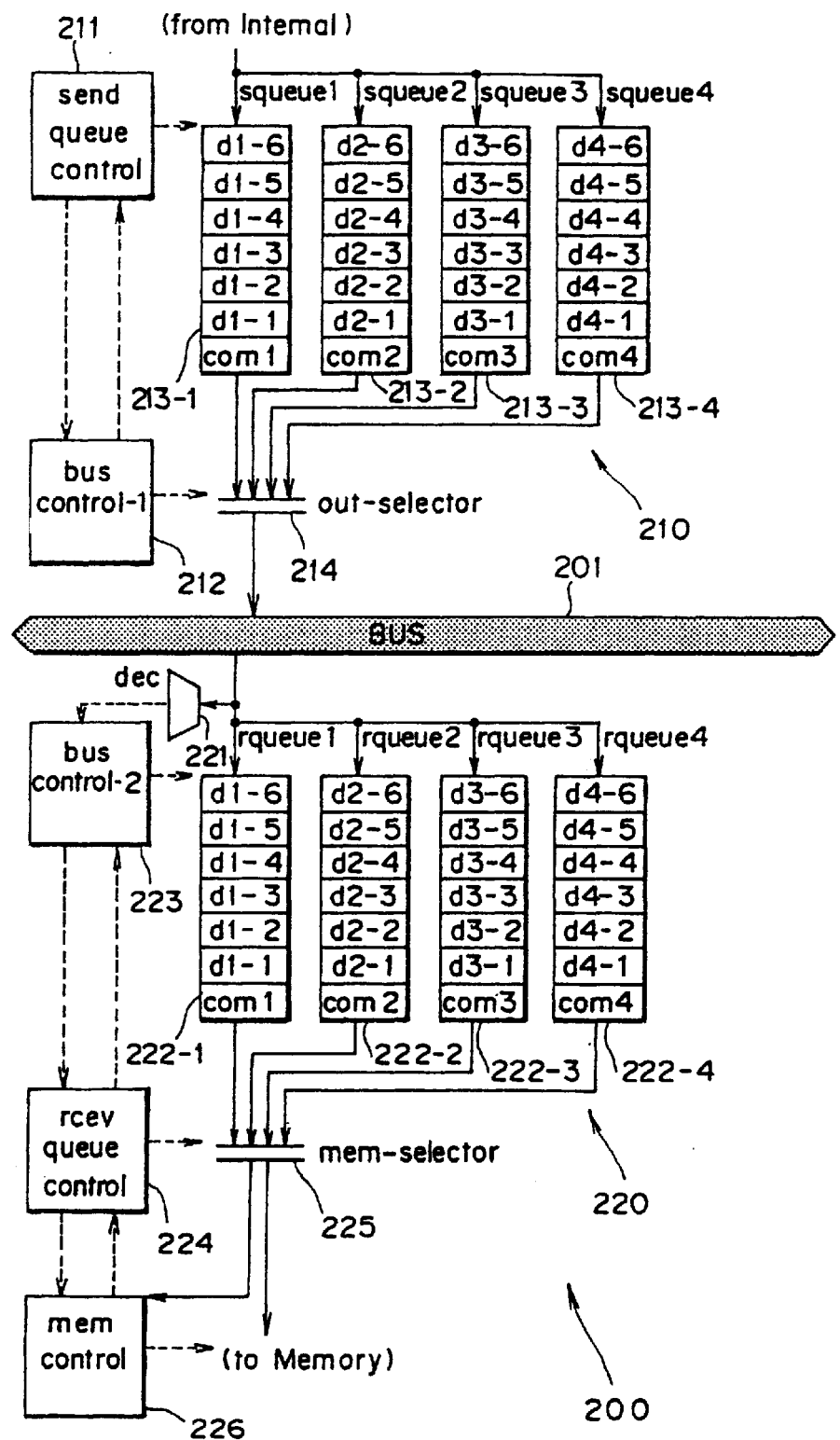

MULTIPROCESSOR, MEMORY ACCESSING METHOD FOR MULTIPROCESSOR, TRANSMITTER AND RECEIVER IN DATA TRANSFER SYSTEM, DATA TRANSFER SYSTEM, AND BUS CONTROL METHOD FOR DATA TRANSFER SYSTEM

This is a division of application Ser. No. 08/824,871, filed Mar. 26, 1997.

BACKGROUND OF THE INVENTION

1) Field of the Invention

The present invention relates to a multiprocessor connected to a plurality of processors via a system bus. Particularly, the invention relates to a multiprocessor and a method of accessing the same, each applied to a distributed and shared memory system embodying the directory mode.

Furthermore, the present invention relates to a data transfer system that exchanges data via a bus, a transmitter and receiver in the data transfer system, and a bus control method for the data transfer system.

2) Description of the Related Art

FIG. 20 is a block diagram illustrating a multiprocessor. In the multiprocessor 100 shown in FIG. 20, a plurality of processor modules 101-1 to 101-n (n is an integer of 2 or more) are mutually connected via a system bus 102.

For instance, as shown in FIG. 21, each of the processor modules 101-1 to 101-n includes at least one processor element 103, a memory module 104 and a system bus interface module 105.

The respective processor elements 103 are connected to the memory module 104 via a cache snoop bus 106. The memory module 104 is connected to the system bus interface module 105 via the internal bus 107.

Each of the processor elements 103 consists of a processor 103a, a cache memory 103b and a cache control module 103c.

The processor 103a performs a desired information process by gaining a read/write access to data with the cache memory 103b or the memory module 104. The cache memory 103b is arranged corresponding to the processor 103a to execute a high-speed read/write access between the processor 103a and the memory module 104.

The processor 103a includes a timer 108 that counts an elapsed time (response wait time) till a response signal is received after an access signal is transmitted to the memory module 104. When receiving no response signal even after an elapsed time counted by the timer 108 has exceeded a predetermined time-out time, the processor 103a outputs a time-out signal.

The cache memory 103b stores data in cache lines of, e.g. 256 bytes. The cache line is formed of four sublines (64 bytes).

The cache control module 103c controls data read/write operation between the processor 103a and the cache memory 103b in the copy back mode.

Further, the memory module 104 is shared by respective processor modules 101 via the cache snoop bus 106. The memory module 104 consists of a main storage memory that stores various kinds of data, a directory memory 104b and an access control module 104c.

The directory memory 104b stores the registration status of the main storage data into the cache memory 103 arranged in each of processor elements 101-1 to 101-n within the multiprocessor 100.

The access control module 104c stores controllably the registration status of the main storage data to the cache memory 103 into the directory memory 104b, based on a value in the cache memory 103b and a value in the main storage element 104a.

For example, under control of the access control module 104c, the main storage status of the cache memory 103b is stored into the directory memory 104b in cache lines formed of four sublines when the value in the cache memory 103b and the value in the main storage element 104a are in the same shared state. Further, the value in the main storage element 104a is not updated when the processor 103a rewrites the value in the cache memory 103b. The status of the cache memory 103b and the latest value holding destination are stored into the directory memory 104 in sublines in the case of the dirty state where the value in the cache memory 103b is the latest value and the value in the main storage element 104a is an old value.

Further, in the case of one writing access or cache-off access, the access control module 104c issues cache invalidation commands for the sublines forming the cache line in the corresponding cache memory 103b.

The system bus interface module 105 interfaces the memory module 104 with the system bus 102.

FIG. 24 is a block diagram illustrating the function of the above-mentioned multiprocessor 100. Each of the processor modules 101-1 to 101-n multiprocessor 100 shown in FIG. 24 includes a processor (CPU) 103a, a cache unit (CS) 103A, a directory unit (DIR) 104A, a main storage element (MS) acting as a main storage memory and a system bus interface module 105 acting as a system bus control mechanism (in FIG. 24, a plurality of processor elements 103, a cache snoop bus 106 and an internal bus 107 are not illustrated).

The cache unit 103A consists of the cache memory 103b and the cache control module 103c, shown in FIG. 21. The directory unit 104A consists of the directory memory 104b and the access control module 104c, shown in FIG. 21.

In the memory module 104 with such an arrangement in the multiprocessor 100 shown in FIGS. 20 and 21, the following cache invalidating (purging) process is executed when the cache line is in a shared state in one write access or cache-off access operation.

That is, when the subline which includes the access address to the main storage module 104 and which is needed to invalidate the cache memory 103b corresponds to the subline with the serial number 0, the access control module 104c refers to the directory memory 104b for the directory entry including the subline with the serial number 0.

In that case, when the corresponding cache line is in a shared state, the access control module 104c issues a cache invalidation command as an invalidation command to the cache memories 103b corresponding to all reference destinations stored in the directory memory 104b, together with the access address.

That is, as shown in FIG. 22, for example, of four sublines (with serial numbers 0 to 3) forming the cache line in the cache memory 103b to be refereed, the subline with serial number 0 receives the cache invalidation command CI (see the time t1 to t2). In other words, the cache invalidation command CI transmitted from the access control module 104c is issued only to the subline with serial number 0 on the cache snoop bus 106 to be referred.

In this case, since the shared state management on the directory memory 104b, that is, the storage of the destination where a value stored in the main storage memory 104a is referred to is carried out in cache lines, the shared state of the directory memory cannot be deleted according to only the success or failure of one cache invalidation to one subline. In consequence, the cache status notification command ASK is issued to the remaining sublines (with serial Nos. 1 to 3) forming the cache line (refer to the time t2 to t5).

The cache memory 103b that receives the cache invalidation command CI and the cache status notification command ASK responds to the access control module 104c with the success or failure of invalidation after constant cycles (refer to the time t5 and t6) and then provides the current cache status as the cache status notification CST in response to the cache status notification command ASK (refer to the time t6 to t9).

In the access control unit 104c, until all the shared states on the directory memory 104b are deleted based on the cache status notification command CST, cache invalidation commands are sequentially issued to the sublines forming the cache line by starting from the subline with serial No. 0.

Thereafter, with the cache invalidation established and all the sublines in no shared states forming the cache line, the access module 104c deletes the content of the cache memory 103b of a reference destination stored in the directory memory 104b.

Furthermore, for example, when the read access performed from the processor 103a to the cache memory 103b results in a cache mishit, the memory error process shown with the flowchart in FIG. 23 is performed.

First, when the read access from the processor 103a results in a cache mishit, the cache control module 103c issues a main storage memory read access to the memory module 104 via the cache snoop bus 106 (step A1).

In the access control module 104c within the memory module 104, the directory of a cache line including the access address is referred to from the directory memory 104b (step A2).

If the status of the cache memory 103b is in a dirty state, the reading operation of the main storage element 104a starts after the cache coherent process (steps A3 and A4) while the status of the directory memory 104a is updated (step A5). Then transferring data to be read onto the cache snoop bus 106 starts (step A6).

If the cache memory 103b is in a shared or invalid state (where the cache line is not in a dirty state or in a shared state), reading the main storage element 104a starts while the status of the directory memory 104b is updated (steps A3 and A5). Then transferring data to be read onto the cache snoop bus 106 is set in motion (step A6).

When transferring data to be read onto the cache snoop bus 106 starts, the cache control module 103c starts registering the readout data to the cache memory 103b (step A7).

If any multibit error is not detected in the readout data, the reading process is normally ended (from step A8 to step A9 via NO route).

However, if a multibit error is detected in the readout data, the access control module 104c in the memory module 104 halts transferring the readout data onto the cache snoop bus 106 (from step A8 to step A10 via YES route) and then sends back a failure occurrence response to the cache control module 103c (step A12).

Furthermore, in the cache control module 103c, the registration operation to the cache memory 103b is invalidated in response to the cancellation of transferring the readout data onto the cache snoop bus 106 (step A11) while an access error response is sent back to the processor 103a in response to the failure occurrence response from the access control module 104c (step A13).

Thereafter, the access control module 104c rewrites the status of the directory entry in the directory memory 104b into that in the initial state before accessing (step A14).

Further, the memory access from the processor 103a to the main storage memory 104a in the memory module 104 is made according to the command sequence, for example, shown in FIG. 25. FIG. 25 shows the case where memory access is made from the processor 103a in the processor module 101-1 to the main storage element 104a in the processor module 101-2. This situation is applicable to memory access operations between other processor modules or in a processor module.

For the sake of convenience in the following explanation, the processor module PM 101-1 as an access source to the main storage element 104a is called a local PM; the processor module 101-2 existing in the main storage element 104a to be accessed is called a home PM; and the processor module 101-n cashing the main storage element 104a is called a remote PM.

Here the local PM 101-1 tries to have non-cache-store access to a memory address "A". However, the entity of the memory address "A" exists in the home PM 101-2 while it is in a reference state in the cache memory 103b in the remote PM 101-n.

In that case, first, the local PM 101-1 issues non-cache memory-store command M-ST to the directory unit 104A in the home PM 101-2 (refer to (1) in FIG. 25) while the timer 108 starts counting the elapsed time.

Successively, in the directory unit 104A within the home PM 101-2 which has received the M-ST command, the access control module 104c retrieves the directory memory 104b.

In this case, since the memory address "A" is cached by means of the remote PM 101-n, the access control module 104c in the directory unit 104 issues the cache invalidation command (cache purge command) to the cache unit 103A in the remote PM 101-n (refer to (2) in FIG. 25).

Thereafter, after the cache unit 103A in the remote PM 101-n which has received the cache purge command C-PG executes a cache purging process, it issues a cache purge completion response command PG-CMP to the home PM 101-2 being a C-PG command issuing source (refer to (3) in FIG. 25).

The home PM 101-2 which has received the PG-CMP command writes data designated by the M-ST command from the local PM 101-1 to the memory address "A" of the main storage element 104a.

After the access control module 104c in the home PM 101-2 changes the content of the directory memory 104b from the reference state to the non-cache state in the remote PM 101-n, it issues the memory store completion response command ST-CMP to the local PM 101-1 being a M-ST command issuing source (refer to (4) in FIG. 25).

If not receiving the response signal even when the elapsed time counted by the timer 108 exceeds the time-out time, the processor 103a in the local PM 101-1 notifies of an access time-out.

The predetermined time-out time T counted by the timer 108 is set based on the time taken in the command sequence.

In concrete, it is assumed that the maximum period of time between the time the processor 103a in the local PM 101-1 issues the M-ST command and the time it receives the ST-CMP is T1 and that the maximum period of time between the time the processor 103a issues the C-PG command and the time it receives the PG-CMP command is T2. In such a case, the unique time T satisfying the condition expressed by the following formula (1) is set as a time-out time.

$$T1 > T1 + T2 \tag{1}$$

FIG. 26 is a block diagram illustrating a data transfer system embodying a split bus which can be used as the system bus 102, the cache snoop bus 106 or the internal bus 107 in the above-mentioned multiprocessor 100. In the data transfer system 200 shown in FIG. 26, the transmitter 210 is connected to the receiver 220 via the split bus 201.

Here, the split bus 201 permits a plurality of concurrent processes by transferring the bus use right to another processor until the transmitter 210 receives a response after sending a request to the receiver 220, thus intending its high bus-use efficiency.

Further, the transmitter 210 consists of a CPU such as the processor 103a in the multiprocessor 100 described before and an input/output device (I/O device). The transmitter 210 includes a send queue control unit (send queue control) 211, a bus control unit (bus control-1) 212, an output selector (out selector) 214, and four send command/data queues (squeuel to squeue4) 213-1 to 213-4 each formed of flip-flops (FF) and random access memories (RAMs).

In response to a data transfer request generated from the internal of the transmitter 210, the send queue control unit 211 controllably stores the corresponding commands and data to free send command/data queue among the send queue command/data queues 213-1 to 213-4 and requires the bus use right to the bus control 212.

Further, the bus control unit 212 produces a bus-use-right capture request to the bus to an arbitrating device (not shown) that controls the use status of the split bus 201, based on the bus use request from the send queue control unit 211.

The bus control 212 outputs a select signal to the output selector 215 when the bus use right is captured and then outputs a select signal which selects any one of command/data packets (bus commands with data) stored in four command/data queues 213-1 to 213-4.

The output selector 214 selects any one of the command/data packets stored in four command/data queues 213-1 to 213-4 by means of a predetermined algorithm and then sequentially sends out the command and data forming the selected packet to the split bus 201.

A data transfer request which includes a memory write command to the receiver 220 acting, for example, as a main memory can be handled as a data packet with a command from the transmitter 210 acting as the CPU. The command which forms a data packet with a command such as the memory write command is formed of a format, for example, as shown in FIG. 27.

That is, the memory write command 300 shown in FIG. 27 is formed of a command field (Command) 301, a command ID field (Command-ID) 302, a transmitter address field (Source-Address) 303, a remote device address field (Destination-Address) 304, a size field (Size) 305, and a memory address field (Mem-Address) 306.

The command field 301 designates the operation code of a command. The command ID field 302 designates the identification number to identify a multicommand. In the transmitter 210 shown in FIG. 24, the level of multiplexing is "4".

Further, the transmitter address field 303 designates a transmitter address. The remote device address field 304 designates a remote device address. The size field 305 designates the data size of a data transfer command. The memory address field 306 designates the memory address in memory access.

The receiver 220 is formed of, for example, a memory device such as the memory module 104 in the multiprocessor 100. The receiver 220 includes a command decoder (dec) 221, a receive queue (rqueues 1 to 4) 222-1 to 222-4, a bus control unit (bus control-2) 223, a receive queue control unit (rcev queue control) 224, a memory selector (mem-selector) 225, and a memory control (mem control) 226.

The command decoder 221 checks a command packet received via the split bus 201 for the remote device address field in the remote device address field 304 and for free queues in the receive queues 222-1 to 222-4.

In concrete, when judging that the received command packet is a command for the system including the decoder 221 itself and that any one of the receive queues 222-1 to 222-4 is free, the command decoder 221 notifies the bus control unit 223 of the event. If the command packet is not a command for the system including the decoder 221 itself, the command decoder 221 ignores the event. If the receive queues 222-1 to 222-4 are occupied, the command decoder 221 notifies the transmitter 210 of the event.

In response to the notification from the command decoder 221, the bus control unit 223 stores controllably the command and the successive data received in a free queue among the receive queues 222-1 to 222-4. When the command and the successive data have been completely stored into the free queue, the bus control unit 223 asks the receive queue control unit 224 to subject the command stored in the free queue to a memory access control.

In response to a request for memory access control from the bus control unit 223, the receive queue control unit 224 produces a select signal which selects to the memory selector 225 any one of memory access commands stored in the receive queues 222-1 to 222-4.

When receiving the select signal from the receive queue control unit 224, the memory selector 225 selects any one of memory access commands stored in the receive queues 222-1 to 222-4, thus outputting it to the memory control unit 226. In addition, the memory selector 225 outputs the successive data to a memory such as the main storage element 104a shown in FIG. 21. The memory selector 225 is formed of, for example, FIFO (First In First Out) memory.

In such an arrangement, the data transfer system 200 shown in FIG. 26 transmits a command packet with data including a memory write bus command from the transmitter to the receiver 220 via the split bus 201.

When the command packet with data is transmitted from the transmitter 210, data packets are transferred by one operation, in succession to packets in which bus command information including the transfer operation code and the transfer data size are defined.

In concrete, when a data transfer request occurs from the inside of the transmitter 210, the send queue control unit 211 searches the four send command/data queues 213-1 to 213-4 for free send queue/data queues and stores the command and data into the corresponding queue.

At the time the use of bus is prepared by storing the command and data into the free send command/data queue, the send queue control unit 211 hands the request to the bus control unit 212. The bus control unit 212 selects a specific bus request among the four bus requests stored in the send command/data queues 213-1 to 213-4 according to a predetermined algorithm and then outputs the request, req, to the bus arbitrating device (not shown) to obtain the use right of the split bus 201 (refer to the time u1 to u3 in FIG. 28).

When obtaining the use right of the split bus 201 in response to the bus use permission signal, grt, from the bus use right arbitrating device (refer to the time u2 and u3 in FIG. 28), the bus control unit 212 transmits sequentially the command/data packet selected by the send data control unit 212 to the split bus 201 via the output selector 214 (refer to the time u3 to u10 in FIG. 28).

In response to the leading command packet forming a command/data packet from the split bus 201 (refer to the time u3 and u4 in FIG. 28), the receiver 220 checks the command decoder 221 for the device address and the like.

When the command decoder 221 judges that the received command packet is the command for the system including the command decoder 221 itself and that any one of the receive queues 222-1 to 222-4 is free, it informs the bus control unit 223 of the event, thus storing the received command and the successive data into the free receive queue (refer to the time u4 to u11 in FIG. 28).

The receive queue for no system including the corresponding command decoder 221 itself is ignored. When the receive queues 222-1 to 222-4 are not free, the command decoder informs the transmitter 210 being the transmitting source of the event.

On completion of the bus receiving operation, the bus control unit 223 asks the receive queue control unit 224 for the memory access control of commands stored in the receive queues 222-1 to 222-4.

The receive queue control unit 224 outputs a select signal to the memory selector 225 and then selects the memory access commands stored in the four receive queues 222-1 to 222-4 via the memory selector 225 according to a predetermined algorithm, thus indicating the memory control unit 226 to gain actual memory access.

As for the data transfer system 200 shown in FIG. 26, there has been a tendency to improve the data transfer rate by shortening the bus operational clock cycle and by adopting a wide bus band of 64 or 128 bits.

In order to improve the data transfer rate in the data transfer system, it is necessary that the bus use efficiency is increased in the split bus. For this purpose, it is effective to include bus commands and receive buffers as many as possible.

However, when write access or cache-off access is sequentially executed to one cache line, a plurality of sublines forming the cache line may be shared by another processor. In such a case, the multiprocessor 100 shown in FIGS. 20 and 21 issues cache invalidation commands for the sublines forming the cache line to perform the capture of write right or the cache-off by the completion of the process to the cache line.

That is, as shown in FIG. 22, when the access control module 104c gains one write access or cache-off access, it is needed to issue the cache invalidation commands stored in the corresponding cache memory 103b (shown in FIG. 22) by the number of the sublines forming the cache line.

There is the problem that the bus use right capture and the invalidating command process are needed every access because the invalidation command of the cache memory 103b uses a plurality of buses forming the memory system are needed, so that the process time prolongs.

In addition, as to the multiprocessor shown in FIGS. 20 and 21, since the memory space of the main storage element 104a is shared by the plurality of processors 103a, another processor may access the address space of the main storage element 104a even if a hard error of the main storage element 104a has detected through access of a processor.

In that case, the problem is that the process shown in FIG. 23 must be performed for each access to the main storage element 104a and that the process cycle in which an error response is sent back to the access issuing source processor is undesirably prolonged.

Particularly, there is the problem that since the inevitable access to the main storage element 104a with a relatively-long response cycle occurs an access conflict in the memory module 104, the access performance to a normal main storage element 104a is deteriorated.

Further, when the cache coherence between the main storage element 104a and the cache memory 103b must be held after an error occurrence, it is needed to regain the original state by canceling the status write of the directory memory 104b and the registration of readout data to the cache memory 103b at the error occurrence time. Hence, there is the problem that the process becomes complicated and that a new storage element is needed to hold the initial state until the access completion time.

Further, in the multiprocessor shown in FIGS. 20 and 21, since the local PM 101-1 gains a memory access to the home PM 101-2 as shown in FIG. 25, the timer 108 in the local PM 101-1 as the access source counts a single response wait period of time. Hence, there is the problem that when a plurality of command errors occur simultaneously during one memory access wait time, as shown in FIG. 29, it is difficult to accurately specify the failure occurrence spots.

Particularly, it is essential to specify accurately the failure occurrence spot because the high-reliability system such as a fault tolerant system require a reliable recovery even at a failure occurrence time.

That is, as shown in FIG. 29, the local PM 101-1 issues non cache memory store command M-ST for the memory address "A" to the home PM 101-2 (refer to (1) in FIG. 29) while the timer 108 starts counting the access timer value (time-out time) T (refer to the time v1 in FIG. 30).

The access control module 104c in the home PM 101-2 which has received the M-ST command from the local PM 101-1 retrieves the directory memory 104b, and recognizes the memory address "A" cached by means of the remote PM 101-n, and issues the cache purge command C-PG to the remote PM 101-n (refer to (3) in FIG. 29).

As for the processor 103a within the home PM 101-2, as soon as the timer 108 transmits the cache purge command C-PG, the access timer T2 starts counting the timer counting operation (refer to the time v3 in FIG. 30). At the same time, the directory memory 104b in the home PM 101-2 becomes a busy state in lines including the memory address "A".

Further, the remote PM 101-n which receives the C-PG command from the home PM 101-2 starts gaining a write access to the memory address "A" cached, preceding the transmission of the cache purge command C-PG. The remote PM 101-n also issues the cache update notification command M-EX to the access control module 104c by which the directory memory 104b in the home PM 101-2 is updated (refer to (2) in FIG. 29).

In the processor 103a arranged in the remote PM101-n, the timer 108 transmits the M-EX command while the access timer T starts the timer counting operation (refer to the time v2 in FIG. 30).

The remote PM101-n transmits the M-EX command and then receives the C-PG command from the home PM101-2. However, since the remote PM 101-n is executing the same line caching operation, the purge process is pending within the remote PM 101-n.

It is now assumed that the home PM101-2 which has receives the M-EX command retrieves the directory memory 104b and then tries to inform that the line related to the memory address "A" is in a busy state, but some factor disturbs sending the response to the remote PM 101-n being an access source (Disappear; refer to (4) in FIG. 29).

In that case, since the purge process is held in the remote PM 101-n, the remote PM101-2 cannot respond to the M-ST command.

That is, because the response to the M-EX command disappears, this status continues until the response wait time which is counted by the timer 108 in the remote PM 101-n (the time T elapsed from transmission of the M-EX command) becomes time-out.

As expressed by the formula (1) T>T2, the access timer value T2 corresponding to a response wait time to the C-PG command counted by the timer 108 in the home PM 101-2, becomes time-out prior to the M-EX response wait timer time T in the remote PM 101-n (refer to the time v4 in FIG. 30).

By acknowledging the time-out detection to the M-ST command from the local PM 101-1 being the C-PG command generating source, the home PM 101-2 which has detected the time-out performs completely the M-ST command process (refer to time v5 in FIG. 30).

When detecting the time-out of the M-EX command (refer to the time v6 in FIG. 30), the remote PM 101-n informs the processor 103a being an access source therein of the event.

It can be specified that the time-out of the M-EX command detected in the remote PM 101-n has caused by some factor lying between the remote PM 101-n and the home PM 101-2. However, the cause of the time-out of the C-PG command detected in the home PM 101-2 cannot be specified.

That is, although no troubles exist between the home PM 101-2 and the remote PM 101-n, the time-out of the C-PG command has occurred due to no response to the preceding M-EX command. However, the home PM 101-2 cannot specify that event as the cause.

As described above, in the data transfer system 200 shown in FIG. 26, it is needed to improve the bus use efficiency of the split bus to increase the data transfer rate. For the countermeasures, it is effective to prepare the receive buffers for bus commands and data as many as possible.

However, in the data transfer system 200, it is difficult to sufficiently increase the capacity of the receive-queue acting as a receive buffer to improve the bus use efficiency. As a result, there is the problem that a sufficient number of receive buffers cannot be prepared and that the advantage of the split bus cannot be utilized sufficiently.

SUMMARY OF THE INVENTION

The present invention is made to overcome the above mentioned problems. An object of the present invention is to provide a multiprocessor that can shorten its process time by reducing the frequency of an invalidation command issued when cache invalidation commands are issued from a cache memory.

Another object of the present invention is to provide memory accessing method for a multiprocessor that can shorten its process time by reducing the frequency of an invalidation command issued when cache invalidation commands are issued from a cache memory.

Another object of the present invention is to provide a multiprocessor which can prevent its process cycle from being unnecessarily prolonged, when a hard error of the main storage element is detected during an access operation of a processor, by preventing another processor from gaining access to an address space of the main storage element with the hard error detected.

Still another object of the present invention is to provide a memory accessing method for a multiprocessor which can prevent its process cycle from being unnecessarily prolonged, when a hard error of the main storage element is detected during an access operation of a processor, by preventing another processor from gaining access to an address space of the main storage element with the hard error detected.

Further another object of the present invention is to provide a multiprocessor which can accurately specify a failure occurrence spot even when a plurality of command errors concurrently occur during one memory access wait period of time.

Further another object of the present invention is to provide a memory access method for a multiprocessor which can accurately specify a failure occurrence spot even when a plurality of command errors concurrently occur during one memory access wait period of time.

Still further object of the present invention is to provide a transmitter and receiver in a data transfer system that can improve the bus use efficiency by enlarging the capacity of a receive queue acting as a receive buffer.

Still further object of the present invention is to provide a data transfer system that can improve the bus use efficiency by enlarging the capacity of a receive queue acting as a receive buffer.

Still further object of the present invention is to provide a bus control method that can improve the bus use efficiency by enlarging the capacity of a receive queue acting as a receive buffer.

In order to achieve the above objects, according to the present invention, the multiprocessor is characterized by a plurality of processor groups mutually connected via a first bus, each including at least one processor; a main storage memory for storing various kinds of data, the main storage memory being shared by each of processors forming each of the plurality of processor groups connected via a second bus; a cache memory arranged to each of the processors, for storing various kinds of data in the main storage memory in cache lines; a cache control unit for controlling a data read/write operation between each of the processors and the cache memory; a directory memory for storing the registration status of data stored in the main storage memory to the cache memory; and a directory control unit for storing the registration status of the cache memory into the directory memory in cache lines formed with a plurality of sublines when the value stored in the cache memory and the value stored in the main storage memory are the same and for updating no value stored in the main storage memory when the processor rewrites the value stored in the cache memory and for controllably storing the status of the cache memory and a destination holding a latest value into the directory memory in sublines in the case of a dirty status where the value stored in the cache memory is the latest value and the value stored in the main storage memory is an old value; the directory control unit including an invalidation command issuing unit for issuing an invalidation command for a cache line to all reference destinations stored in the directory memory in cache lines when a plurality of processors other than the processor include the cache line in the shared state, the cache line including the access address of either a write access issued to a cache memory storing data not being the latest value or a cache-off access issued to the cache memory.

Further, according to the present invention, the memory accessing method for a multiprocessor, the multiprocessor including a main storage memory, a plurality of processors for sharing the main storage memory, a cache memory for storing various kinds of data stored in the main storage memory in each of the plurality of processors in cache lines and a directory memory for storing the registration status of data stored in the main storage memory to the cache memory, comprising the steps of storing the registration status of the cache memory into the directory memory in cache lines formed with a plurality of sublines when the value stored in the cache memory and the value stored in the main storage memory are the same; updating no value stored in the main storage memory when the processor rewrites the value stored in the cache memory; storing the status of the cache memory and a destination holding a latest value into the directory memory in sublines in the case of a dirty status where the value stored in the cache memory is the latest value and the value stored in the main storage memory is an old value; and issuing an invalidation command for a cache line to all reference destinations stored in the directory memory in cache lines when a plurality of processors other than the processor include the cache line in the shared state, the cache line including the access address of either a write access issued to a cache memory storing data not being the latest value or a cache-off access issued to the cache memory.

According to the present invention, an invalidation command issuing unit can issue an invalidation command for a cache line to all reference destinations stored in the directory memory in cache lines when a plurality of processors other than the processor includes the cache line in the shared state, the cache line including a write access issued to a cache memory storing data not being the latest value, or the access address of a cache-off address issued to the cache memory. Hence, the multiprocessor according to the present invention has the advantage of reducing the number of cache invalidating processes which are occurred when a continuous write access or cache-off access is gained to a plurality of cache lines in a shared state. As a result, the device process time can be reduced while the process performance can be improved. In addition, since the number of buses in the memory system as well as the access conflict count in the cache memory can be reduced, the performance of the whole memory system can be improved.

Moreover, since identification information which is used to switch from invalidation in cache lines to invalidation in sublines is added to said invalidation command issued from said invalidation command issuing unit, the cache invalidation mode can be switched according to the kind of access. Hence there is the advantage in preventing the hit rate of cache memory from being decreased.

Furthermore, according to the present invention, the multiprocessor is characterized by a plurality of processor groups mutually connected via a first bus, each including at least one processor; a main storage memory for storing various kinds of data, the main storage memory being shared by each of processors forming each of the plurality of processor groups connected via a second bus; a cache memory arranged to each of the processors, for storing various kinds of data in the main storage memory in cache lines; a cache control unit for controlling a data read/write operation between each of the processors and the cache memory in a copy-back mode; a directory memory for storing the registration status of data stored in the main storage memory to the cache memory; and a directory control unit for storing the registration status of the cache memory into the directory memory in cache lines formed with a plurality of sublines when the value stored in the cache memory and the value stored in the main storage memory are the same and for updating no value stored in the main storage memory when the processor rewrites the value stored in the cache memory and for controllably storing the status of the cache memory and a destination holding a latest value into the directory memory in sublines in the case of a dirty status where the value stored in the cache memory is the latest value and the value stored in the main storage memory is an old value; the directory control unit including an error-identification-information storage control unit for controllably storing hard error occurrence identification information to a corresponding cache line within the directory memory when the main storage memory detects occurrence of the hard error during a reading process of data stored in the main storage memory; and an access inhibiting unit for inhibiting access to the cache line having the hard error occurrence identification information.

According to the present invention, the memory accessing method for a multiprocessor, the multiprocessor including a main storage memory, a plurality of processors for sharing the main storage memory, a cache memory for storing various kinds of data stored in the main storage memory in each of the plurality of processors in cache lines and a directory memory for storing the registration status of data stored in the main storage memory to the cache memory, comprising the steps of holding hard error occurrence identification information in a directory entry of a cache line including a readout address within the directory memory when a hard error occurs during the readout process from the main storage memory; and inhibiting a main storage access to a cache memory having the identification information.

According to the present invention, the error-identification-information storage control unit controllably stores hard error occurrence identification information to a corresponding cache line within the directory memory when the main storage memory detects occurrence of the hard error during a reading process of data stored in the main storage memory; and the access inhibiting unit inhibits access to the cache line having the hard error occurrence identification information. Hence, there is the advantage in that a degradation in the access performance to a normal main storage memory can be suppressed because access to a failure main storage memory does not occur again.

Furthermore, by recording failure occurrence information on a directory entry in the directory memory at a failure detection time by means of the error-identification-information storage control unit, an error response can be returned prior to reading the main storage memory when a cache line in which an error has occurred during the reading operation of the main storage memory is accessed again. Hence, the process time till the return of an error response can be shortened. In addition, since the updating operation of the status of the directory entry in the directory memory and the registration canceling operation to the cache memory are neglected, the device process is simplified.

Moreover, according to the present invention, the multiprocessor is characterized by a plurality of processor groups mutually connected via a first bus, each including at least one processor; a main storage memory for storing various kinds of data, the main storage memory being shared by each of processors forming each of the plurality of processor groups connected via a second bus; a cache memory arranged to each of the processors, for storing various kinds of data in the main storage memory in cache lines; a cache control unit for controlling a data read/write operation between each of the processors and the cache memory in a copy-back mode; a directory memory for storing the registration status of data stored in the main storage memory to the cache memory; and a directory control unit for storing the registration status of the cache memory into the directory memory in cache lines formed with a plurality of sublines when the value stored in the cache memory and the value stored in the main storage memory are in the same shared state and for updating no value stored in the main storage memory when the processor rewrites the value stored in the cache memory and for controlling to store the status of the cache memory and a destination holding a latest value into the directory memory in sublines in the case of a dirty status where the value stored in the cache memory is the latest value and the value stored in the main storage memory is an old value; the processor including an elapsed time counting unit for counting an elapsed time between the time an access signal is transmitted to the main storage memory and the time a response signal is received, and for outputting a time-out signal when a response signal is not received after the counted elapsed time has exceeded a predetermined time-out time; the directory control unit including a cache-access-issuance information returning unit for returning to a processor as an access source in the event that access to the cache memory has occurred in the main storage memory to be accessed; the processor as an access source including a time-out time resetting unit for resetting the time-out time predetermined in the elapsed time counting unit in response to notification from the cache-access-issuance information returning unit; the elapsed time counting unit recounting an elapsed time based on the time-out time reset in the time-out time resetting unit.

Furthermore, according to the present invention, the memory accessing method for a multiprocessor, the multiprocessor including a main storage memory, a plurality of processors for sharing the main storage memory, a cache memory for storing various kinds of data stored in the main storage memory within each of the plurality of processors in cache lines and a directory memory for storing the registration status of data stored in the main storage memory to the cache memory, is characterized by the steps of counting an elapsed time between the time an access signal is transmitted to the main storage memory and the time a response signal is received, and outputting a time-out signal when a response signal is not received after the counted elapsed time has exceeded a predetermined time, by means of the processor; notifying a processor as an access source of the event that access to the cache memory has occurred in the main storage memory accessed; and changing an elapsed time to output the time-out signal into a response wait timer value having a sufficient time for access to the cache memory when the processor at the access source receives a notification of the event that access to the cache memory has occurred, to perform a recounting operation.

According to the present invention, the cache-access-issuance information returning unit notifies a processor as an access source of the event that access to the cache memory has occurred in the main storage memory accessed. The time-out time resetting unit changes an elapsed time to output the time-out signal by the elapsed time counting unit into a response wait timer value having a sufficient time for access to the cache memory when the processor at the access source receives the event that access to the cache memory has occurred. Thus the elapsed time counting unit can perform a recounting operation. Hence, there is the advantage in that a failure occurrence spot can be certainly specified. Furthermore, the time monitoring operation can be specified with a high failure spot specifying accuracy, regardless of various access interferences in the remote cache memory which may occur when the main storage memory acting as a shared memory device in a distributed shared memory system adopting the directory scheme is accessed. In addition, a reliable recovery operation can be made at a failure occurrence time.

Moreover, since it is unnecessary to maintain the cache coherence to access after the occurrence of a hard error in the main storage memory, the storage element which holds the initial state of the directory is removed, so that the device configuration can be simplified.

Further, according to the present invention, the transmitter in a data transfer system, the data transfer system including a transmitter for transmitting a packet with data, and a receiver connected to the transmitter via a bus for receiving the packet with data transmitted from the transmitter via said bus, the transmitter is characterized by a plurality of transmission-side command queues each for holding a command forming a packet with data to be transmitted; a plurality of transmission-side data queues each arranged corresponding to the transmission-side command queue for holding the data forming a packet with data; a queue control unit for controllably storing commands to each of the transmission-side command queues or data to each of the transmission-side data queues; a transmission-side selector for selectively outputting either commands from the transmission-side command queues or data from the transmission-side data queues to the bus; and a transmission-side selector control unit for outputting a select signal to select a command selected by the transmission-side selector when a command is stored into each of the transmission-side command queues and data corresponding to the command is stored into each of the transmission-side data queues, under control of the queue control unit.

According to the present invention, the receiver in a data transfer system, the data transfer system including a transmitter for transmitting a packet with data, and a receiver connected to the transmitter via a bus for receiving the packet with data transmitted from the transmitter via said bus, the receiver is characterized by a plurality of reception-side command queues each for holding a command received via the bus; a reception-side data queue for holding data received via the bus; a checking unit for checking the command received via the bus and checking the status of each of the reception-side command queues; a receive control unit for controllably storing the received command into a free reception-side command queue, based on the check results of the status of the reception-side command queues from the checking unit; a reception-side selector for selectively outputting either commands from the reception-side command queues or data from the reception-side data queue; a reception-side selector control unit for outputting a select signal to select a command output from the reception-side selector when processing is made according to commands stored in the reception-side command queues; and a data transmission request command transmitting unit for transmitting a data transmission request command to request transmission of data corresponding to a command from the reception-side selector.

Moreover, according to the present invention, the data transfer system is characterized by a transmitter for transmitting a packet with data, and a receiver connected to the transmitter via a bus for receiving the packet with data transmitted from the transmitter via the bus; the transmitter including a plurality of transmission-side command queues each for holding a command forming a packet with data to be transmitted; a plurality of transmission-side data queues respectively arranged corresponding to the transmission-side command queues, each for holding the data forming a packet with data; a queue control unit for controllably storing a command into the transmission-side command queue and data into the transmission-side data queue; a transmission-side selector for selectively outputting either the command from each of the transmission-side command queues or data from each of the transmission-side data queues to the bus; and a transmission-side selector control unit for outputting a select signal to select a command output by the transmission-side selector when a command is stored into each of the transmission-side command queues and data corresponding to the command is stored into each of the transmission-side data queues, under control of the queue control unit; the receiver including a plurality of reception-side command queues each for holding a command received via the bus; a reception-side data queue for holding data received via the bus; a checking unit for checking the command received via the bus and checking the status of the reception-side command queues; a receive control unit for controllably storing the received command into a free reception-side command queue, based on the check results of the status of the reception-side command queues from the checking unit; a reception-side selector for selectively outputting any one of commands from the reception-side command queues; a reception-side selector control unit for outputting a select signal to select a command output from the reception-side selector when processing is made according to commands stored in the reception-side command queues; and a data-transmission-request command transmitting unit for transmitting a data transmission request command to request transmission of data corresponding to a command from the reception-side selector; the transmission-side selector control unit controlling the transmission-side selector to selectively transmit data stored in each of the transmission-side data queues to the receiver based on the command transmitted from the data-transmission-request command transmitting unit.

According to the present invention, the bus controlling method for a data transfer system, the data transfer system including a transmitter for transmitting a packet with data, and a receiver connected to the transmitter via a bus for receiving the packet with data transmitted from the transmitter via the bus, is characterized by the steps of transferring only the packet of which bus command information is defined, to the receiver via the bus when a transmission request of a packet with data occurs in the transmitter; and transferring a desired data packet, without capturing any bus after a constant period of time, when a data request command packet is received from the receiver.

Furthermore, according to the present invention, the bus controlling method for a data transfer system, the data transfer system including a transmitter for transmitting a packet with data, and a receiver connected to the transmitter via a bus for receiving the packet with data transmitted from the transmitter via said bus, is characterized by the steps of storing a process request into a queue in a process wait state when the receiver receives a transmission request command packet for data transfer; transmitting a data request command packet to the transmitter when a processable state comes; receiving a data packet from the transmitter after a constant period of time while the bus capture state is being held; and releasing the bus when the data packet has been received.

Moreover, according to the present invention, the bus controlling method for a data transfer system, the data transfer system including a transmitter for transmitting a packet with data, and a receiver connected to the transmitter via a bus for receiving the packet with data transmitted from the transmitter via the bus, is characterized by the steps of transferring only the packet of which bus command information is defined, to the receiver via the bus when a transmission request of a packet with data occurs in the transmitter; storing the packet into a queue in a process wait state when the receiver receives the packet of which the bus command information is defined, from the transmitter; transmitting a data request command packet to the transmitter when a processable state comes; then transferring a desired data packet, without a bus capturing operation after a constant period of time, when the transmitter receives the data request command packet from the receiver; and then receiving a data packet from the transmitter to be transferred after the constant period of time in the receiver while the bus capturing state is being held; and releasing the bus on completion of the data packet receiving operation.

Hence according to the present invention, since the selector control unit controls the transmission-side selector to be transmitted to the receiver by selecting data stored in each of the transmission-side data queues based on the command transmitted from the data-transmission-request command transmitting unit, the buffer capacity for data reception can be significantly reduced without sacrificing the data transfer performance of the bus. As a result, the hardware cost can be decreased. Particularly, as the level of multiplexing the bus increases or the bus band widens, the buffer reduction contributes to reducing the hardware cost of the whole system.

BRIEF DESCRIPTION OF THE DRAWINGS

FIG. 26 is a block diagram showing a data transfer system;

DESCRIPTION OF THE PREFERRED EMBODIMENTS (a) Explanation of Aspect of the Present Invention Referring to FIG. 1, numeral 12 represents a multiprocessor. The multiprocessor 12 consists of a plurality of processor groups 1-1 to 1-n (n is an integer being 2 or more) which are mutually connected via the first bus 6.

FIG. 1 shows typically only the processor group 1-1 as a detail arrangement of the following processor groups 1-1 to 1-n. The remaining processor groups 1-2 to 1-n are not shown in detail because they are basically the same as the processor group 1-1.

Figure 1:
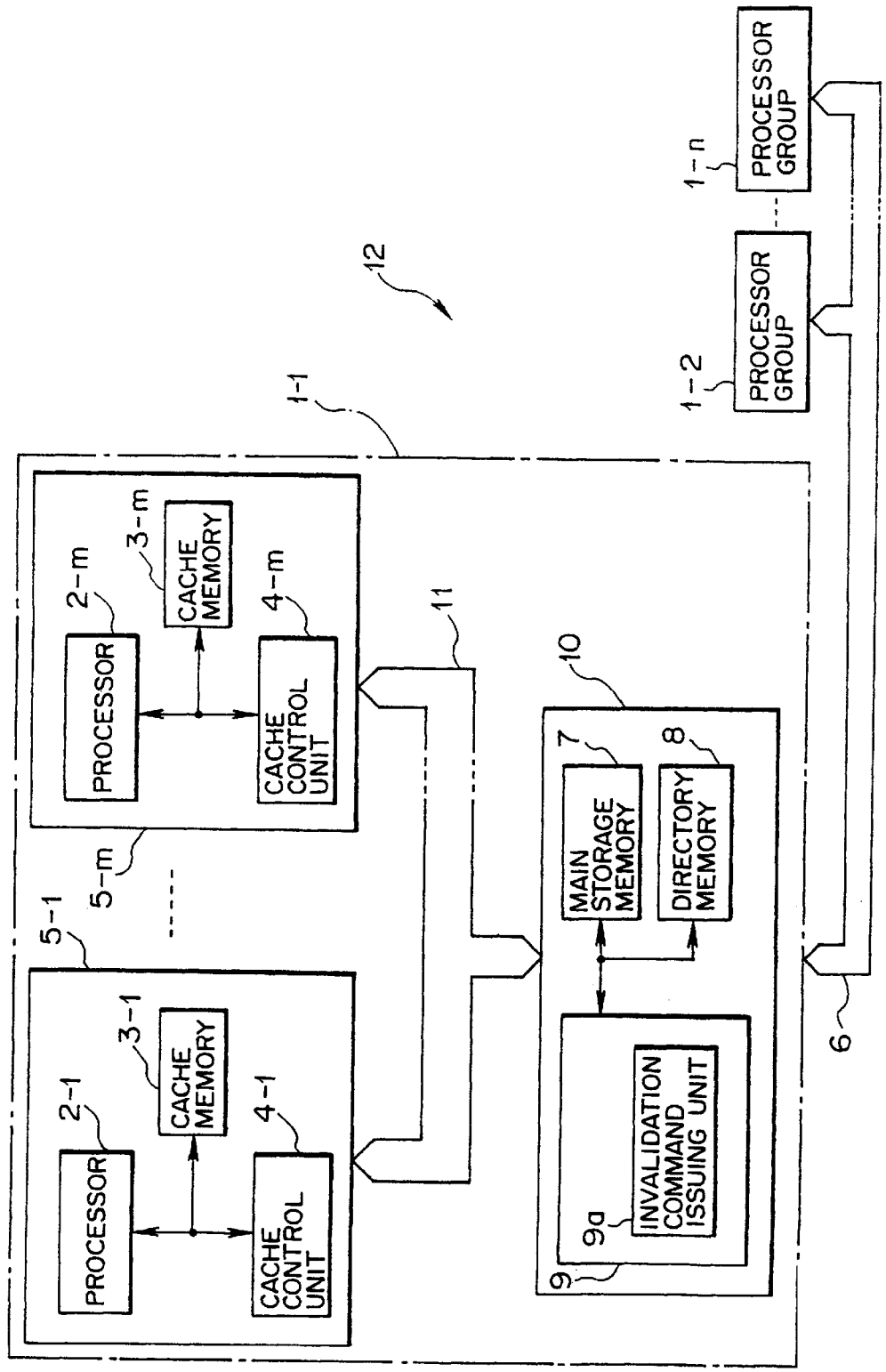
FIG. 1 is a block diagram showing an aspect of the present invention.

Each of the processor groups 1-1 to 1-n includes at least one or more processors 2-1 to 2-m (m is a natural number) and a main storage memory 7.

The main storage memory 7 is shared by each of the processors 2-1 to 2-m (including processors in other processor groups 1-2 to 1-n) forming each of the processor groups connected via the second bus 11 and stores various kinds of data.

Numerals 3-1 to 3-m are cache memories. The cache memories 3-1 to 3-m are arranged to each the processors 2-1 to 2-m to store various kinds of data in the main storage memory 7 in cache lines.

The cache control unit 4-1 controls the data read/write operation between the processor 2-1 and the cache memory 3-1. The cache control unit 4-m controls the data read/write operation between the processor 2-m and the cache memory 3-m.

The processor 5-1 consists of a processor 2-1, a cache memory 3-1 and a cache control unit 4-1. Similarly, the processors 5-2 consists of a processor 2-2, a cache memory 3-1 and a cache control units 4-1. The processor 5-m consists of a processor 2-m, a cache memory 3-m and a cache control unit 4-m.

Numeral 8 represents a directory memory. The directory memory 8 stores the registration status of data stored in the main storage memory 7 into each of the cache memories 3-1 to 3-m (including the cache memory in each of other processor groups 1-2 to 1-n).

Numeral 9 represents a directory control unit. When the value stored in the cache memories 3-1 to 3-m and the value stored in the main storage memory 7 are the same, the directory control unit 9 stores the registration status of the cache memories 3-1 to 3-m into the directory memory 8 in cache lines formed with a plurality of sublines.

The directory control unit 9 updates no value stored in the main storage memory 7 when the processor 2-1 rewrites the values stored in the cache memory 3-1. The directory control unit 9 stores controllably the status of the cache memory 3-1 and a destination holding a latest value into the directory memory 8 in sublines in the case of a dirty status where the value stored in the cache memory 3-1 is the latest value and the value of the main storage memory 7 is an old value. The directory control unit 9 does not update the value in the main storage memory 7 when the processor 2-m rewrites the values of the cache memory 3-m. The directory control unit 9 stores controllably the status of the cache memory 3-m and the latest value holing destination in sublines in dirty state where the value on the cache memory 3-m is the latest value and the value of the main storage memory 7 is an old value.

The memory 10 is formed of the main storage memory 7, the directory 8, and the directory control unit 9.

The directory control unit 9 includes an invalidation command issuing unit 9a that issues an invalidation command for a cache line to all reference destinations stored in the directory memory 8 in cache lines when a plurality of processors include the cache line in the shared state, the cache line including the access address of either a write access issued to the cache memory 8 storing data not being the latest value or a cache-off access to the cache memory 3-i.

Each of the cache control units 4-1 to 4-m can include a failure response returning unit that returns an invalidation failure response at a response time to the invalidation command from the invalidation command issuing unit 9a when a subline not to be accessed is in the dirty state among sublines forming the cache line including an access address in each of cache memories 3-1 to 3-m.

Further, the directory control unit 9 can be formed such that identification information which is used to switch from invalidation in cache lines to invalidation in sublines is added to the invalidation command issued from the invalidation command issuing unit 9a.

In the multiprocessor 12 shown in FIG. 1, when the value stored in the cache memory 3-1 or 3-m and the value stored in the main storage memory 7 are the same, the directory control unit 9 stores the registration status of the cache memory 3-1 or 3-m into the directory memory 8 in cache lines formed with a plurality of sublines. The directory control unit 9 also updates no value stored in the main storage memory 7 when the processor 2-1 or 2-m rewrites the value stored in the cache memory 3-1 or 3-m. The directory control unit 9 stores the status of the cache memory 3-1 or 3-m and a destination holding a latest value into the directory memory 8 in sublines in the case of a dirty status where the value stored in the cache memory 3-1 or 3-m is the latest value and the value stored in the main storage unit 7 is an old value.

Further, when a, plurality of processors other than the processor 2-i includes the cache line in the shared state, the cache line including the access address of either a write access issued to the cache memory 3-1 or 3-m storing data not being the latest value or a cache-off access to the cache memory 3-i, the invalidation command issuing unit 9a issues an invalidation command for a cache line to all the reference destinations stored in the directory memory 8 in cache lines.

As described above, according to the invention, the invalidation command issuing unit 9a can issue cache line invalidation commands to all reference destinations stored in the directory memory 8 in cache lines when the cache line in a shared state including either a write access issued to the cache memory 3-1 or 3-m storing data not being the latest value or the access address of a cache-off access to the cache memory 3-i exists in a plurality of processors other than the processor 2-i. Accordingly, the invention has the following advantages. It is possible to reduce the frequency of the cache invalidating process which occurs when a write access or cache-off access is continuously gained to a plurality of cache lines in shared states. The system process time can be shortened. The process performance can be improved. In addition, since the access conflict frequency on the bus and the cache memory in each memory system can be reduced, the performance of the whole memory system can be advantageously improved.

Further, since the cache invalidating mode can be switched by the kinds of access by adding the invalidation commands issued from the invalidation command issuing unit 9a to identification information which switches from invalidation in cache lines to invalidation in sublines. Hence there is the advantage of preventing the cache memory hit rate from being lowered.

Figure 2:
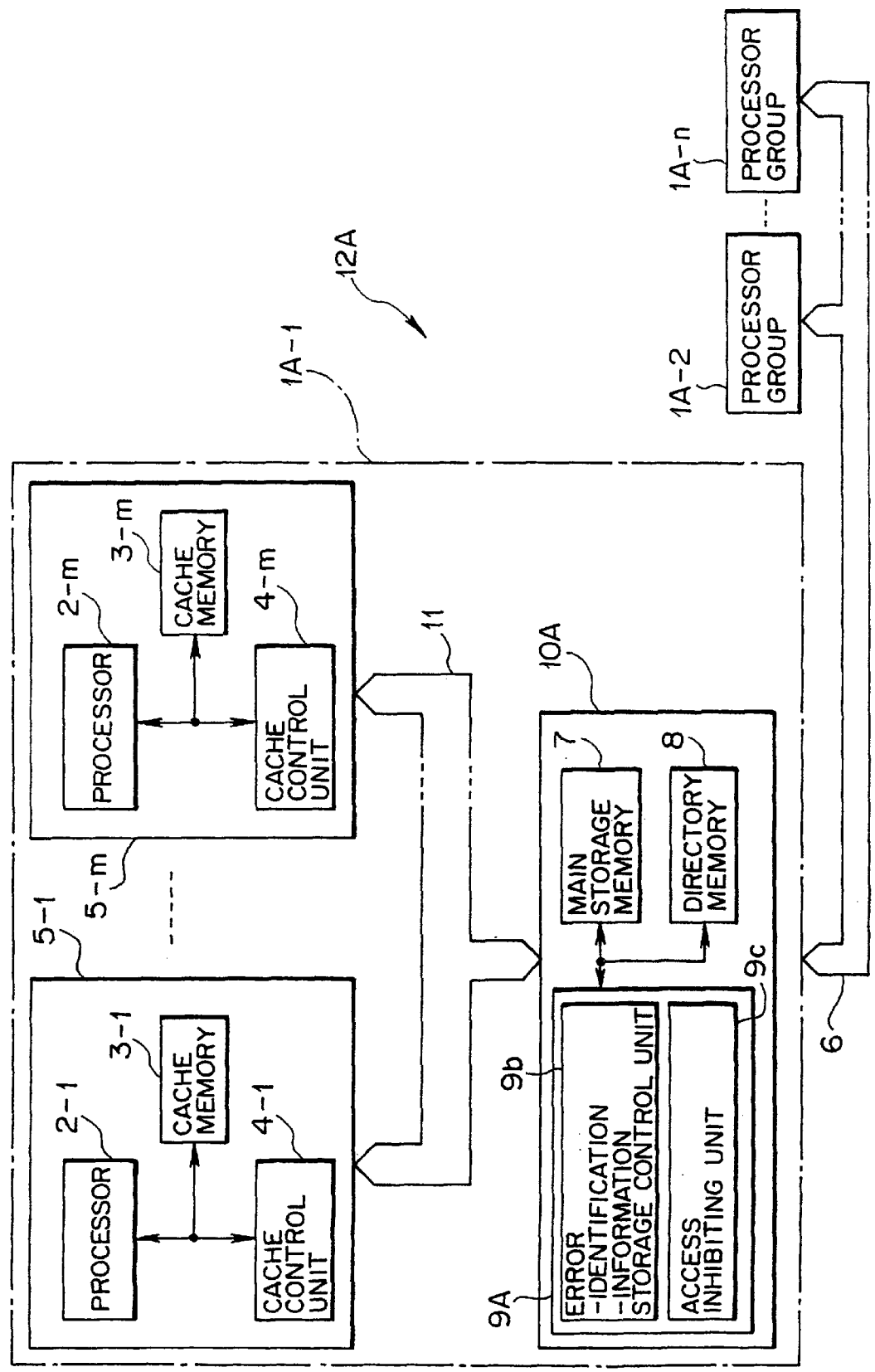
FIG. 2 is a block diagram showing an aspect of the present invention.

FIG. 2 is a block diagram showing an aspect of the present invention. Referring to FIG. 2, numeral 12A represents a multiprocessor. The multiprocessor 12A consists of a plurality of processor groups 1A-1 to 1A-n (n is a natural number being 2 or more) which are mutually connected via the first bus 6.

The multiprocessor 12A shown in FIG. 2 differs from that shown in FIG. 1 in the function of the directory control unit 9A forming processor groups 1A-1 to 1A-n. Other configurations are basically the same as those in multiprocessor shown in FIG. 1. In FIG. 2, the same numerals as those in FIG. 1 represent like elements.

FIG. 2 depicts in detail only the processor group 1A-1 among the processor groups 1A-1 to 1A-n. The processor groups 1A-2 to 1A-n which have basically the same configuration as the processor 1A-1 are not depicted here. The processor group 1A-1 consists of a main storage memory 7, a directory memory 8, a directory control unit 9A, and a memory unit 10A.

Like the directory control unit 9 shown in FIG. 1, in the control operation, the directory control unit 9A updates no value stored in the main storage memory 7 when the processor 2-1 or 2-m rewrites the value stored in the cache memory 3-1 or 3-m and stores controllably the status of the cache memory 3-1 or 3-m and a destination holding a latest value into the directory memory 8 in sublines in the case of a dirty status where the value stored in the cache memory 3-1 or 3-m is the latest value and the value stored in the main storage memory is an old value. The directory control unit 9A includes an error-identification-information storage control unit 9b and an access inhibiting unit 9c.

When the main storage memory 7 detects occurrence of the hard error during a reading process of data stored in the main storage memory 7, the error-identification-information storage control unit 9b controllably stores hard error occurrence identification information to a corresponding cache line within the directory memory 8.

Further, the access inhibiting unit 9c inhibits access to the cache memories 3-1 to 3-m to the cache line having the hard error occurrence identification information in the directory memory 8.

The dedicated field which stores hard error occurrence identification information can be arranged in the directory memory 8. Information which does not occur at a normal time can be arranged as hard error occurrence identification information in the directory memory 8.

Figure 12:
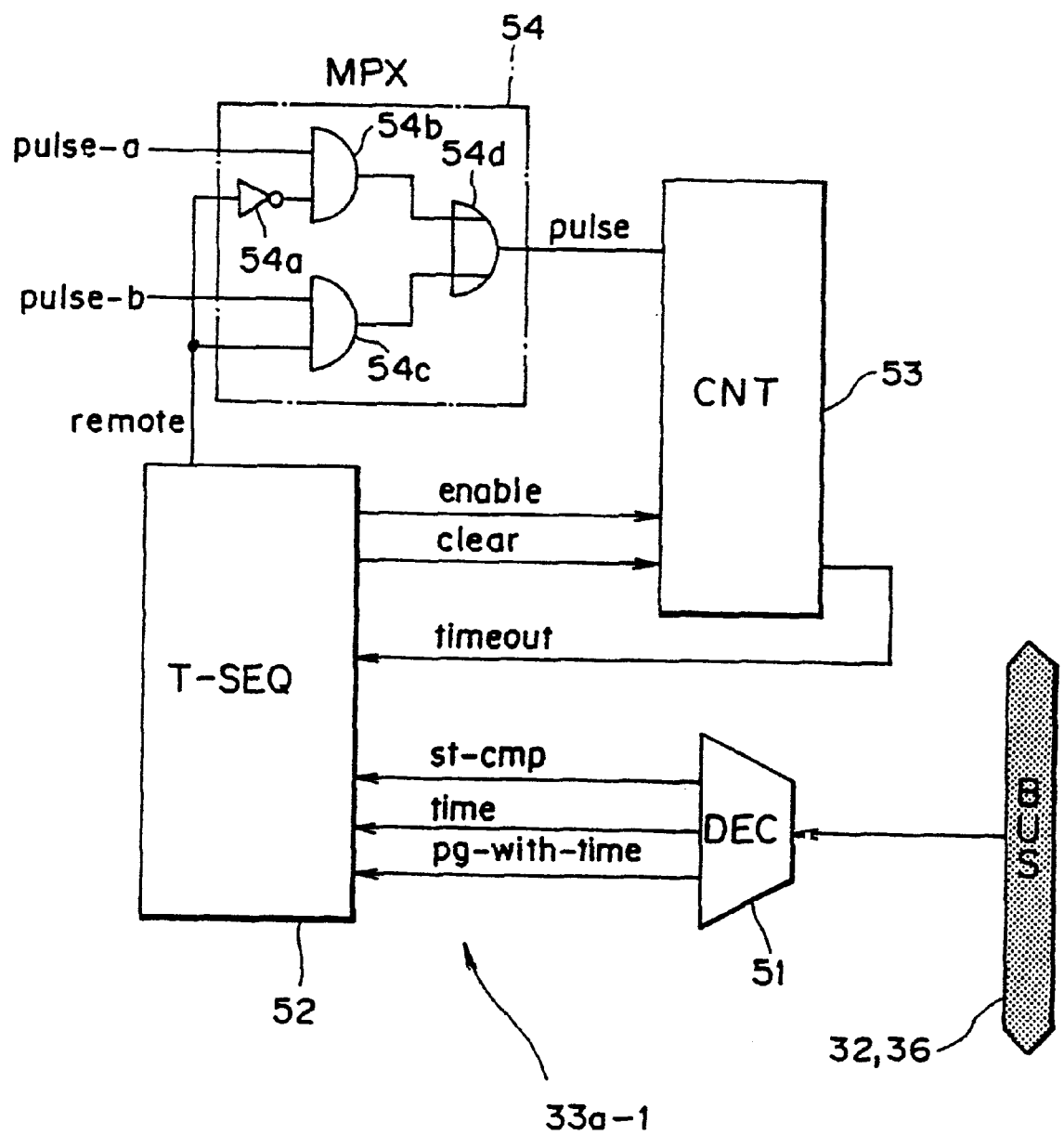
FIG. 12 is a block diagram showing the major section of a multiprocessor according to the third embodiment of the present invention.

In the multiprocessor 12A shown in FIG. 12, the hard error occurrence identification information is held in the directory entry of a cache line including a readout address in the directory memory 8 when a hard error occurs during the readout operation from the main storage memory 7, while a main storage access to the cache line with the identification information is inhibited.

As described above in detail, according to the present invention, the error-identification-information storage control unit 9b stores controllably the hard error occurrence identification information into the corresponding cache memory in the directory memory 8 when hard error occurs in the main storage memory 7 during the readout operation of data stored therein. In addition, since the access inhibiting unit 9c inhibits access to a cache line having hard error occurrence identification information, access to the main storage memory 7 in a failure state does not occurs again. Hence there is the advantage in that the degradation of the access performance to the main storage memory 7 in a normal state can be suppressed.

Furthermore, when access occurs again to the cache line in which error has occurred in the reading operation of the main storage memory 7, the error identification-information storage control unit 9b can send back the error response prior to the reading operation of the main storage memory 7 by recording failure occurrence information to the directory entry in the directory memory 8 at a failure detecting time. As a result, the process time till which the error response is sent back can be shortened. It is unnecessary to update the status of the directory entry in the directory memory 8 and to cancel the registration to the cache memories 3-1 to 3-m. This feature allows the device process to be simplified.

Further, since it is unnecessary to maintain the cache coherence to access after a hard error occurrence of the main storage memory 7, the storage element which holds the initial state of the directory is neglected. As a result, the device configuration can be advantageously simplified.

Figure 3:
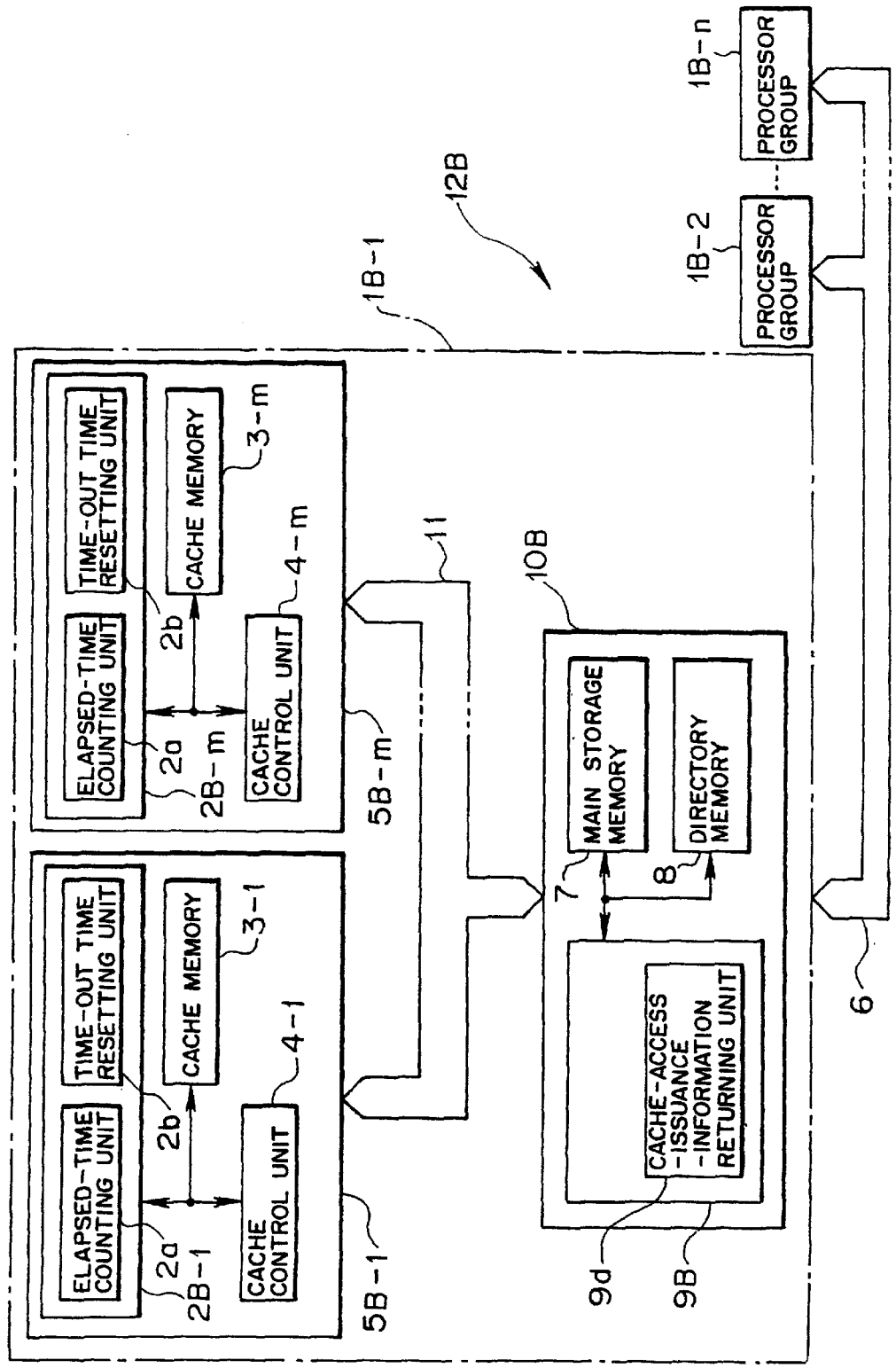
FIG. 3 is a block diagram showing an aspect of the present invention.

FIG. 3 is a block diagram illustrating an aspect of the present invention. Referring to FIG. 3, numeral 12B represents a multiprocessor. The multiprocessor 12B consists of a plurality of processor groups 1B-1 to 1B-n (n is an integer of 2 or more) which are mutually connected via the first bus 6.

The multiprocessor 12B shown in FIG. 3 differs from that shown in FIG. 1 in the functions of the processors 2B-1 to 2B-m and the directory control unit which form each of the processor groups 1B-1 to 1B-n. However, other elements have basically the same function. In FIG. 3, the same numerals as those in FIG. 1 represent like elements.

In FIG. 3, only the processor group 1B-1 is shown in detail among the processor groups 1B-1 to 1B-n. The detail configuration of each of the processor groups 1B-2 to 1B-n is basically identical to that of the processor group 1B-1. The detail illustration is omitted here.

The processor unit 5B-1 consists of a processor 2B-1, a cache memory 3-1 and a cache control unit 4-1. Similarly, the processor unit 5B-2 consists of a processor 2B-2, a cache memory 3-1 and a cache control unit 4-1. The processor unit 5B-m consists of a processor 2B-m, a cache memory 3-m and a cache control unit 4-m.

The memory unit 10B is formed of a main storage memory 7, a directory memory 8 and a directory control unit 9B.

Each of the processors 2B-1 to 2B-m includes an elapsed time counting unit 2a and a time-out time resetting unit 2b. The directory control unit 9B includes a cache access issuance information returning unit 9d.

When access to the cache memory 3-1 or 3-m occurs in the main storage memory 7 which has received access from the processor 2B-1 or 2B-m, the cache access issuance information returning unit 9d in the directory control unit 9B returns the event to the processor 2B-1 or 2B-m as an access source.

The elapsed time counting unit 2a in each of the processors 2B-1 to 2B-m counts the elapsed time between the time an access signal is transmitted to the main storage memory 7 and the time a response signal is received and then outputs a time-out signal when the response signal is not received after the counted elapsed time has exceeded a predetermined time-out time.

In response to notification from the cache-access-issuance information returning unit 9d, the time-out time resetting unit 2b resets the time-out time predetermined by the elapsed time counting unit 2a.

In such an arrangement, the elapsed time counting unit 2a recounts an elapsed time based on the time-out time reset in the time-out time resetting unit 2b.

In the technique of returning to the effect that access to the cache memory 3-1 or 3-m has occurred to the processor 2B-1 or 2B-m as an access source, the cache-access-issuance information returning unit 9d returns a dedicated command to the effect that access has occurred to the cache memory 3-1 or 3-m to the processor 2B-1 or 2B-m as an access source. The cache-access-issuance information returning unit 9d also adds identification information from the processor 2B-1 or 2B-m as an access source to an access command issued to the cache memory 3-1 or 3-m and then transmits the resultant access command to both the processor 2B-1 or 2B-m as an access source and the cache memory 3-1 or 3-m.

In the multiprocessor 12B shown in FIG. 3, the elapsed time counting unit 2a in each of the processors 2B-1 to 2B-m counts the elapsed time between the time an access signal is transmitted to the main storage memory 7 and the time a response signal is received and then outputs a time-out signal when the response signal is not received after the counted elapsed time has exceeded a predetermined time.

When access to any one of the cache memories 2B-1 to 2B-m occurs in the main storage memory 7 accessed from any one of the processors 2B-1 to 2B-m, the cache-access-issuance information returning unit 9d notifies any one of the processors 2B-1 to 2B-m being an access source of the event.

When any one of the processors 2B-1 to 2B-m at an access source receives a notification of the event that access to any one of the cache memories 3-1 to 3-m has occurred, the elapsed time counting unit 2a performs its recounting operation by changing a response wait timer value having a sufficient time for access to any one of the cache memories 3-1 to 3-m into the elapsed time for outputting the time-out signal by means of the time-out time resetting unit 2b.

As described above in detail, according to the present invention, when access to any one of the cache memories 3-1 to 3-m occurs in the main storage memory 7 accessed, the cache-access-issuance information returning unit 9d notifies the processor as an access source of the event. When any one of the processors 2B-1 to 2B-m as an access source receives the notification to the effect that access to any one of the cache memories 3-1 or 3-m has occurred, the time-out time resetting unit 2b changes the elapsed time for outputting a time-out signal of the elapsed time counting unit 2a into a response wait timer value corresponding to a sufficient time needed for access to any one of the cache memories 3-1 to 3-m, so that the elapsed time counting unit 2a can perform its time-recounting operation. Accordingly, the advantage is that the time monitoring with high failure spot specifying accuracy can be performed without involving in various access interferences in remote cache memories which may occur when the main storage memory 7 acting as a shared memory device in the distributed and shared-type memory system adopting the directory mode is accessed. In addition, the advantage is that a reliable recovery operation can be performed even in the failure occurrence.

Figure 4:
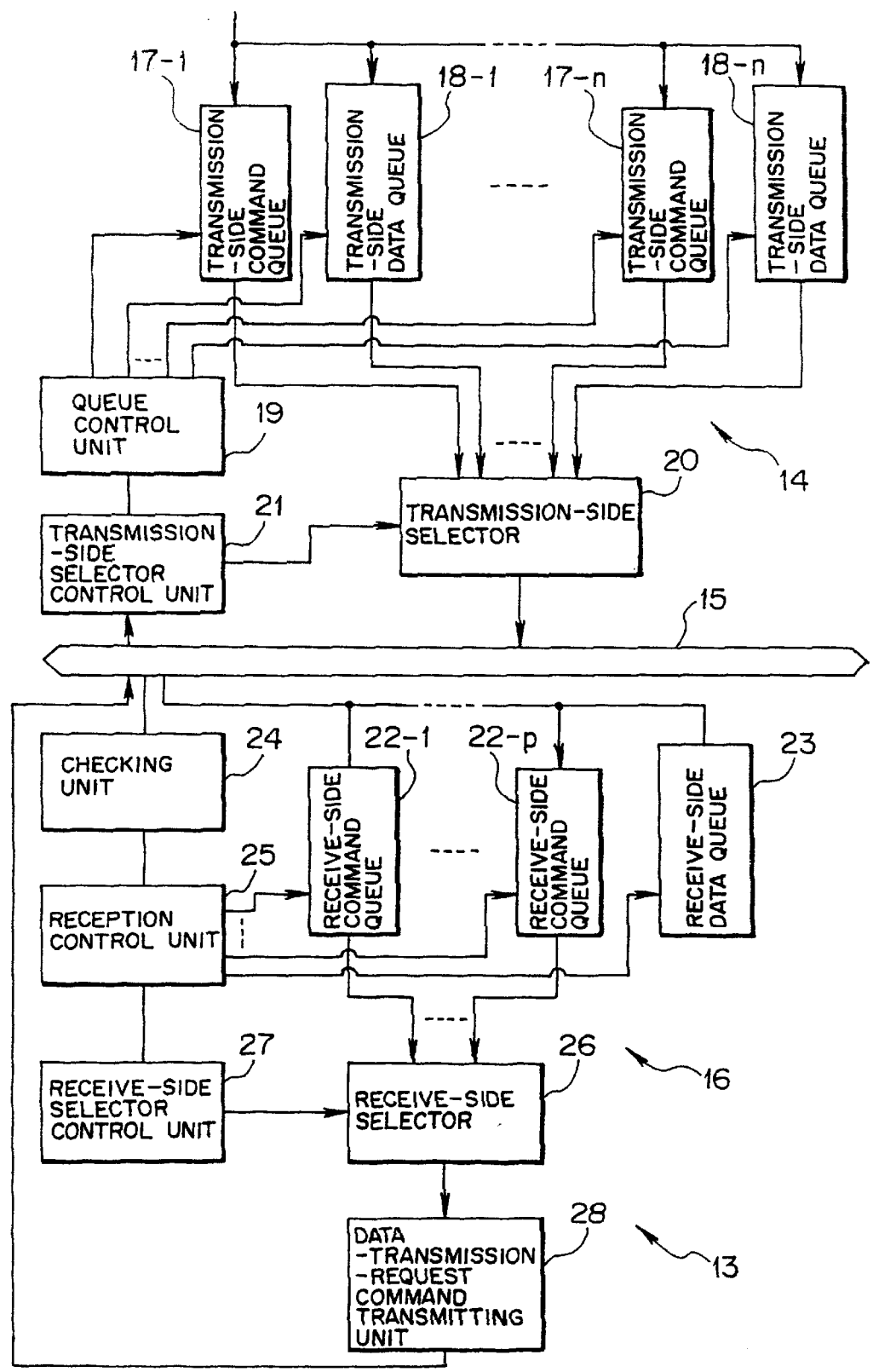
FIG. 4 is a block diagram showing an aspect of the present invention.

FIG. 4 is a block diagram showing an aspect of the present invention. Referring to FIG. 4, numeral 13 represents a data transfer system. The data transfer system 13 consists of a transmitter for transmitting packets with data and a receiver 16 connected to the transmitter 14 and the bus 15 for receiving packets with data transmitted from the transmitter 14 via the bus 15.

The transmitter 14 consists of a plurality of transmission-side command queues 17-1 to 17-n, a transmission-side data queues 18-1 to 18-n, a queue control unit 19, a transmission-side selector 20 and a transmission-side selector control unit 21.

Each of the transmission-side command queues 17-1 to 17-n holds commands each forming a packet with data to be transmitted. The transmission-side data queues 18-1 to 18-n are arranged corresponding to the transmission-side command queues 17-1 to 17-n to hold data forming a packet with data. The queue control unit 19 stores controllably commands or data into the transmission-side command queues 17-1 to 17-n and the transmission-side data queues 18-1 to 18-n.

The transmission-side selector 20 outputs selectively either commands from the transmission-side command queues 17-1 to 17-n or data from the transmission-side data queues 18-1 to 18-n to the bus 15.

When the transmission-side command queues 17-1 to 17-n store commands and the transmission-side data queues 18-1 to 18-n store data corresponding to the commands, under control of the queue control unit 19, the transmission-side selector control unit 21 outputs a select signal to select a command selected by the transmission-side selector 20 to the transmission-side selector 20.

The receiver 16 consists of a plurality of reception-side command queues 22-1 to 22-p, a reception-side data queue 23, a checking unit 24, a receive control unit 25, a reception-side selector 26, a reception-side selector control unit 27 and a data transmission request command transmitting unit 28.

Each of the reception-side command queues 22-1 to 22-p holds commands received via the bus 15. The reception-side data queue 23 holds data received via the bus 15.

The checking unit 24 checks for the command received via the bus 15 and for the status of each of the reception-side command queues 22-1 to 22-p. The receive control unit 25 stores controllably a receive command into the free reception-side command queue 22-j (j=an arbitrary natural number among 1 to u) based on the result of checking of the status of each of the reception-side command queues 22-1 to 22-p sent from the checking unit 24.

The reception-side selector 26 outputs selectively any one of commands from the reception-side command queues 22-1 to 22-p. The reception-side selector control unit 27 outputs a select signal to the reception-side selector 26 to select the command output by the reception-side selector 26 when commands stored in the reception-side command queues 22-1 to 22-p are processed.

The data transmission request command transmitting unit 28 requests transmitting data corresponding to the command from the reception-side selector 26.

In such an operation, the transmission-side selector control unit 21 controls the transmission-side selector 20 to selectively transmit data stored in the transmission-side data queues 18-1 to 18-n to the receiver 16 based on commands from the data transmission request command transmitting unit 28.

In the data transfer system 13 shown in FIG. 4, when the transmission request of a packet with data occurs in the transmitter 14, only the packet of which the bus command information is defined is transferred to the receiver 16 via the bus 15.

When the receiver 16 receives a transmission request command packet for data transmission, the process request is stored as a process wait queue into the reception-side command queues 22-1 to 22-p. Then at a processable state, the data transmission request command is transmitted as a data request command packet to the transmitter 14.

In the transmitter 14, when a data request command packet is received from the receiver 16, a desired data packet is transferred after a fixed period of time without any bus capture operation. Thereafter, the receiver 16 receives the data packet from the transmitter 14 to be transferred after a fixed period of time in the bus capture state maintained and then releases the bus 15 when the data packet has been completely received.

As described in detail above, according to the present invention, the selector control unit 21 controls the transmission-side selector 20 by selectively transmitting data stored in the transmission-side data queue to the receiver 13 based on the command transmitted from the data transmission request command transmitting unit 28. As a result, the buffer capacity on data reception can be greatly reduced without sacrificing the data transfer performance of the bus, whereby the hardware cost can be reduced. Particularly, increasing the level of bus duplexing or widening the bus band contributes to the hardware cost reduction of the whole device due to the buffer reduction.

(b) Explanation of First Embodiment

Figure 5:
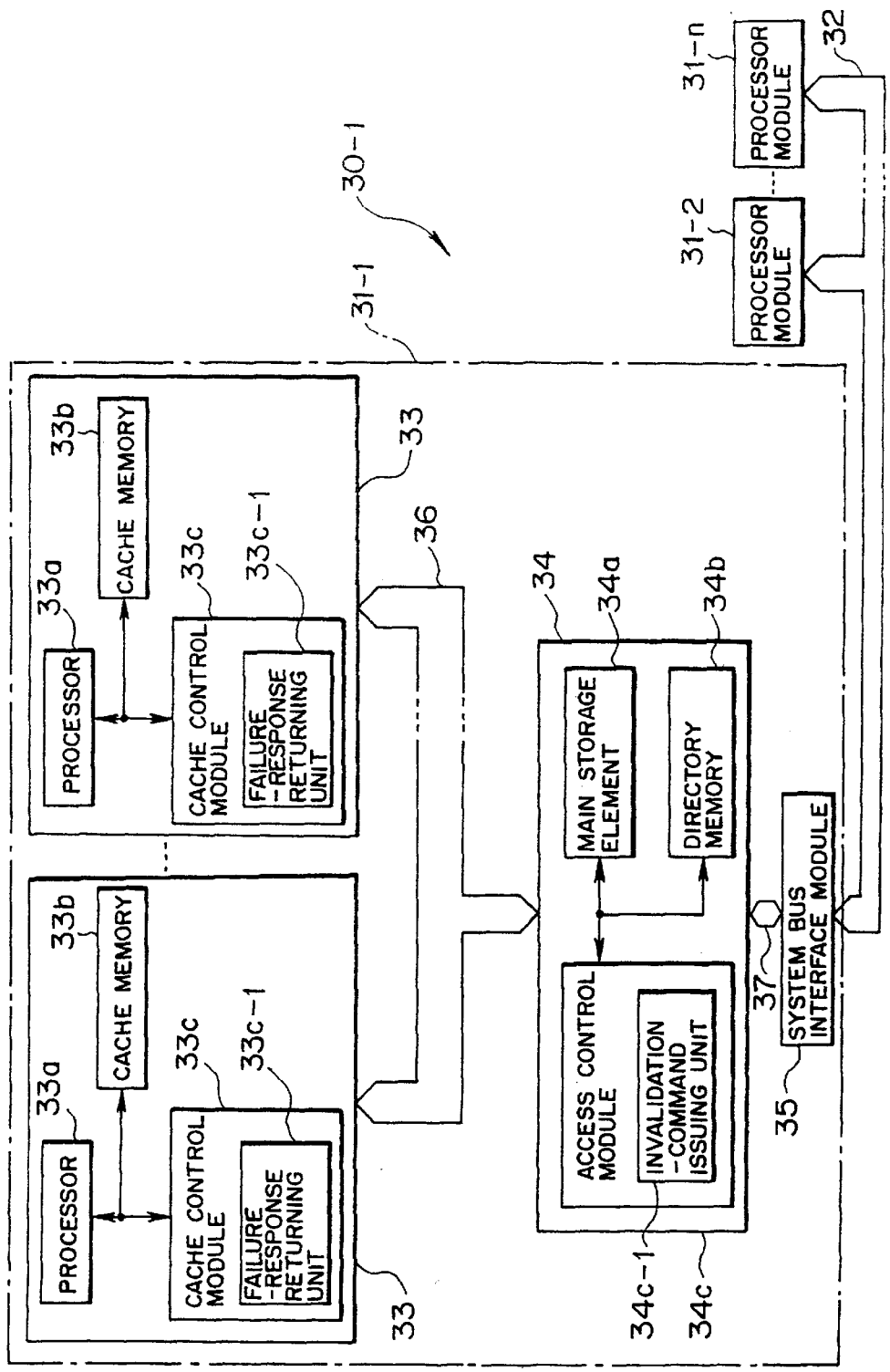
FIG. 5 is a block diagram showing a multiprocessor according to the first embodiment of the present invention.

FIG. 5 is a block diagram showing the multiprocessor according to the first embodiment. In the multiprocessor 30-1, processor modules 31-1 to 31-n (n is an integer of 2 or more) acting as a plurality of processor groups are mutually connected via the system bus 32 as the first bus.

Each of the processor modules 31-1 to 31-n includes at least one processor element (processor) 33, a memory module (memory unit) 34 and a system bus interface module 35.

The number of processor elements 33 in each of the processor modules 31-1 to 31-n can be set to at least one arbitrary value in each of the processor modules 31-1 to 31-n.

The processor element 33 is connected to the memory module 34 via the cache snoop bus 36 acting as the second bus. The memory module 34 is connected to the system bus interface module 35 via the internal bus 37.

That is, the memory module 34 which stores various data is connected to each of the processors 33 forming each of the processor modules 31-1 to 31-n via the cache snoop bus 36 and is shared by the processor elements 33.

For example, the memory module 34 in the processor module 31-1 is accessed from a processor element 33 in the processor module 31-1 via the cash snoop bus 36 or is accessed from a processor element 33 in another processor module (e.g. processor module 31-2) via the system bus 32 or internal bus 37.

The cache snoop bus 36 can transfer the use right to another device while the above-mentioned processor element 33 issues a request to the memory module 34 and then receives a response. Plural processes can be concurrently performed via the cache snoop bus 36.

The processor element 33 consists of a processor 33a, a cache memory 33 and a cache control module 33c.

The processor 33a performs a desired information process by gaining data read/write access to the cache memory 33b or memory module 34. The cache memory 33b arranged to each processor 33a can gain high rate read/write access with the processor 33a and the memory module 34.

The cache memory 33b stores data in cache lines formed in e.g. 256 bytes. The cache line is formed of four sublines (64 bytes).

The cache control module 33c controls the data read/write operation between the processor 33a and the cache memory 33b in, for example, a copy back mode and has the function as a cache control unit.

The cache control module 33c has a tag which records the address of data on the cache memory 33b and the cache state of the entry thereof, and records the cache state in sublines.

The memory module 34 is shared by each of the processor modules 31 via the cache snoop bus 36. The memory module 34 includes the main storage element 34a acting as a main storage memory for. storing various kinds of data, a directory memory 34b and a access control module 34c.

The directory memory 34b stores the registration status of main storage data (reference information) into all the cache memories 33 in each of the processor elements 31-1 to 31-n forming the multiprocessor 30-1.

Figure 6:
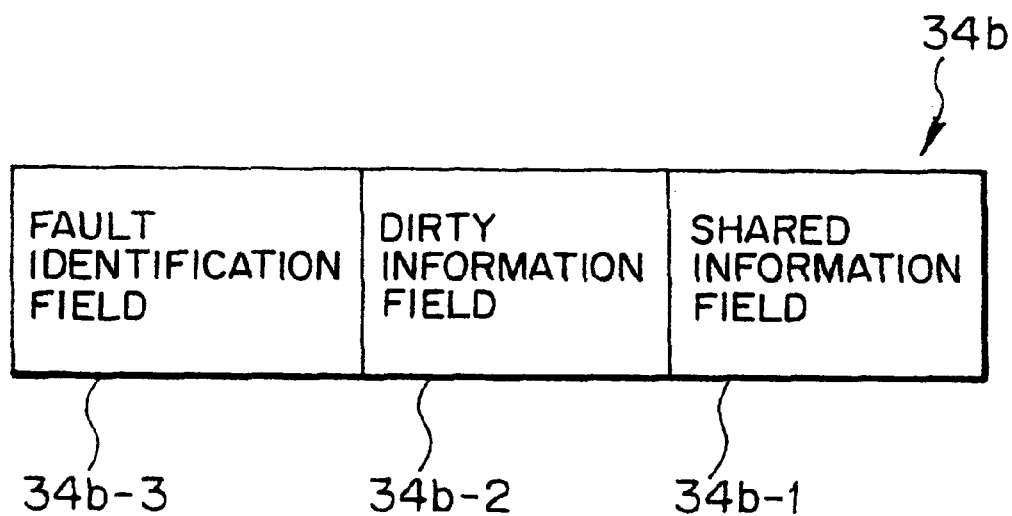
FIG. 6 is a diagram showing the format of a directory entry according to the first embodiment of the present invention.

In concrete, the directory memory 34b is formed so as to have a directory entry having, for example, the format in cache lines shown in FIG. 6.

That is, as to an directory entry stored in the directory memory 34b, one entry, as shown in FIG. 6, is prepared in cache lines and the registration information on the main storage data to the cache is recorded in sublines.

That is, the format of the directory entry shown in FIG. 6 is formed of the shared information field 34b-1, the dirty information field 34b-2 and the failure identification field 34b-3.

The shared information field 34b-1 corresponds to a field which records the identification information on a subline in a shared state and the registration destination thereof. The dirty information field 34b-2 corresponds to the field which records the identification information on a subline in a dirty state and the registration destination thereof. The failure identification field 34b-3 corresponds to a field which shows that an uncorrectable error of 2 bits or more (hereinafter referred to as a multibit error) has occurred during the reading operation of the main storage corresponding to the address of a cache line.

The dirty state shows that the value on the main storage memory 34a is not the latest value but has been written on the cache memory 33b in a processor 33. Only one processor element 33 in the memory system can have the latest value. The directory memory 34b records identification information of the processor 31-1 or 31-n having the presence or absence of a dirty state and the latest value in sublines.

The shared state represents that the value on the main storage element 34a is referred to by means of a processor element 33 and the same value is shared by the main storage element 34a and the cache memory 33b. The directory memory 34b stores identification information on each of the processor modules 31-1 to 31-n having the same value in lines.

Further, the invalid state represents that the cache line is not in a dirty state or shared state. In dirty and shared states on the directory memory 34b, only the processor modules 31-1 to 31-n are identified but respective processor elements 33 are not identified.

The access control module 34c performs the cache coherence control based on the value on the cache memory 33b and the value on the main storage element 34a and controllably stores the registration state of main storage data to the cache memory 33 into the directory memory 34b. The access control module 34c has the function of a directory control unit.

For example, in control, the access control module 34c stores the registration state on the cache memory 33b into the directory memory 34b in units of the cache line formed of four sublines when the value on the cache memory 33b and the value on the main storage element 34a are in the same shared state. The access control module 34c does not update the value on the main storage element 34a when the value on the cache memory 33b is written by means of the processor 33a. The access control module 34c also stores the state of the cache memory 33b and the latest value holding designation into the directory memory 34b in sub lines in the dirty state where the value on the cache memory 33b is the latest value and the value on the main storage element 34a.

The access control module 34c includes an invalidation command issuing unit 34c-1 that issues cache invalidation commands in cache lines in the corresponding cache memory 33b when one write access or cache-off access is made.

In other words, the invalidation command issuing unit 34c-1 issues cache line invalidation commands to all cache line control module 33c acting as reference destinations stored in the directory memory 34b in cache lines when a cache line exists in the state shared by a plurality of processors 33a other than the processor 33a. The cache line includes either a write access to the cache memory 33b storing data not being the latest value and issued from a processor 33a, or the access address of a cache-off address to a cache memory 33b.

Figure 7:
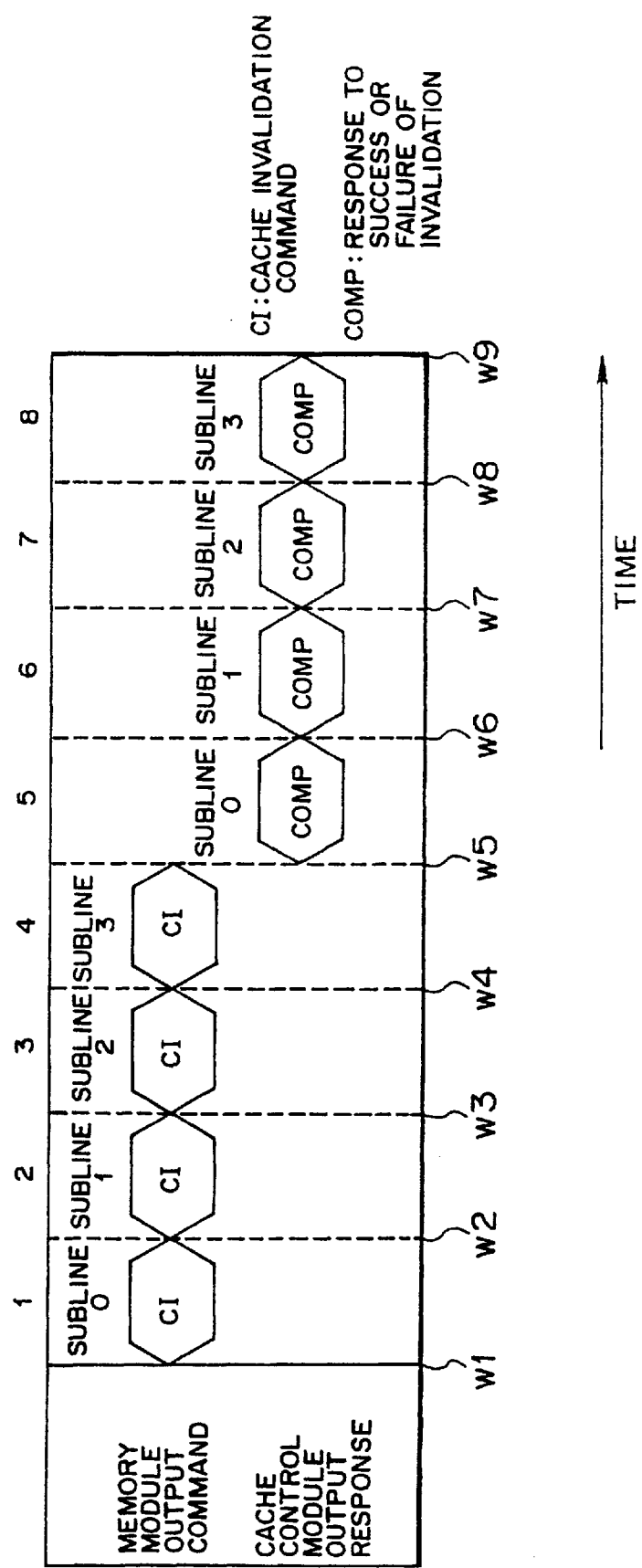
FIG. 7 is a timechart used for explaining the operation of a multiprocessor according to the first embodiment of the present invention.

For example, as shown in FIG. 7, the invalidation command issuing unit 34c-1 issues the cache invalidation command 43 in cache lines, without being involved in the states of sublines (of serial numbers 0 to 3) not to be accessed, by issuing cache invalidation commands to all sublines forming a cache line to be invalidated in time sharing mode, (refer to the time w1 to w5 shown in FIG. 7).

The cache control module 33c in the processor element 33 which has received cache invalidation commands returns a response regarding the success or failure of cache invalidation to the cache snoop bus 36 every fixed cycles.

Two aspects where the invalidation command issuing unit 34c-1 issues invalidation commands are in detail as follows:

As for a write access to the address which has no entries in the cache memory 33b within the processor element 33 or a write access to the address which has the value in a shared state therein, when a cache line with the address is shared by other processor modules 31-1 to 31-n, the cache memory 33b in the shared state is invalidated (purged). Then, the cache line becomes a dirty state after capturing a write right to the cache memory 33b in the processor element 33.

In the cache-off access to a caching space, when the cache line including the address is shared by other processor modules 31-1 to 31-n, it becomes an invalid state by purging the shared memory 33b in a shared state.

The invalidation command issued from the invalidation command issuing unit 34c-1 can be issued in the above-described cache lines according to types of access command. Moreover, the invalidation command can be issued in sublines, as described in FIG. 22.

That is, the directory memory 34b includes a table which registers the types of invalidation command to be issued according to the types of access command. The directory memory 34b adds identification information to an invalidation command to invalidate the cache line unit or subline unit by referring to the table on the directory memory 34b when the invalidation command issuing unit 34b-1 issues the invalidation command.

In concrete, the invalidation command issuing unit 34c-1 includes a cache-invalidating-system identification information field to the invalidation command to add it to identification information.

In such an arrangement, the cache control module 33c which has received an invalidation command with the identification information can invalidate the cache line unit or subline unit based on the identification information.

Furthermore, the cache control module 33c includes a failure response returning unit 33c-1 that returns an invalidation failure response to an invalidation command issued from the invalidation command issuing unit 34c-1 when the subline other than sublines not to be accessed is in a dirty state among the sublines forming a cache line including an access address issued from a processor 33a.

The system bus interface module 35 interfaces the memory module 34 with the system bus 32.

In the above mentioned multiprocessor 30-1, the hierarchical bus is formed of the system bus 32, the cache snoop bus 36, and the internal bus 37. The system which holds the cache coherence is built by adopting the directory system between the processor modules 31-1 to 31-n and the snoop system in the processor modules 31-1 to 31-n. Each of the buses 32, 36 and 37, which is formed of, for example, a split bus, is controlled by distributed arbitration.

In the above-mentioned configuration, the invalidating process of the cache memory 33b in the processor 30-1 according to the first embodiment of the invention will be described below by referring to FIGS. 7 and 8.

In the following explanation, for the purpose of convenience, the processor module (PM) 31-1 of an success source to the main storage element 34a is called a local PM. The processor module 31-2 which has the main storage element 34a to be accessed is called a home PM. The processor module 31-n which caches the main storage element 34a is called a remote PM.

Figure 8:
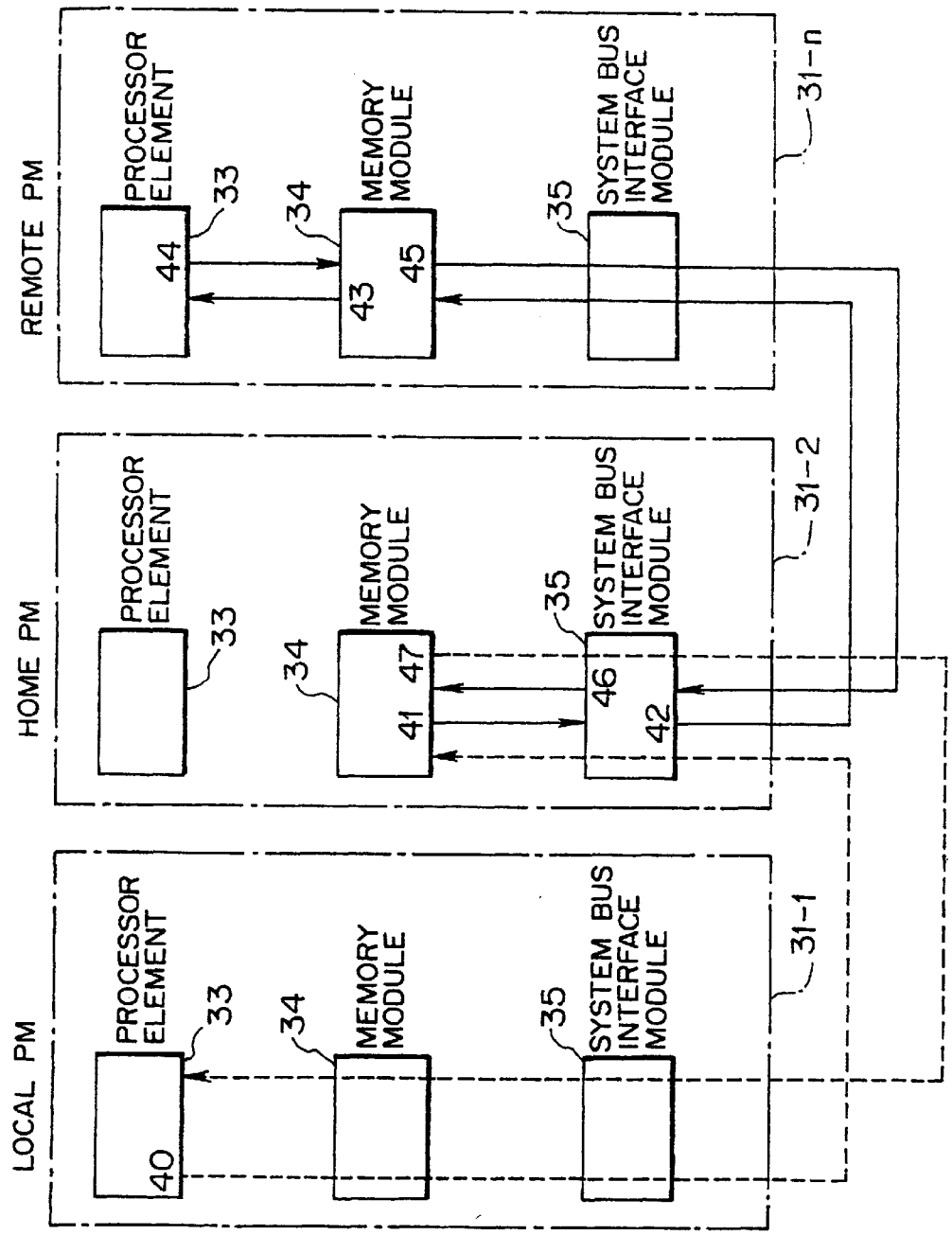
FIG. 8 is a diagram showing the operation of a multiprocessor according to the first embodiment of the present invention.

In explanation of the embodiment shown in FIG. 8, the processor module (remote PM) in which the home PM 31-2 is being cached is represented as the processor module 31-n. Plural processor modules 31-1 to 31-n which belong to the processor element 33 which issues an invalidation command for the cache memory 33b act as remote PMs.

The access command 40 of the write access or cache-off access is issued from the local PM 31-1 onto the cache snoop bus 36. The access command 40 is input to the home PM 31-2 via the internal bus 37 or system bus 32. The access command is input to the memory module 34 of the home PM 31-2 via the internal bus 37.

The access control module 34c in the memory module 34 refers to the directory entry of a cache line including the access address of an input command on the directory memory 34b.

When the referred directory entry is in a shared state, the access control module 34c (invalidation command issuing unit 34c-1) issues the purge command 41 in cache lines to the system bus interface module 35 via the internal bus 37, together with the access address thereof.

The command field of the purge command 41 includes the identification information (hereinafter referred to as a broad map) regarding the processor modules 31-1 to 31-n which have cache memories 33b in shared state and are to be invalidated.

The invalidation command issuing unit 34c-1 issues an access command with identification information showing an invalidating scheme corresponding to an access command, based on the content of the directory memory 34b during issuing the purge command 41 (in this case, the identification information which invalidates in cache lines is added).

Figure 22:
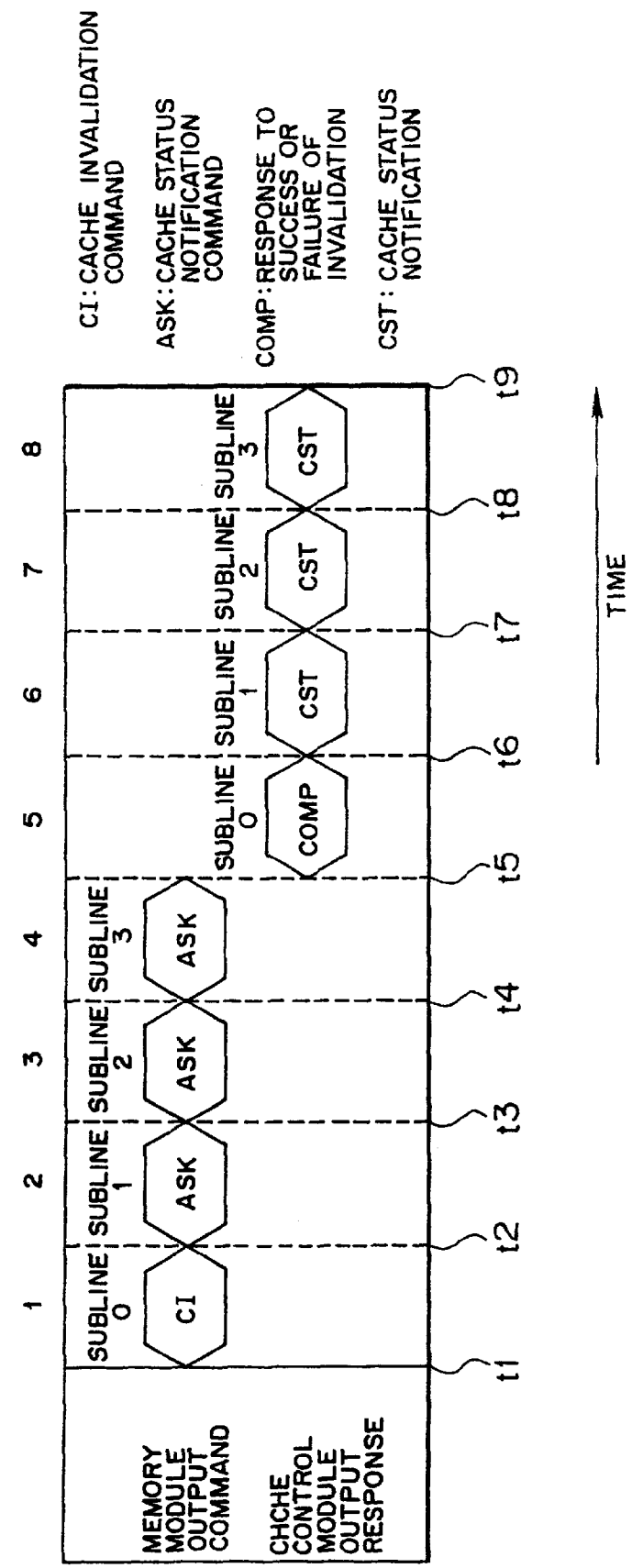
FIG. 22 is a timechart used for explaining the operation of the multiprocessor shown in FIGS. 20 and 21.
Figure 23:
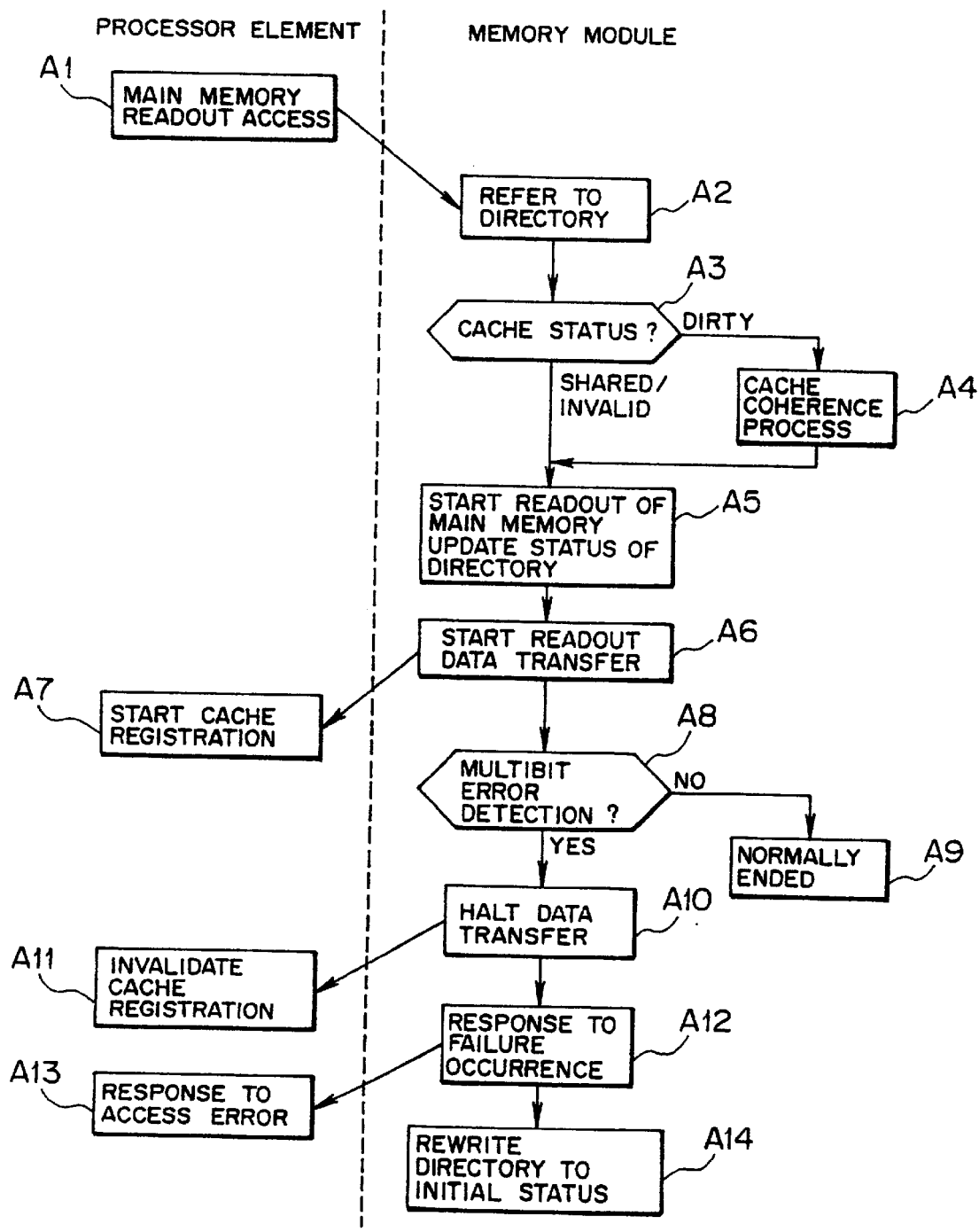
FIG. 23 is a flowchart used for explaining the memory error process of the multiprocessor shown in FIGS. 20 and 21.
Figure 24:
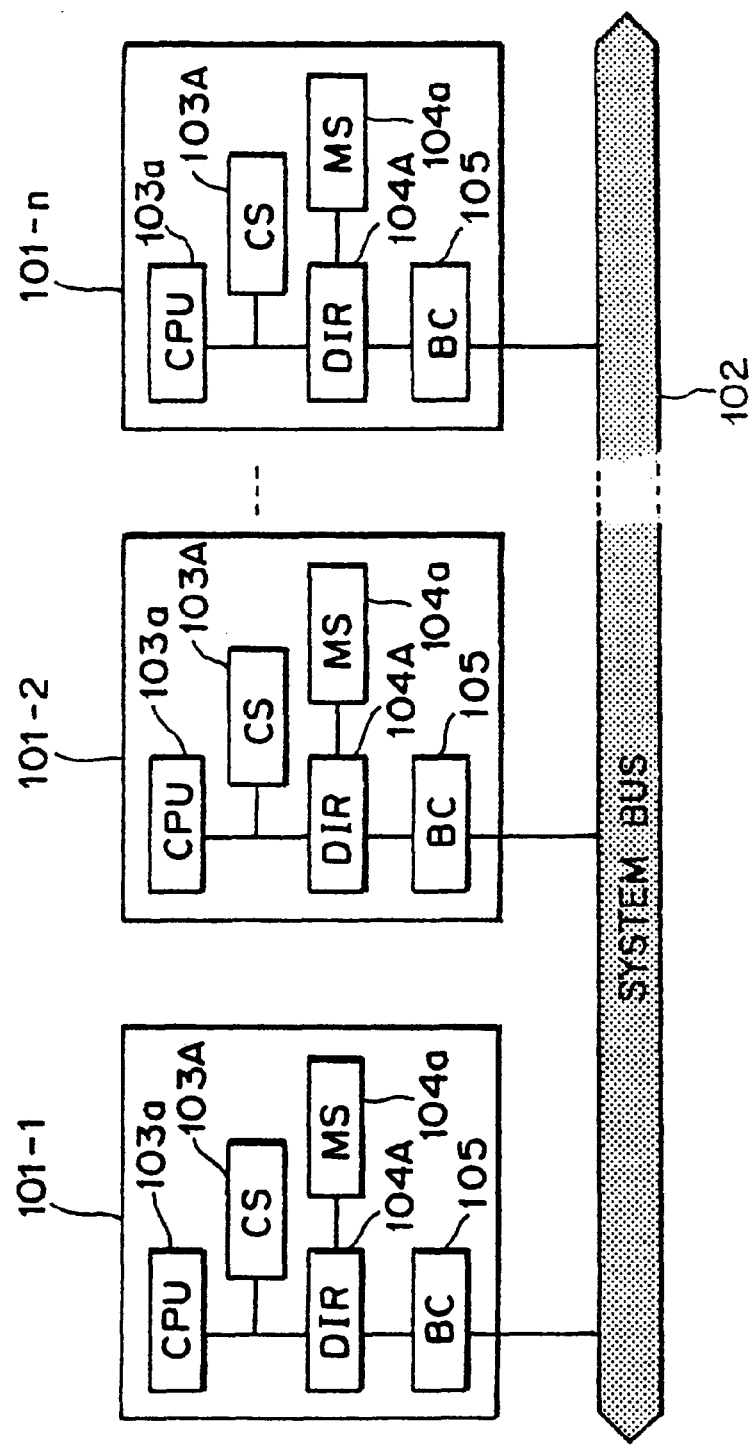
FIG. 24 is a block diagram showing the function of the multiprocessor shown in FIGS. 20 and 21.
Figure 25:
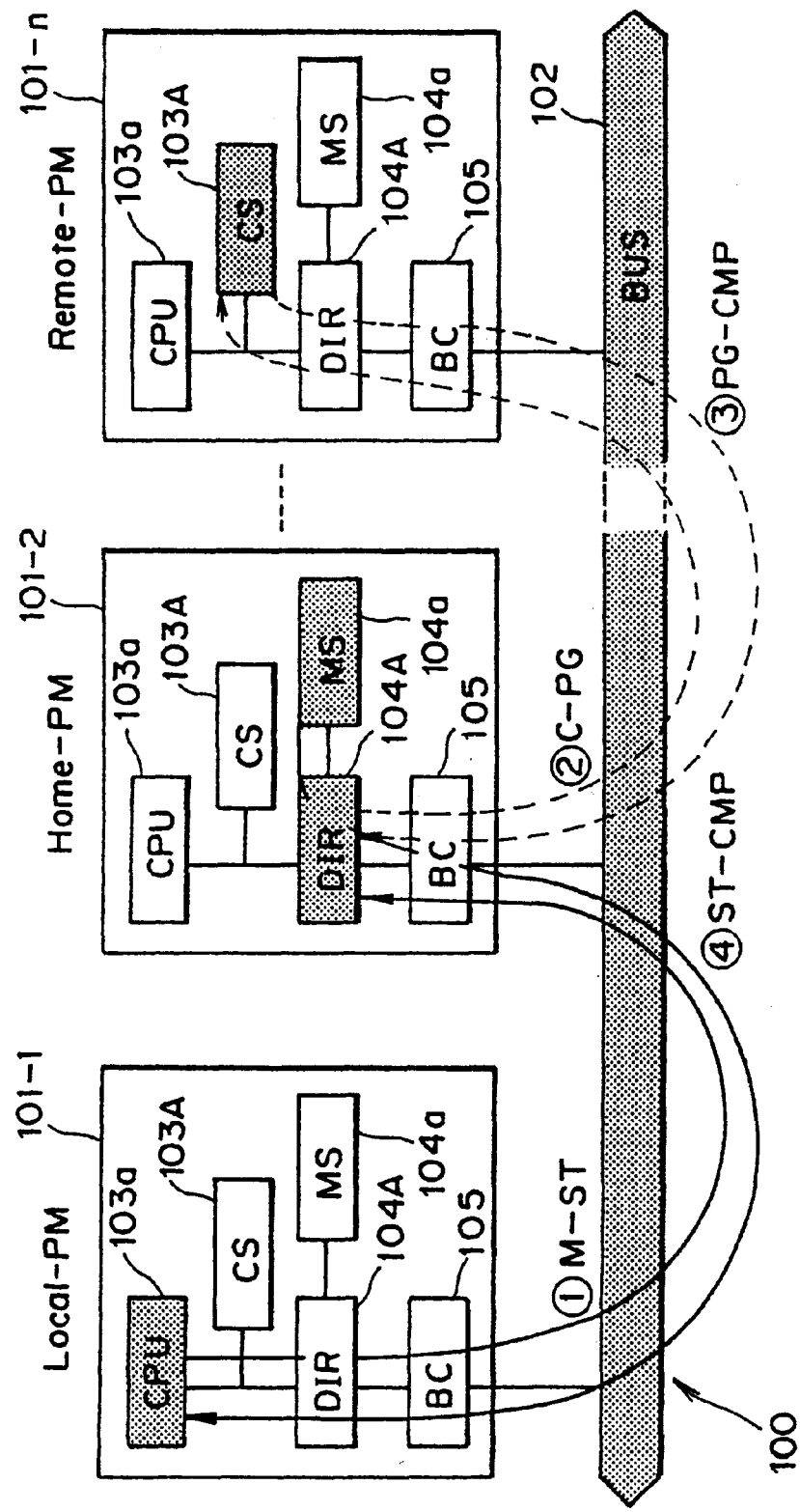
FIG. 25 is a diagram showing the command sequence of the multiprocessor shown in FIGS. 20 and 21.

In such an operation, the local PM 31-n can invalidate either the cache line unit shown in FIG. 7 or the subline unit shown in FIG. 22, based on the identification information.

The system bus interface module 35 issues the purge command (hereinafter referred to as a remote purge command) 42 in cache lines to the remote PM 31-n via the system bus 32 according to the broad map, together with the access address thereof.

The identification information with the purge command 41 is held in the field of the remote purge command 42 and then is transmitted to the memory module 34 in the remote PM 31-n. The memory module 34 in the remote PM 31-n can switch the command sequence of an invalidation command (the invalidating sequence in cache lines or invalidating sequence in sublines) issued onto the cache snoop bus 36 based on the identification information.

The remote purge command from the home PM 31-2 is received by the memory module 34 via the system bus interface module 35 in the remote PM 31-n and the internal bus 37. The access control module 34c (invalidation command issuing unit 34c-1) in the memory module 34 receiving the remote purge command issues the cache invalidation command 43 onto the cache snoop bus 36 in cache lines.

For example, shown in FIG. 7, the memory module 34 issues the cache invalidation command 43 in cache lines in a time sharing mode by issuing cache invalid commands to all the sublines (of serial numbers 0 to 3) forming a cache line to be invalidated (refer to the time w1 to w5 shown in FIG. 7).

The cache control module 33c in the processor element 33 which has received the cache invalidation command refers to a tag corresponding to a subline address added to the cache invalidation command and then invalidates the value thereof if the referred tag is in a shared state, thus returning the success response 44 of the cache invalidation onto the cache snoop bus 36 every fixed cycles. If the tag is in a dirty state, the failure response returning unit 33c-1 returns a failure response 44 of the cache invalidation (or notification of the existence of a dirty state) onto the cache snoop bus after a fixed cycle and then holds the value of the tag (refer to the time w5 to w9 in FIG. 7).

In response to the success or failure response 44 from the cache control module 33c, the access control module 34c of the memory module 34 collects it and then issues the remote purge response 45 via the system bus interface module 35, the internal bus 37 and the system bus 32 (refer to FIG. 5).

In the home PM 31-2, the system bus interface module 35 receives the remote purge response 45 via the system bus 32 and then returns it as a success or failure response 46 regarding the cache line invalidation to the memory module 34 via the internal bus 37.

In the home PM 31-2, the memory module 34 which has received purge success/failure information updates the value of the directory entry on the directory memory 34b according to the purge success/failure information. That is, in the case of purge success, the directory entry becomes an invalid state. Thereafter, the memory module 34 performs the main storage process according to the access command and then returns the access completion response 47 to the local PM 31-1.

As described above, in the multiprocessor according to the first embodiment of the present invention, when either a cache line in a shared state including a write access which is issued to the cache memory 33b storing data not being the latest value or the access address of a cache-off access to a cache memory 33b exists in a plurality of processors other than a processor, the invalidation command issuing unit 34c-1 can issue a cache line invalidation command in cache lines. As a result, the following features can be provided. It is possible to reduce the frequency of the cache invalidating process which occurs at continuous write access or cache-off access to a plurality of cache lines in shared states. The device process time can be reduced, thus resulting in the improved process performance. In addition, since the access conflict count can be reduced on the buses 32, 36 and 37 and the cache memory 33b in the memory system, The performance of the whole memory system can be improved Further, since identification information for switching from the invalidation of a cache line unit to the invalidation of a subline unit is added to the invalidation command issued from the invalidation command issuing unit 34c-1, the cache invalidating scheme can be switched by the type of access. This feature can prevent the hit rate of the cache memory 33b from being decreased.

(c) Explanation of Second Embodiment

Figure 9:
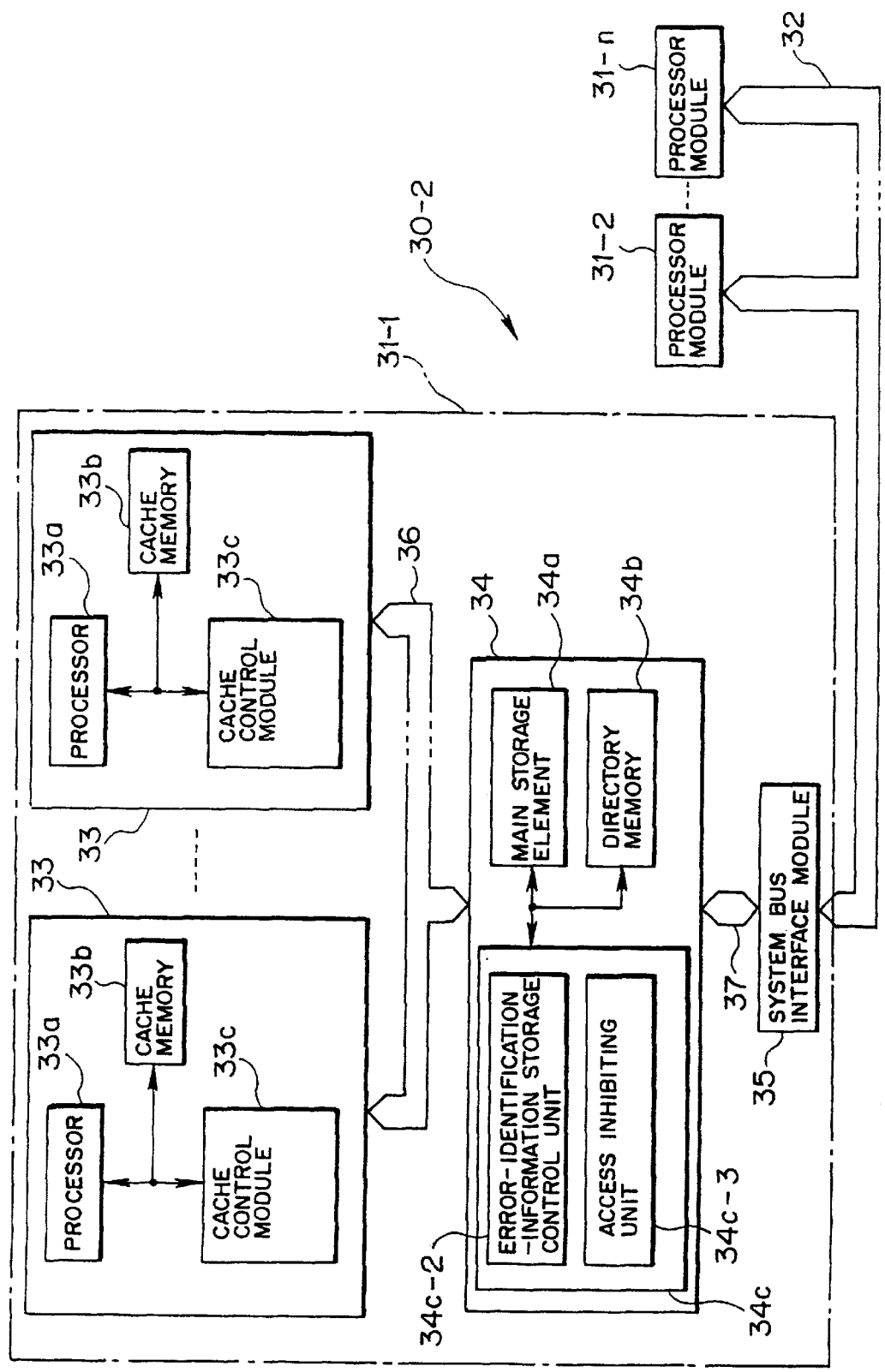
FIG. 9 is a block diagram showing a multiprocessor according to the second embodiment of the present invention.

FIG. 9 is a block diagram showing the multiprocessor according to the second embodiment of the present invention. The multiprocessor 30-2 shown in FIG. 9 differs from that according to the first embodiment (refer to numeral 30-1) in that the memory module 34 includes an error identification information storage control unit 34c-2 and an access inhibiting unit 34c-3. In FIG. 9, the same numerals as those in FIG. 5 represent like elements.

In the memory module 34, when detecting a hard error which has occurred in the main storage element 34a during the reading process of data stored therein, the error-identification-information storage control unit 34c-2 stores controllably the hard error occurrence identification information to the cache line corresponding to the directory memory 34b.

In concrete, the identification information on the above-mentioned hard error, for example, can be stored into the failure identification field 34b-3 forming the directory entry, for example, shown in FIG. 6.

The failure identification field 34b-3 is a dedicated field for storing hard error occurrence identification information. This field shows that an uncorrectable error of 2 bits or more (multibit error) has occurred when the main storage element 34a corresponding to the address of a cache line is read out.

The hard error occurrence identification information to be stored in the directory memory 34b can be formed so as to store information which does not occur at a normal time. In concrete, it is considered that the bit representing that the cache line is in a dirty state and in a shared state is stored into both the shared state field 34b-1 and the dirty state field 34b-2, shown in FIG. 6.

That is, since the dirty state and the shared state are exclusive to each other in one subline, it is impossible that the value as a directory entry should become showing that all the sublines forming a cache line is in a dirty state and in a shred state.

Since the error-identification-information storage control unit 34c-2 can identify failure by recording the above-mentioned state value as failure occurrence information in the directory memory 34b. The number of bits of the necessary directory entry can be reduced in comparison with an arrangement of the dedicated field.

When the directory entry on the directory memory 34b has the hard error occurrence information, the access inhibiting unit 34c-3 inhibits access to the cache line corresponding to the directory entry.

Figure 10:
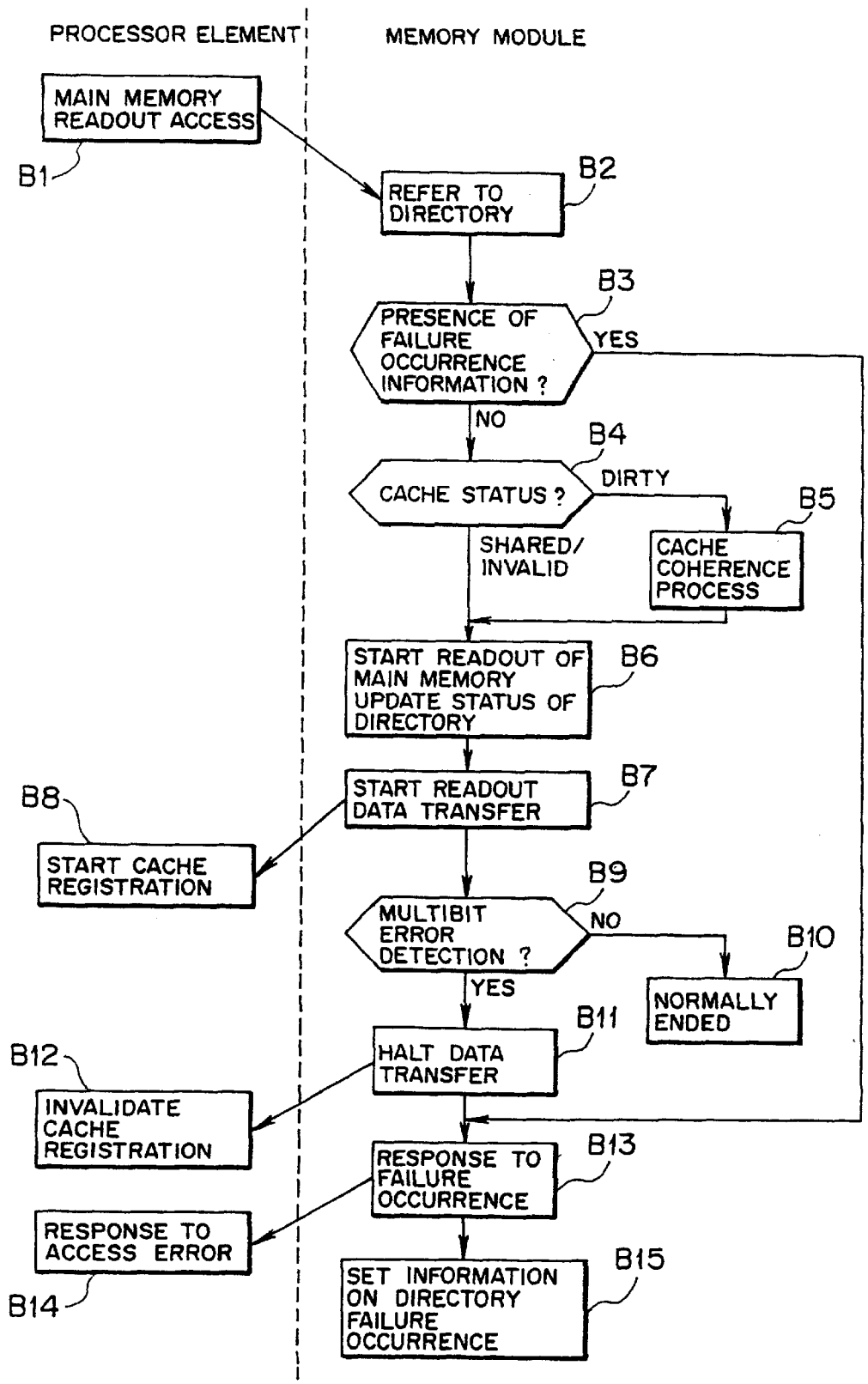
FIG. 10 is a flowchart used for explaining the operation of a multiprocessor according to the second embodiment of the present invention.

In the above-mentioned arrangement, the operation of the multiprocessor 30-2 according to the second embodiment of the invention will be described below using the flowchart shown in FIG. 10.

That is, when a read access from the processor 33a in the processor module 31-1, for example, causes a cache mishit, the cache control module 33c provides a read access of data stored in the main storage element 34a to the memory module 34 via the cache snoop bus 36 (step B1).

The access control module 34c in the memory module 34 refers to the directory entry of a cache line including an access address on the directory memory 34b (step B2).

In this case, when failure occurrence information is not set to the failure identification field 34b-3 forming a directory entry and the cache memory 33b is in a shared state or invalid state, the access control module 34c starts reading data from the main storage element 34a. The access control module 34c further updates the status of the directory memory 34b and then transfers readout data on the cache snoop bus 36 (from step B3 to steps B4, B6 and B7 via NO route).

When failure occurrence information is not set to the failure identification field 34b-3 forming the directory entry and the status of the cache memory 33b is in a dirty state, reading the main storage element 34a is started after the cache coherence process (steps B4 and B5) while the status of the directory memory 34b is updated (step B6). Then, transferring the readout data onto the cache snoop bus 36 is started (step B7).

As described above, when the transfer operation of the readout data starts, the cache control module 33c starts registering the readout data to the cache memory 33b (step B8).

When detecting a multibit error in the readout data, the memory module 34 stops the readout data transfer onto the cache snoop bus 36 (from step B9 to step B11 via YES route). Then the memory module 34 returns a failure occurrence response to the cache control module 33c (step B13).

The cache control module 33c invalidates the registration to the cache memory 33b (step B12) while it sends back an access error response to the processor 33a being an access source (step B14).

Thereafter, the error-identification-information storage control unit 34c-2 in the access control module 34c sets failure occurrence information to the failure identification field 34b-3 of the directory entry corresponding to the access address in a failure state (step B15).

Since failure occurrence information is set to the failure identification field 34b-3 of the directory entry when an access to the failure occurrence address occurs, the access inhibiting unit 34c-3 inhibits the address in the failure state address from being accessed by instantaneously returning a failure occurrence response to the access source at the access time.

That is, in the reference with the directory entry in the step B2, when failure occurrence information is set to the failure identification field 34b of the directory entry in the access address or when the address of a current readout access to the main storage element 34a is a cache line where a multibit error is detected by the former access to the main storage element 34a, the access inhibiting unit 34c-3 returns instantaneously a failure occurrence response without reading from the main storage element 34a (from steps B3 to step B13 via YES route).

Thereafter, the cache control module 33b which has received the failure occurrence response returns an access error response to the processor 33a being an access source (step B14).

As described above, in the multiprocessor 30-2 according to the second embodiment of the present invention, the error-identification-information storage control unit 34c-2 stores controllably the hard error occurrence identification information onto the corresponding cache line of the directory memory 34b when a hard error in the main storage element 34a is detected in the process of reading data stored in the main storage element 34a while the access inhibiting unit 34c-3 inhibits access to the cache line having the hard error occurrence identification information. Hence, there is the advantage in that since a defective main storage element 34a is not accessed again, the degradation of the access performance to a normal main storage element 34a can be suppressed.

Furthermore, the error-identification-information storage control unit 34c-2 can return an error response prior to reading from the main storage element 34a by recording failure occurrence information to the directory entry on the directory memory 34b at a failure detecting operation when access occurs again to the cache line which is in an error occurrence state during a reading operation of the main storage element 34b. As a result, the process time for which the error response is sent back can be shortened. In addition, it is unnecessary to update the status of the directory entry on the directory memory 34b and to cancel the registration to the cache memory 33b, so that the device process is simplified.

Furthermore, there is the advantage in that since it is not needed to maintain the cache coherence to access after occurrence of a hard error in the mains storage element 34a, the storage element for maintaining the initial state of the directory is eliminated, whereby the device configuration can be simplified.

(d) Explanation of Third Embodiment

Figure 11:
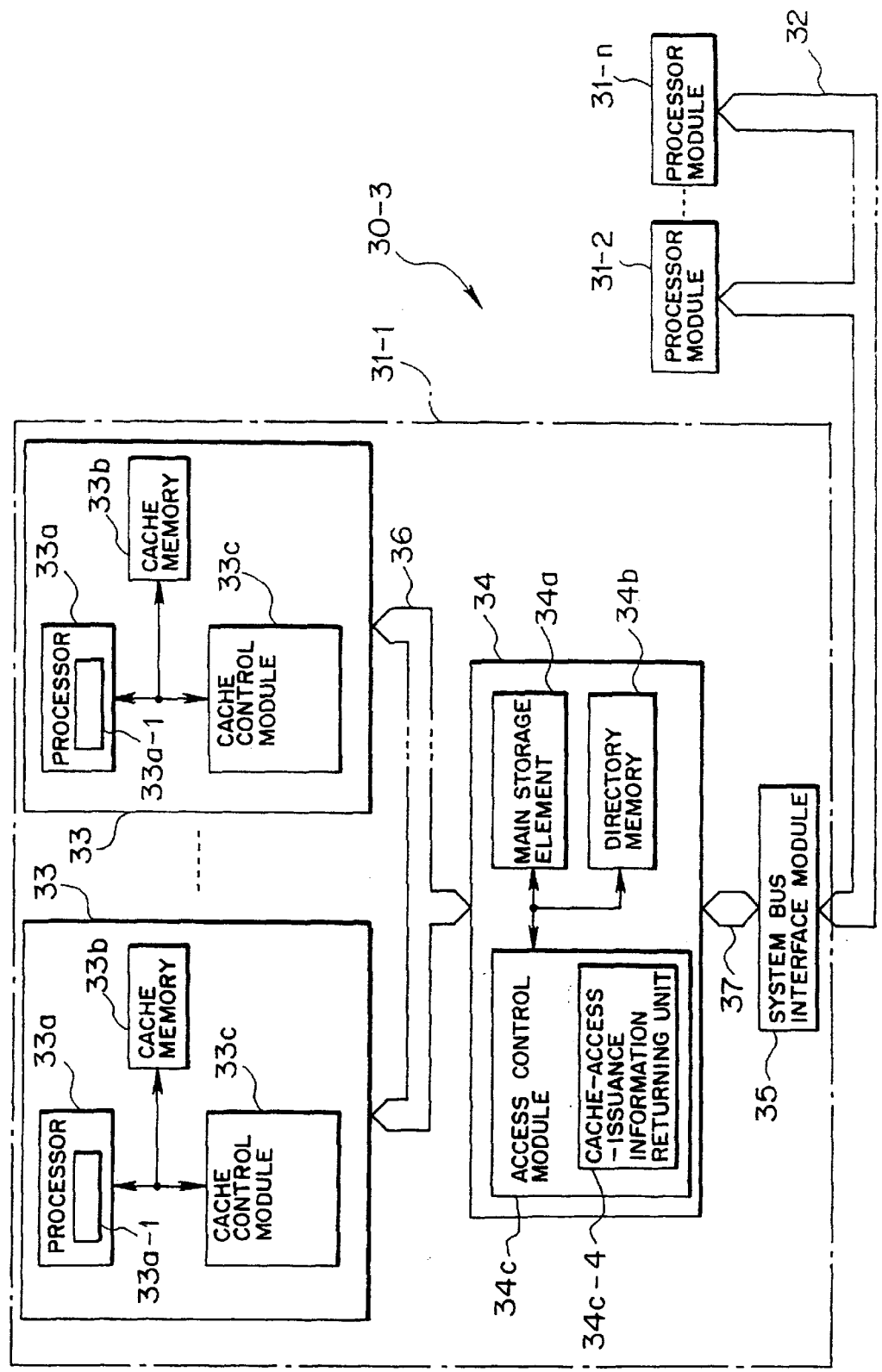
FIG. 11 is a block diagram showing a multiprocessor according to the third embodiment of the present invention.

FIG. 11 is a block diagram showing the multiprocessor according to the third embodiment of the invention. The multiprocessor 30-3 shown in FIG. 11 differs from that (numeral 30-1) of the first embodiment in that a cache-access-occurrence information returning unit 34c-4 is arranged in the memory module 34 and that the processor 33a includes a timer circuit 33a-1. In FIG. 11, the same numerals as those in FIG. 5 represent like elements.

The timer circuit 33a-1 counts the elapsed time between the time an access signal is transmitted to the memory module 34 and the time a response signal is received therefrom and then outputs a time-out signal when the response signal is received after the elapsed time counted has passed a predetermined time-out time. The timer circuit 33a-1 has, for example, the configuration shown in FIG. 12.

That is, the timer circuit 33a-1 shown in FIG. 12 consists of a decoder (DEC) 51, a timer sequencer (T-SEQ) 52, a counter (CNT) 53 and a pulse selecting circuit (MPX) 54.

The decoder 51 decodes the response signal acting as bus command information input from an access source via the cache snoop bus 36 or the system bus 32.

In concrete, the decoder 51 receives a memory store completion response command ST-CMP, a dedicated TIME command for changing the time-out time (to be described later), or a dedicated value change field in the remote cache command C-PG, via the cache snoop bus 36, and then outputs respectively the decode information on those receive signals as st-cmp, time or pg-with-time.

The time sequencer 52 sets variably and controllably the time-out value counted by the counter 54 based on the response signal from the decoder 51 and then controls the status of the counter 53.

The counter 53 counts the elapsed time (response wait time) between the time an access signal is transmitted to the memory module 34 and the time a response time is received therefrom and then outputs the time-out signal to the timer sequencer 51 when the response wait time has passed a predetermined time-out time controllably set by the timer sequencer 52.

Further, the pulse selecting circuit 54 sets variably the time-out value counted by the counter 53 to Ta or Tb, based on the control signal input from the time sequencer 52. The pulse selecting circuit 54 consists, in detail, of a NOT circuit 54a, an AND circuit 54b and 54b, and an OR circuit 54d.

The time-out time Ta counted by the counter 53 is set to a value larger than the maximum time taken to receive ST-CMP after issuing the M-ST command. The time-out time Tb is set to a value larger than the maximum time taken to receive PG-CMP after issuing the C-PG command and to satisfy Ta<Tb.

The AND circuit 54b receives the pulse signal "a" for setting the time-out value Ta as well as the inverted signal of the control signal from the timer sequencer 52. The AND circuit 54 receives the pulse signal "b" for setting the time-out value Tb as well as the control signal from the timer sequencer 52.

In such an operation, when the control signal is an "L" level signal, the OR circuit 54d outputs the pulse signal "a" being an output signal (pulse) from the pulse selecting circuit 54. When the control signal is an "H" level signal, the OR circuit 54 outputs the pulse signal "b".

In other words, when the timer sequencer 52 outputs a control signal in an "L" level, the counter 53 sets the time-out value to Ta. When the timer sequencer 52 outputs a control signal in an "H" level, the counter 53 sets the time-out value to Tb.

Figure 13:
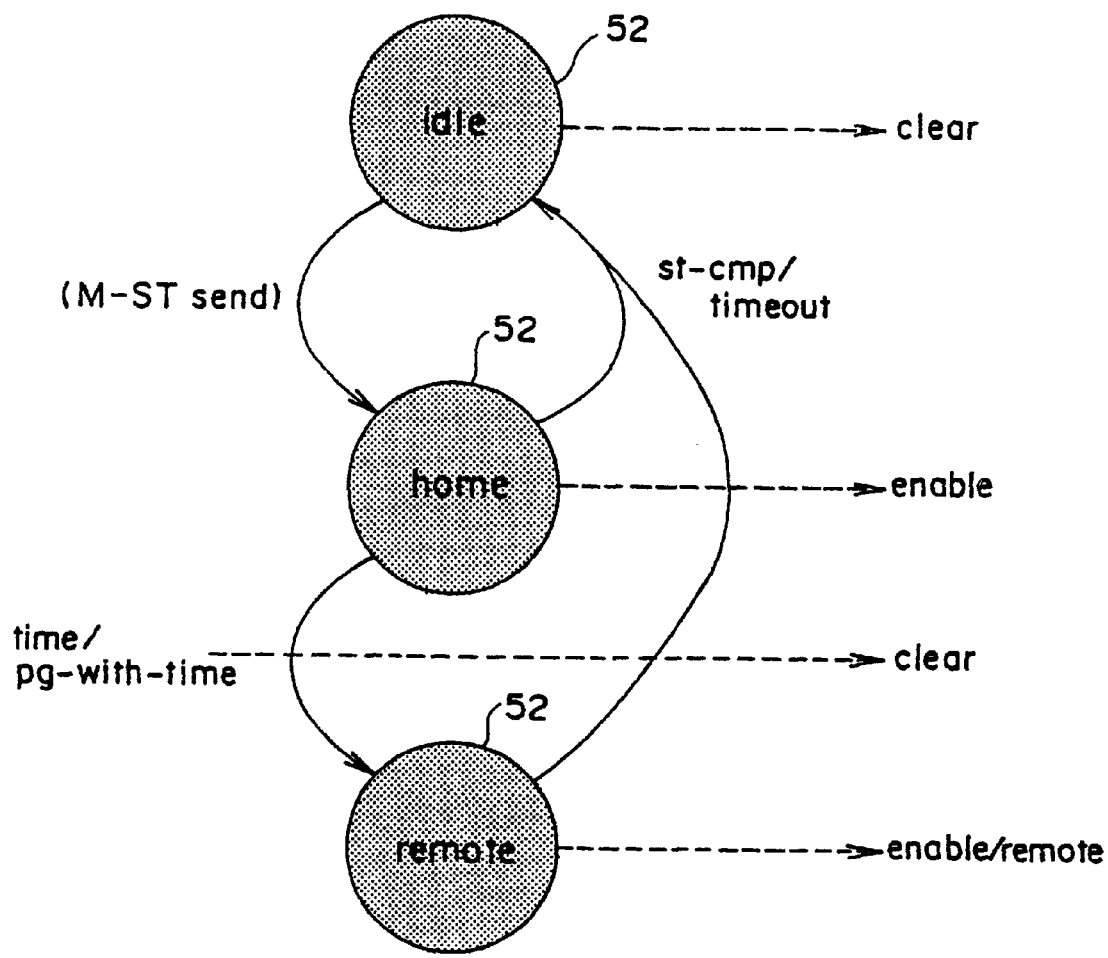
FIG. 13 is a diagram showing the status transition of a multiprocessor according to the third embodiment of the present invention.

The status transition of the timer sequencer 52 is shown, for example, in FIG. 13. That is, the timer is initially in an inoperable state (in an inoperable state of the counter 53). The clear signal is asserted to the counter 53 (in the idle state in FIG. 13).

In the idle state, when the M-ST command is transmitted to, for example, the memory module 34 as an access source, the timer sequencer 52 asserts an enable signal to the counter 53. At this time, since the timer sequencer 52 does not assert the remote signal to the pulse selecting circuit 54, it selects the pulse signal "a". In such an operation, the timer counting operation starts by setting the time-out time to Ta (in the home state in FIG. 13).

When the decoder 52 asserts the decode signal st-cmp signal in the home state, the situation transits to the original idle state. When the time signal or pg-with-time signal is asserted, the counter 53 is cleared by asserting the CLEAR signal to the counter 53.

Thereafter, the enable signal is asserted to the counter 53. At this time, when the timer sequencer 52 asserts the remote signal to the pulse selecting circuit 54, the pulse signal "b" is selected. As a result, the counter 53 resumes its elapsed time counting operation with the time-out value Tb (the remote state in FIG. 13).

In other words, the timer circuit 33a-1 can count the response wait time with the time-out value sufficient to access the cache device by resetting the time-out value from Ta to Tb.

In the remote state, when the decoder 52 asserts the st-cmp signal, the situation is changed to the original state.

Furthermore, in the access control module 34c shown in FIG. 11, when access to cache memory 33b to maintain the cache coherence occurs in the memory module accessed from the processor 33a, the cache access issuance information returning unit 34c-4 returns the event to the processor 33a being an access source.

When a response to the effect that access to the cache memory 33b has occurred is returned from the access control module 34c to the processor 33a being an access source, the dedicated command time indicating the event is returned. In addition, the event can be returned with the dedicated timer value change field pg-with-time added to the remote cache command C-PG sent to the cache memory 33b.

The identification information on the processor being an access source is added to the timer value change field pg-with-time. The C-PG command is transmitted to the cache memory 33b and the processor 33a being an access source. In such an operation, the effect that access to the cache memory 33a has occurred can be returned to the processor 33a being an access source.

By preparing a command format creating mechanism or bus command sequencer according to the system, the cacheaccess-issuance information returning unit 34c-4 can creates the timer value change command TIME, the C-PG command including a timer-value change designation field pg-with-time, or the like.

Figure 14:
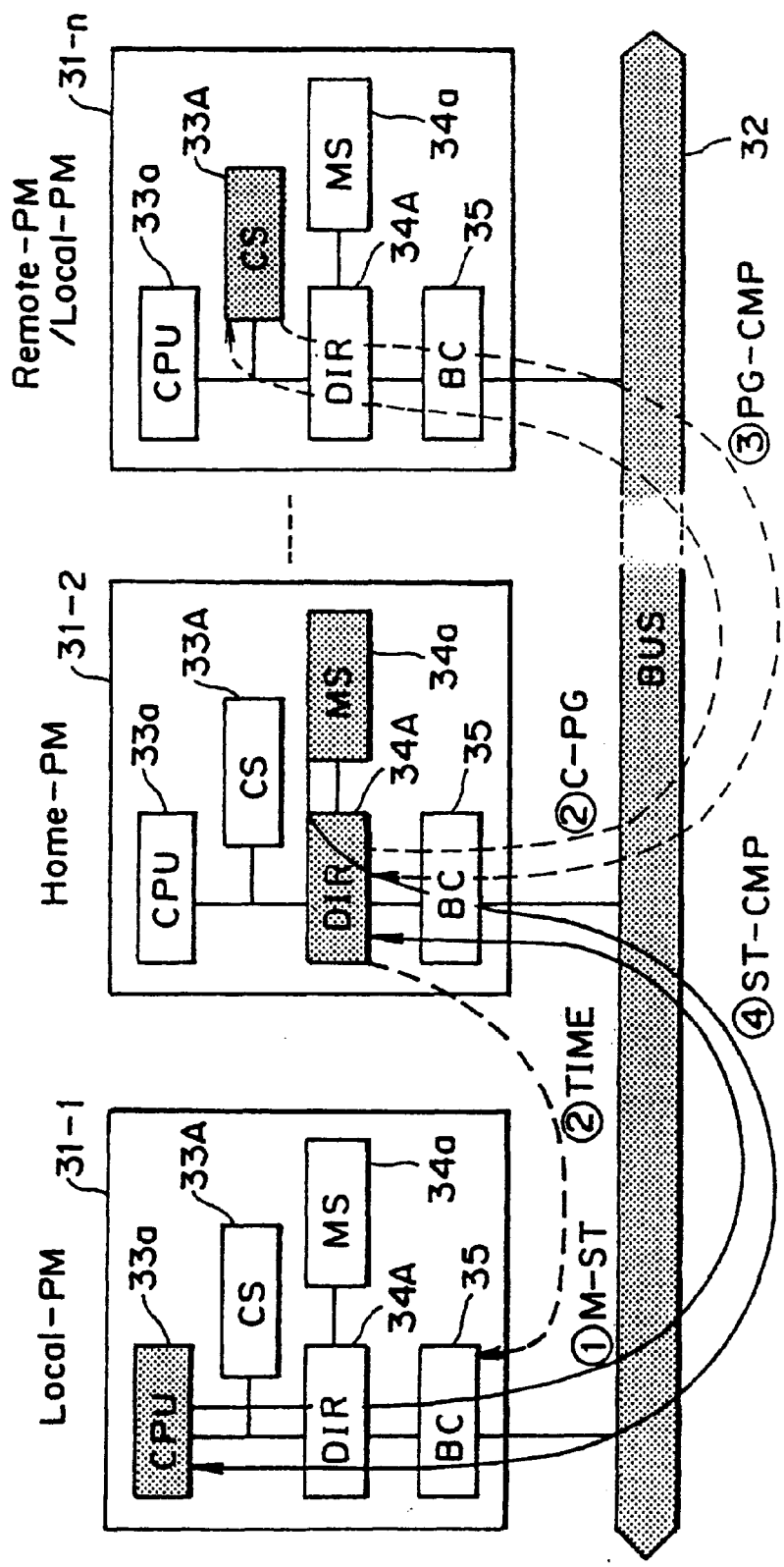
FIG. 14 is a block diagram used for explaining the command sequence of a multiprocessor according to the third embodiment of the present invention.

FIGS. 14 and 26 are block diagrams each used for explaining the command sequence in the multiprocessor 30-3. In the multiprocessor 30-3 shown in FIGS. 13 and 16, each of processor modules 31-1 to 31-n includes a processor (CPU) 33a, a cache unit (CS) 33A, a directory unit (DIR) 34A, a main storage element (MS) 34a acting as a main storage memory, and a system bus interface module 35 acting as a system bus control mechanism (in FIGS. 14 and 16, a plurality of processor elements 33, the cache snoop bus 36 and the internal bus 37 are not illustrated).

The cache unit 33A is formed of the cache memory 33b and the cache control module 33c, shown in FIG. 11. The directory unit 34A is formed of the directory memory 34b and the access control module 34c.

In the above-mentioned arrangement, the operation of the multiprocessor 30-3 according to the third embodiment of the invention will be described below by referring to FIGS. 14 to 17.

In the following explanation, for the purpose of convenience, the processor module 31-1 being an access source to the main storage element 34a is called a local PM; the processor module 31-2 in which the main storage element 34a to be accessed exists is called a home PM; and the processor module 31-n which is caching the main storage element 34a is called a remote PM.

Figure 15:
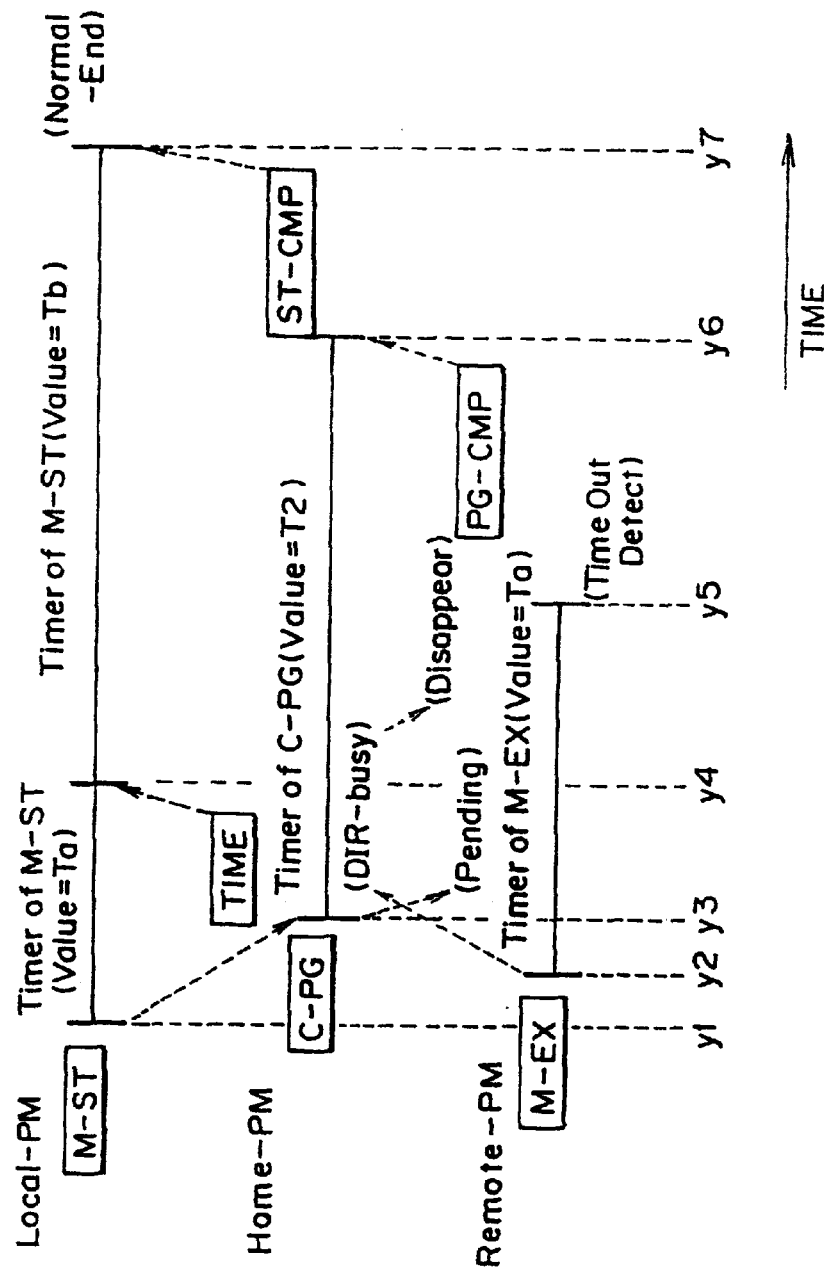
FIG. 15 is a timechart used for explaining the operation of a multiprocessor according to the third embodiment of the present invention.

First, the cache-access-issuance information returning unit 34c-4 in the home PM 31-2 operates as shown in FIGS. 14 and 15 when the dedicated command time is used to notify that access to the cache memory 33b has occurred.

That is, as shown in FIG. 14, the processor 33a in the local PM 31-1 issues non-cache memory store command M-ST to the home PM 31-2, for example, the memory address "A" (refer to (1) in FIG. 14). Upon issuing the command, the timer circuit 33a-1 starts its timer counting operation at an access timer value Ta (refer to the time y1 in FIG. 15).

In the home PM 31-2, when the access control module 34c which has received the M-ST command recognizes that the memory address "A" is in a cached state in the remote PM 31-n by referring to the directory memory 34b, it issues the cache purge command C-PG to the remote PM 31-n (refer to (2) in FIG. 14).

Upon issuing the command, the home PM31-2 starts the timer counting operation at the access timer value T2 (the maximum time taken from issuance of the C-PG command to reception of the PG-CMP command). At this time, the directory memory 34b in the home PM 31-2 is in a busy state in units of the line including the memory address "A" (refer to the time y3 in FIG. 15).

Furthermore, the cache-access-issuance information returning unit 34c-4 in the access control module 34c transfers the timer value change command TIME to the local PM31-1 to change the time-out value Ta of the timer circuit 33a-1 in the local PM31-1 simultaneously with the issuance of the C-PG command (refer to (2') in FIG. 14).

In response to the timer value change command TIME, the local PM31-1 changes the access timer value of the M-ST command in the timer circuit 33a-1 from the time Ta to the time Tb, thus resuming the time counting operation (refer to the time y4 in FIG. 15).

Prior to transmitting the cache purge command C-PG, the remote PM31-n which must receive the C-PG command starts a write access to the memory address "A" cached and then issues the cache update notification command M-EX to update the directory memory 34b in the home PM31-2 (refer to y2 in FIG. 15). At the same time, the timer counting operation starts at the access timer value Ta.

While transmitting the M-EX command, the timer circuit 33a-1 of the processor 33a starts its timer counting operation at the access timer Ta (refer to the time y2 in FIG. 15).

The remote PM-n receives the C-PG command from the home PM31-2 after the transmission of the M-EX command. However, the purge process is held (pending) in the remote PM31-n because the cache operation of the same line has been operated.

It is now assumed that the access control module 34c in the home PM 31-2 which has received M-EX commands finds the busy state of the line corresponding to the memory address "A" by retrieving the directory memory 34b and then tries to send a response about the event, but that the event cannot be returned to the remote PM31-n being an access source because of some factor (disappear).

In that case, since the remote PM31-n holds the purge process, the remote PM31-2 cannot respond to the M-ST command. Since the relation of Ta<T2<Tb holds, the access timer to the M-EX command in the remote PM31-n ends its counting operation at the earliest stage (refer to the time y5 in FIG. 15).

Because of the time-out detection after a period Ta of time, the process to the M-EX command ends abnormally. For that reason, the purge process which is held to execute the same line caching operation in the remote PM31-n is performed. Thereafter, when the purge process finishes, the cache purge completion response command PG-CMP is issued to the home PM31-2 being the C-PC command issuing source (refer to (3) in FIG. 14 and the time y in FIG. 15).

The home PM31-2 which has received the PG-CMP command writes data designated with the M-ST command at the memory address "A" in the main storage element 34b. The content of the directory memory 34b is changed from the reference state of the remote PM31-n to the non-cache state.

Thereafter, the memory store completion response command ST-CMP is issued to the local PM 31-1 being the M-ST command issuing source (refer (4) in FIG. 14 and the time y7 in FIG. 15).

As a result, the command sequence for the M-ST memory access is normally completed, regardless of the time-out of the M-EX command.

Figure 16:
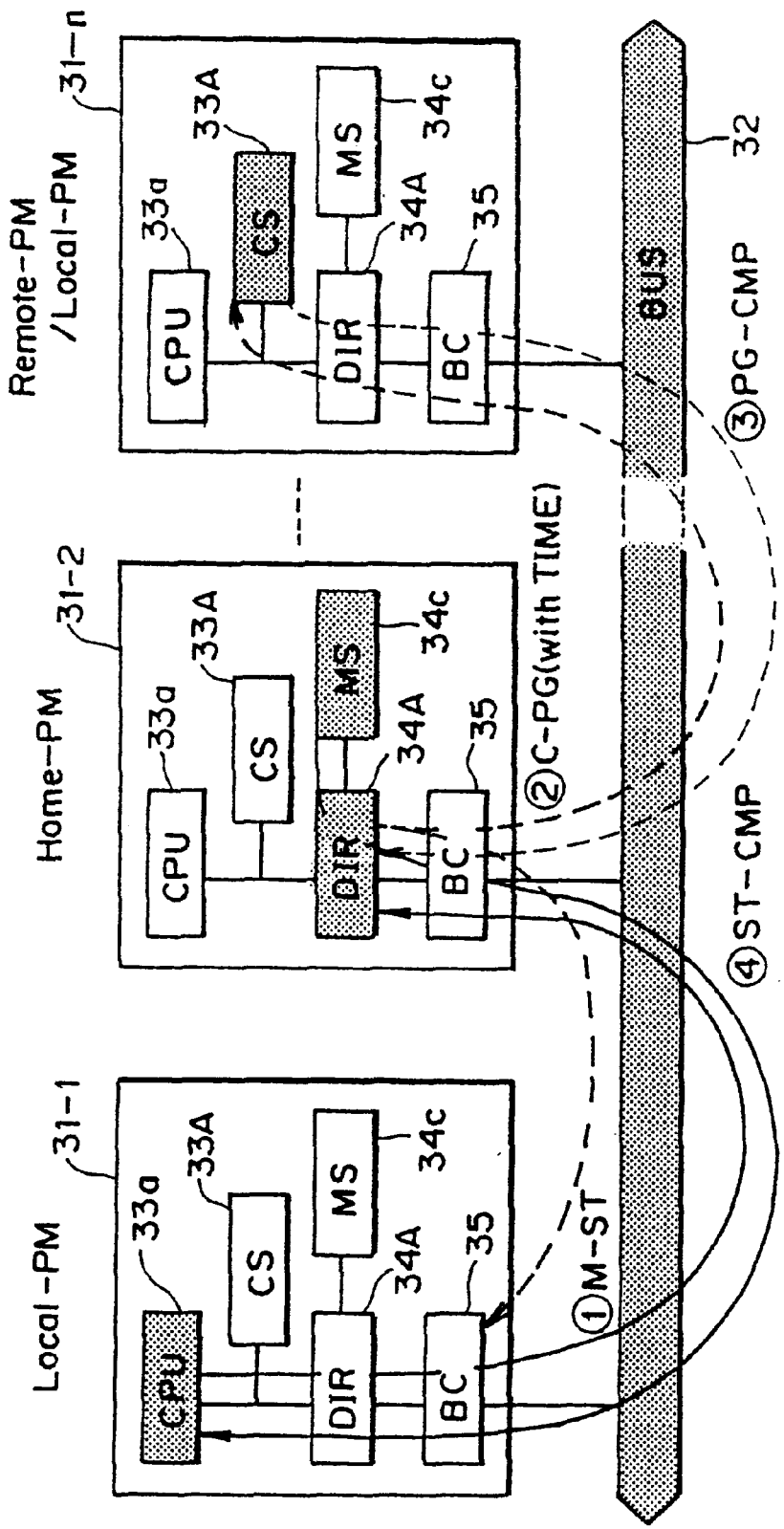
FIG. 16 is a block diagram showing the function of a multiprocessor according to the third embodiment of the present invention.

In the same case as the above-mentioned case, when the dedicated field for the cache access command is used to notify that access to the cache memory 33b has occurred in the cache-access-issuance information returning unit 34c-4 in the home PM 31-2, the processor 33a as an access source is designated in the dedicated field of the C-PG command as the cache access command, as shown in FIG. 16.

Figure 17:
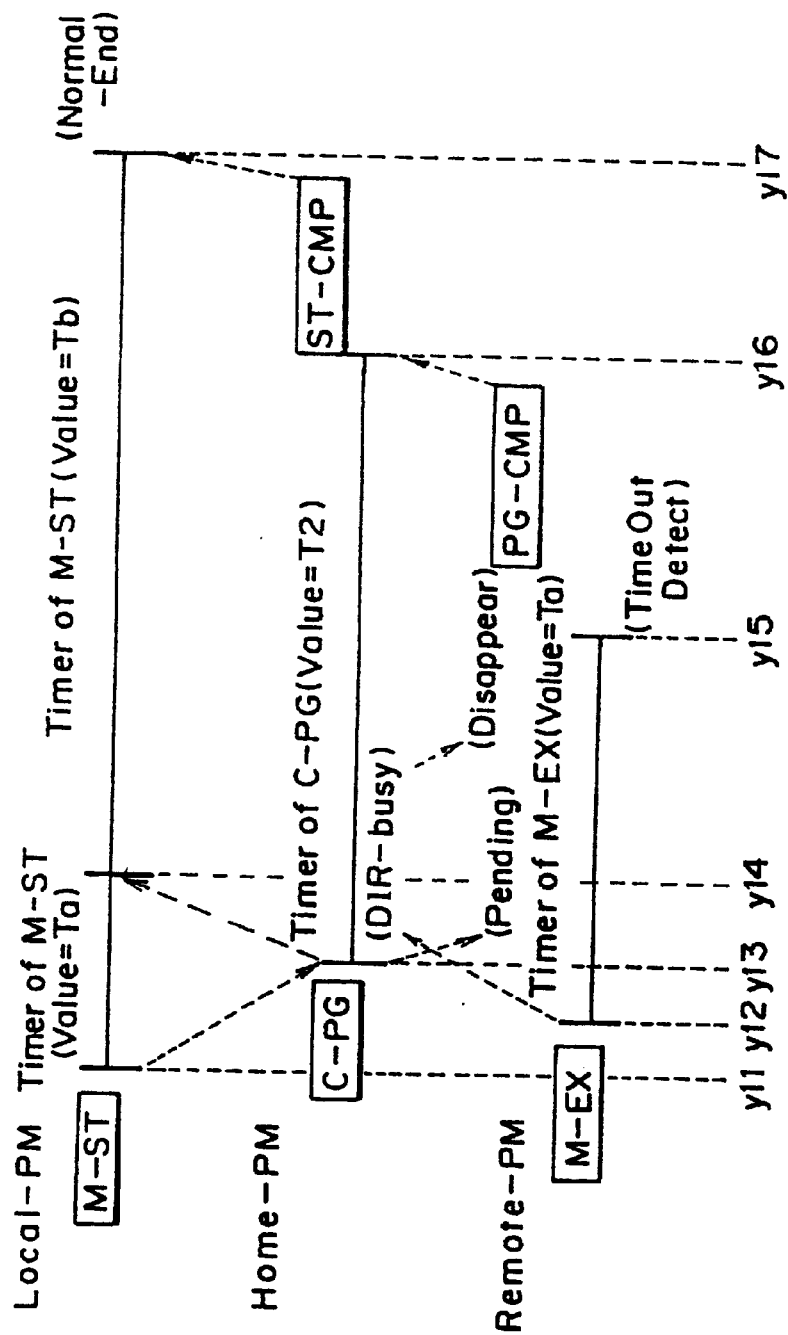
FIG. 17 is a timechart used for explaining the operation of a multiprocessor according to the third embodiment.

The C-PG command is transferred to the processor 33a as an access source, together with the cache memory 33b to be cached (refer to (2) in FIG. 16 and the time y13 in FIG. 17). The processor 33a being an access source which has received the C-PG command designating in the dedicated field changes the timer value of the timer 33a-1 into the response wait timer value (time-out value) Tb corresponding to the time needed sufficiently for access to the cache memory and then resumes its timer counting operation (refer to the time y14 in FIG. 17).

Thereafter, in the same signal sequence as those shown in FIGS. 14 and 15, the command sequence for the M-ST memory access can be normally ended regardless of the time-out of the M-EX command (refer to (1) to (4) in FIG. 16 and the time y11 to the time y17 in FIG. 17).

In the sequence shown in FIG. 14 or 16, when the cache-access-issuance information returning unit 34c-4 in the home PM 31-2 notifies that access to the cache memory 33b has occurred, the process under the M-EX command detected by the remote PM 101-n may be abnormally ended. It can be specified that the cause results from some factor being between the remote PM101-n and the home PM101-2.

As described above, according to the multiprocessor according to the third embodiment of the present invention, when access to the cache memory 34b occurs in the main storage element 33a accessed, the cache-access-issuance information returning unit 34c-4 notifies the processor 33a as an access source of the event. Then in response to the event, the processor 33a as an access source can perform its recounting operation by changing the count time of the elapsed time for which the timer circuit 33a-1 outputs the time-out signal into a response wait timer value corresponding to the sufficient time needed for access to the cache memory 33. Hence, the following advantages can be provided. The failure occurrence spot can be certainly specified. The time-monitoring operation can be performed with high failure spot specifying accuracy, regardless of various access interferences within the remote cache memory 33b which may occur in access to the main storage element 34a acting as a shared memory device in the distributed and shared memory system employing, for example, the directory scheme. This feature allows the certain recovery operation to be obtained at a failure occurrence.

In the above-mentioned embodiment, the timer circuit 33a-1 is arranged in the processor. According to the present invention, the timer circuit 33a-1 may be arranged at other spots in the processor module.

(e) Explanation of Fourth Embodiment

Figure 18:
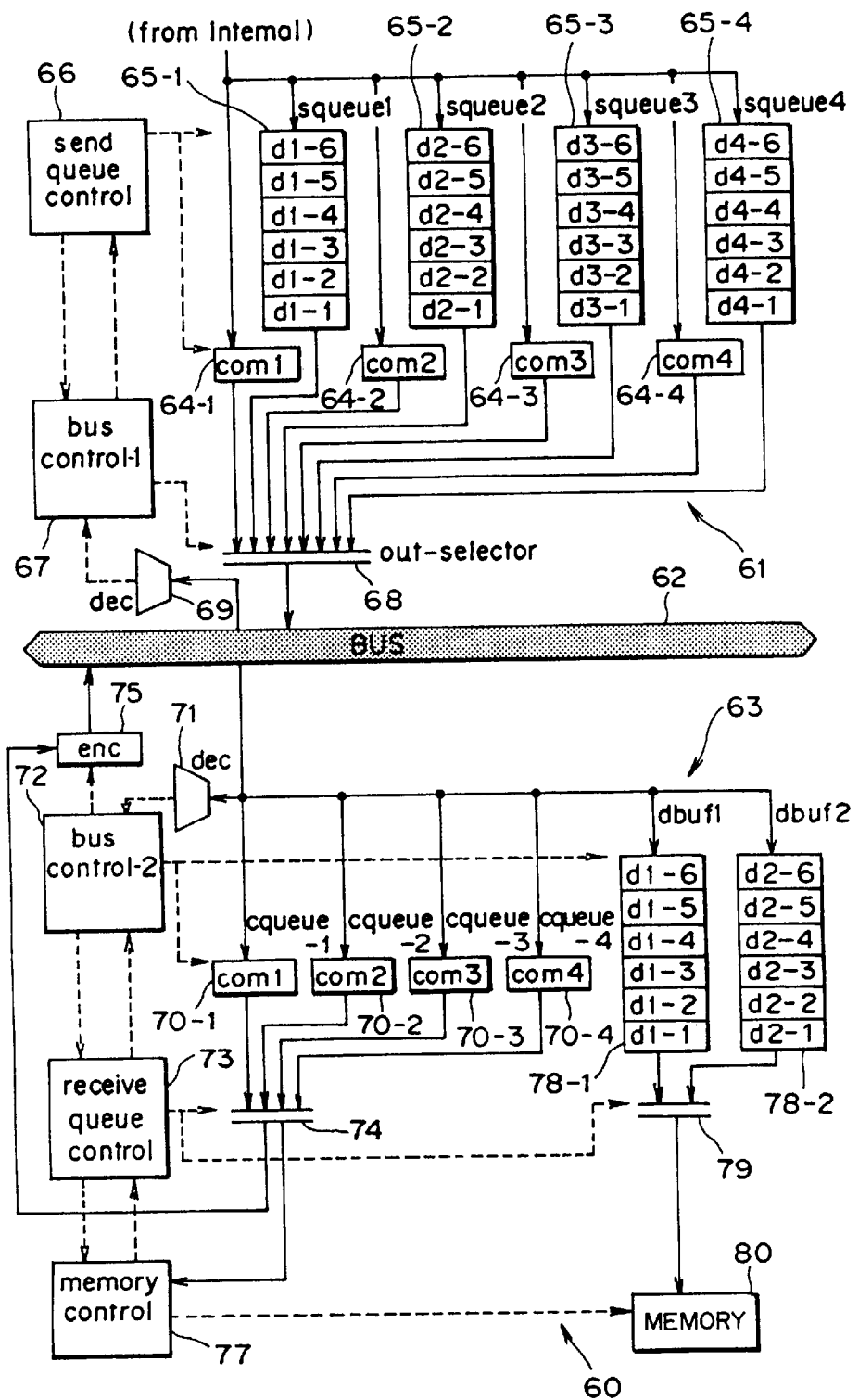
FIG. 18 is a block diagram showing a data transfer system according to the fourth embodiment of the present invention.

FIG. 18 is a block diagram showing the data transfer system according to the fourth embodiment of the present invention. Referring to FIG. 18, the data transfer system 60 can be used for the system bus 32, the cache snoop bus 36 or the internal bus 37 acting as the split bus in the multiprocessors 30-1 to 30-3. The data transfer system 60 consists of a transmitter 61, a split bus 62 and a receiver 63.

The split bus 62 is arranged between the transmitter 61 and the receiver 62 to perform, for example, packet-with-data communications therebetween. In the packet-with-data communications, the bus use right is transferred to other devices between the time the transmitter 61 sends a request to the receiver 62 and the time it receives a response, whereby a plurality of processes can be performed concurrently (in a multiplexing mode). This feature leads to using the bus with high-use efficiency.

The transmitter 61, which transmits packets with data to the split bus 62, is formed of CPUs such as processors 33a and input/output devices (I/O devices) in each of the multiprocessors 30-1 to 30-n described above. In this case, the packet with data described above is formed of, for example, a memory write bus command.

Moreover, the receiver 63 receives the packet with data sent from the transmitter 61 via the split bus 62. The receiver 63 consists of memory devices such as the memory modules in each of the multiprocessors 30-1 to 30-3.

Figure 27:
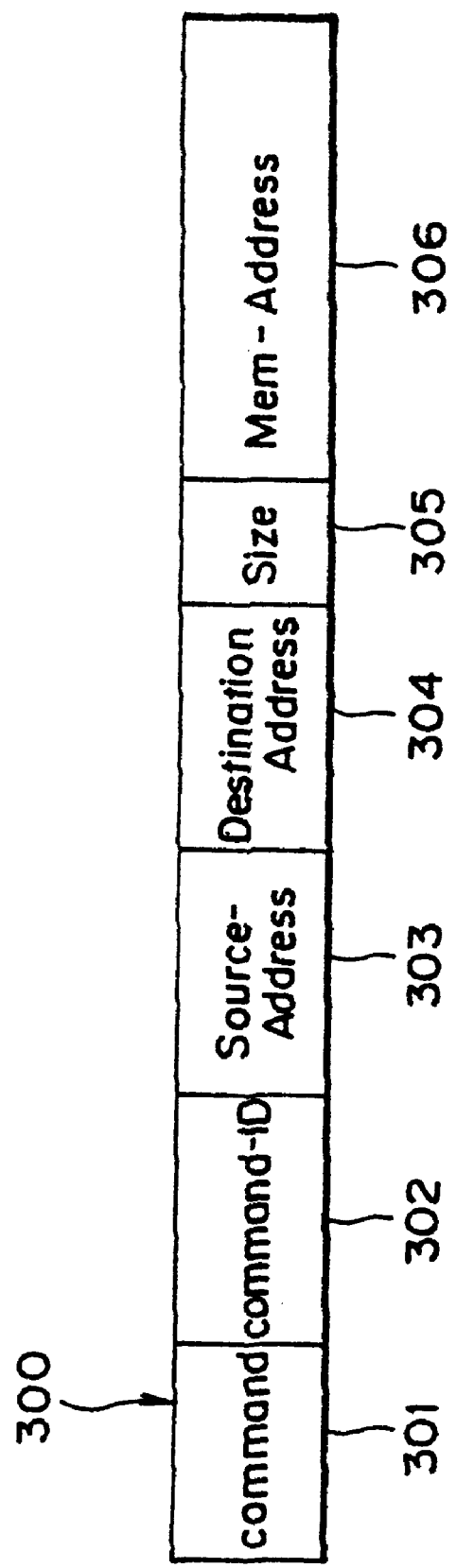
FIG. 27 is a diagram showing the format of a command forming a data packet with commands.
Figure 28:
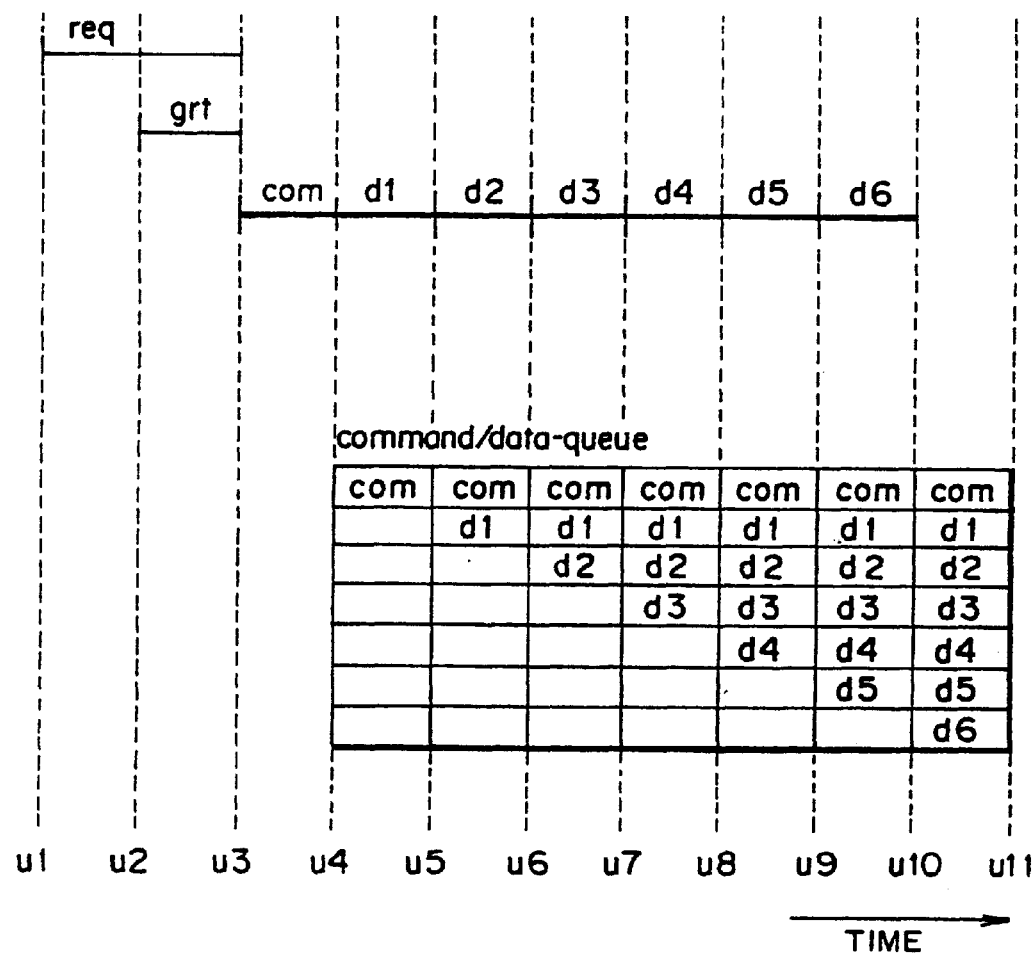
FIG. 28 is a timechart used for explaining the operation of the data transfer system shown in FIG. 28.
Figure 29:
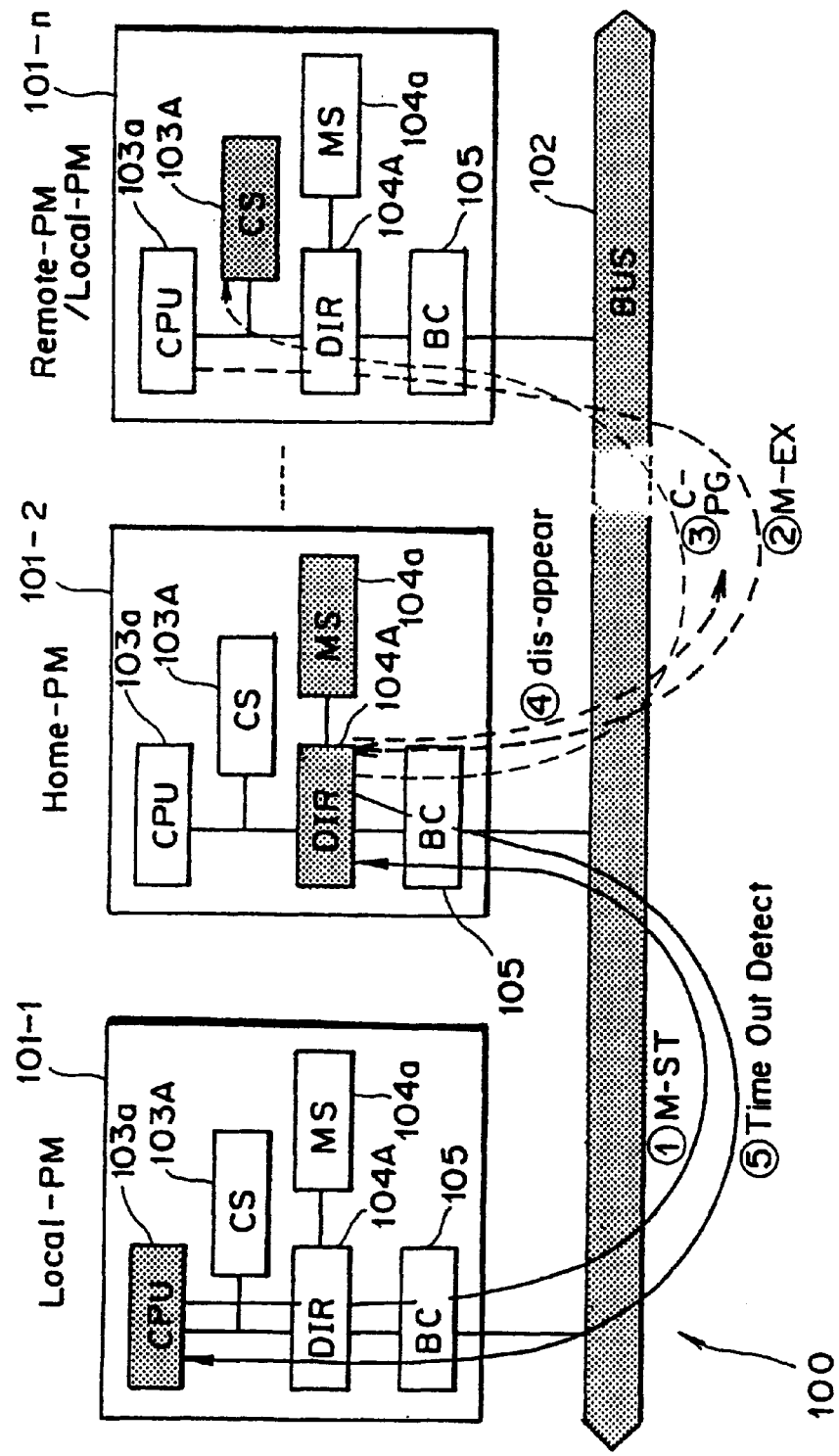
FIG. 29 is a block diagram used for explaining the operation of the data transfer system shown in FIG. 26.
Figure 30:
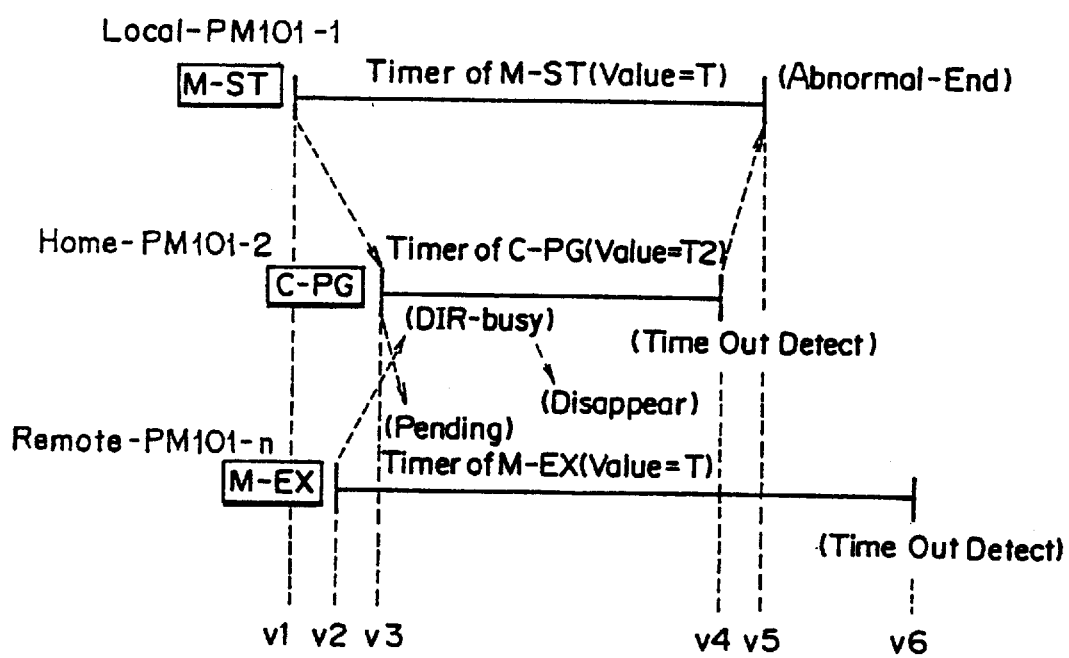
FIG. 30 is a timechart used for explaining the operation of the data transfer system shown in FIG. 26.

Like the data packet shown in FIG. 26, a data transfer request including a memory write command to the receiver acting as a main memory can be handled as the data packet with a command from the transmitter 61 acting as the CPU. The command forming a data packet with data such as the memory write command is formed in the format shown in FIG. 27.

The transmitter 61 consists, in detail, of a plurality of (e.g. four) transmission-side command queues (com1 to com4), a transmission-side data queues (squeue1 to squeue4) 65-1 to 65-4, a send queue control unit 66, a bus control unit (bus control-1) 67, an output selector (out selector) 68 and a decoder 69.

Each of the transmission-side command queues 64-1 to 64-4 holds a command forming a packet with data to be transmitted. The transmission-side data queues 65-1 to 65-4 are arranged corresponding to the transmission-side command queues 64-1 to 64-n, respectively. The transmission-side data queues 65-1 to 65-4 are arranged to the transmission-side command queues 6-1 to 64-n, respectively. Each of the transmission-side data queues 65-1 to 65-4, which holds data forming a packet with data, consists of, for example, flip-flops or random access memories.

Further, the queue control unit 66 stores controllably commands to the transmission-side command queues 64-1 to 64-4 and data to the transmission-side data queues 65-1 to 65-4. The output selector 68 outputs selectively either the commands from the transmission-side command queues 64-1 to 64-4 or data from the transmission-side data queues 65-1 to 65-4 to the split bus 62.

In other words, when a data transfer request occurs from an internal circuit in the transmitter 61, the queue control unit 66 searches for a free command queue among the transmission-side queues 64-1 to 64-4 and the transmission-side data queues 65-1 to 65-4. Then the queue control unit 66 stores the command into the free transmission-side command queues 64-1 to 64-4 while it stores controllably the data into the free transmission-side data queues 65-1 to 65-4.

The bus control unit 67 outputs a select signal to select the command output from the output selector 68 when a command is stored into the transmission-side command queues 64-1 to 64-4 and data corresponding to the command is stored into the transmission-side command queues 64-1 to 64-4, under control of the queue control unit 66. The bus control unit 67 functions as a transmission-side selector control unit.

That is, the bus control unit 67 selects a bus request among four bus requests stored in the transmission-side command queues 64-1 to 64-4 when the bus use is prepared by storing a command queue and data are stored into a free queue under control of the queue control unit 66. At the same time, the bus control unit 67 outputs a bus use right capture request to a bus arbitrating device (not shown) and then outputs a select signal to the output selector 68 upon a capture of the bus use right, thus sending the selected command queue onto the split bus 62, preceding the data queue.

In other words, in the transmitter 61, when a transmission request of a packet with data occurs internally, the bus control unit 67 captures the bus use right and then transmits only a packet in which bus command information including a transfer operation code, a transfer data size, and the like is defined, to the receiver 63.

In this case, when the bus arbitrating device (not shown) controls the capture/cancellation of the bus use right, a dedicated signal line which notifies of permission or prohibition of the bus use, for example, can be arranged between devices connected via the split bus 62.

Furthermore, the decoder 69 decodes the signal transmitted from the receiver 63 via the split bus 62 and then output the outcome to the bus control unit 67. In detail, the receiver 63 consists of a plurality of (e.g. four) reception-side command queues (cqueue1 to cqueue4) 70-1 to 70-4, a command decoder (dec) 71, a bus control unit (bus control-2) 72, a receive queue control unit (receive queue control) 73, a memory selector (mem-selector) 74, an encoder (enc, encoder) 75, a memory control unit (memory control) 77, a data buffer (dbuf1, dbuf2) 78-1 and 78-2, a data selector 79, and a memory 80.

Each of the reception-side command queues 70-1 to 70-4 holds the command received via the split bus 62. Each of the data buffers 78-1 and 78-2 holds data received via the split bus 62. They functions as the reception-side data queue.

Furthermore, the decoder 71 checks for the command received via the split bus 62 and checks for the status of the reception-side command queues 70-1 to 70-4. The decoder 71 functions as a checking unit.

The bus control unit 72 stores controllably the receive command into the free reception-side command queues 70-1 to 70-4 based on the results on checking for the status of the reception-side command queues 70-1 to 70-4 from the decoder 71. The bus control unit 72 functions as a reception-side control unit.

Moreover, the memory selector 74 outputs selectively any one of commands from the reception-side command queues 70-1 to 70-4 to the encoder 75 and the memory control unit 77. The memory selector 74 functions as a reception-side selector.

The receive queue control unit 73 outputs a select signal to select the command output from the memory selector 74 when the commands stored in the reception-side command queues 70-1 to 70-4 are processed. The reception-side selector control unit functions as a reception-side selector control unit.

Furthermore, the encoder 75 transmits a data transmission request command to the transmitter 61 via the split bus 62 to request transmission of data corresponding to the command from the memory selector 74. The encoder 75 functions as a data transmission request command transmitting unit.

The data-transmission-request command transmitted from the encoder 75 to the transmitter 61 is decoded by the decoder 69 on the side of the transmitter 62. The outcome is output to the bus control unit 67.

Thus, the bus control unit 67 selects data stored in the transmission-side data queues 65-1 to 65-4 based on the command transmitted from the encoder 75 to control the output selector 68 to be transmitted to the receiver 63.

In other words, when receiving the data transfer request command from the receiver 63, the bus control unit 67 transfers data corresponding to the data transfer request command to the receiver 63 after a predetermined period of time while the bus use right remains captured at the command transmission from the receiver 63.

The memory control unit 77 receives the command information via the memory selector 74 and then stores controllably data corresponding to the data transmission request command transmitted from the encoder 75 into the memory 80.

Each of the data buffers 78-1 and 78-2 stores temporarily the data packet transferred from the data transfer request command via the bus after a (predetermined) fixed period of time when the encoder 75 has transmitted the data transfer request command. That is, the two buffers 78-1 and 78-2 can store the data packets corresponding to two kinds of commands.

The data packet temporarily stored in the data buffers 78-1 and 78-2 is written on the memory 80 via the data selector 79 under control of the receive queue control unit 73. The capture state in the use right of the split bus is released when the data packet has been received by the data buffers 78-1 and 78-2.

The reception-side command queues 70-1 to 70-4 are by the level of multiplexing arranged in the split bus 62. The data buffers 78-1 and 78-2 are arranged to a level smaller than the level of multiplexing in the split bus 62 (two data buffers 78-1 and 78-2).

In the data transfer system 60 according to the fourth embodiment of the present invention with the above-mentioned configuration, when a transmission request of a packet with data occurs, the transmitter 61 transfers only the packet in which bus command information is defined, to the receiver 63 via the split bus 62. In response to the packet in which bus command information is defined from the transmitter 61, the receiver 63 stores it into the reception-side command queues 70-1 to 70-4 acting as a process wait queue and then transmits the data request command packet to the transmitter 61 at a processable state. Thereafter, when receiving the data request command packet from the receiver 61, the transmitter 61 transfers a desired data packet after a fixed period of time without any bus capture operation. Then the receiver 63 receives the data packet to be transferred from the transmitter 61 after a fixed period of time in a bus capture state. Then when the data packet has been completely received, the split bus is released.

In concrete, when a data transfer request first occurs from the internal circuit in the transmitter 61, the transmission queue control unit 66 searches for free queues among the transmission-side command queues 64-1 to 64-4 and the transmission-side data queues 65-1 to 65-4 to store the command into the free transmission-side command queues and to store the data into the free transmission data queues.

When the bus use is ready by storing the command into the transmission-side command queues 64-1 to 64-4 and the data into the transmission-side data queues 65-1 to 65-4, the transmission queue control unit 66 notifies the bus control unit 67 of the event.

Figure 19:
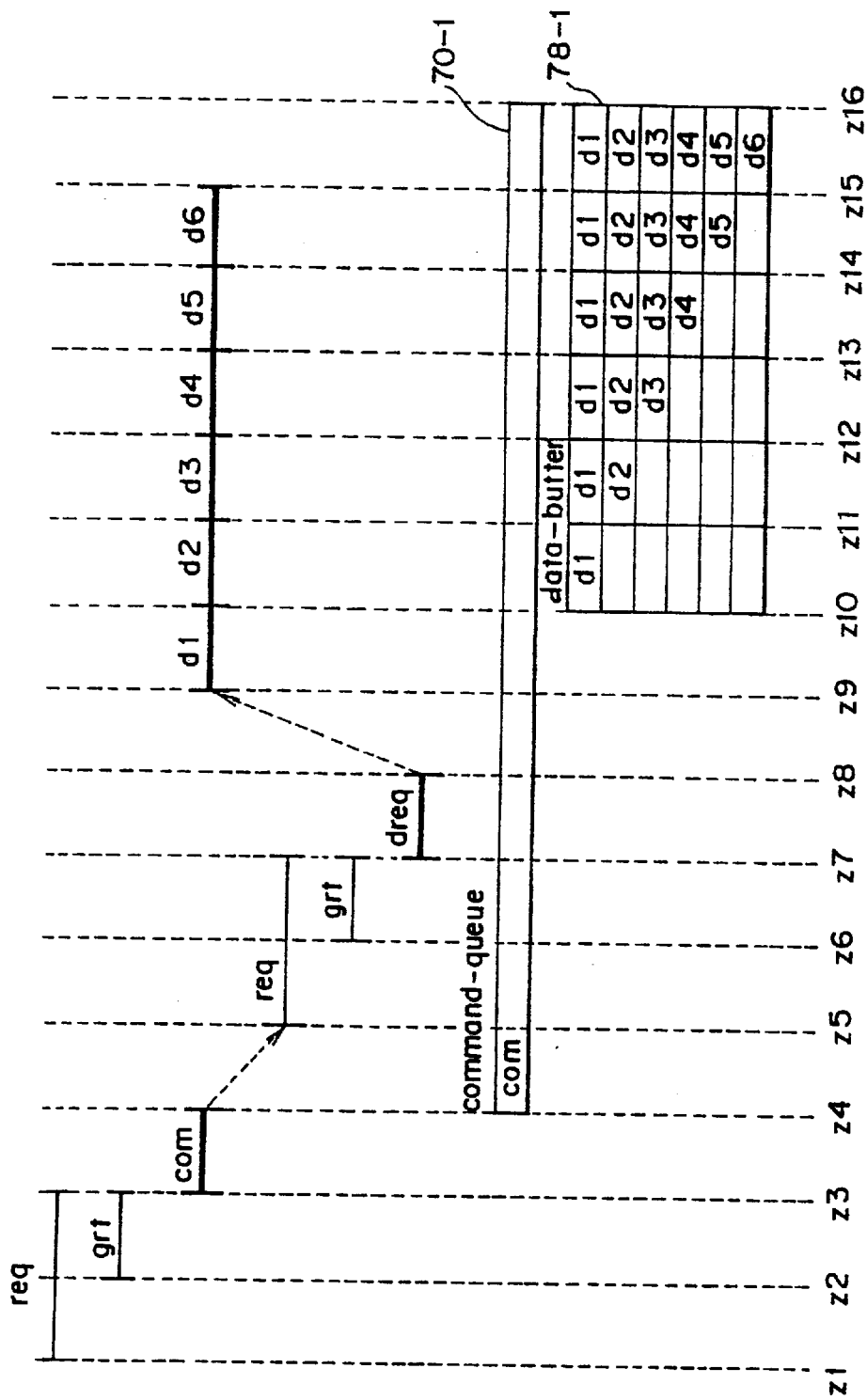
FIG. 19 is a timechart used for explaining the operation of a data transfer system according to the fourth embodiment of the present invention.
Figure 20:
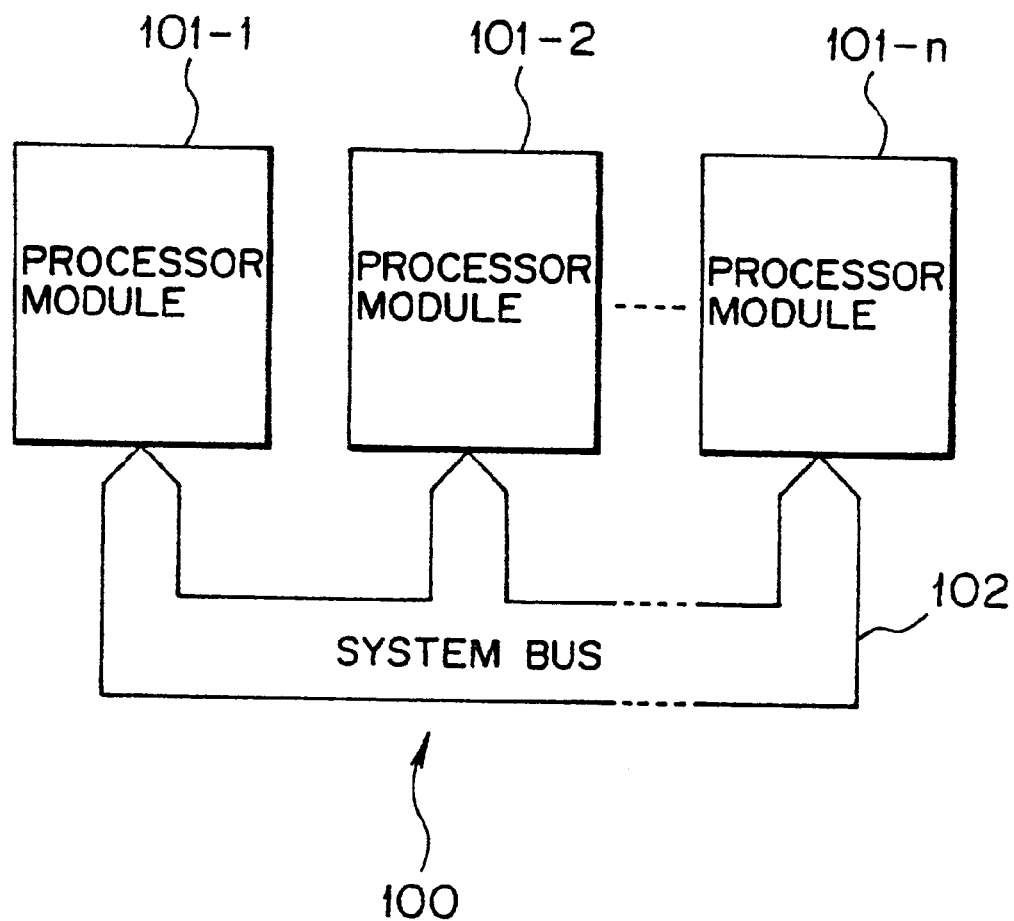
FIG. 20 is a block diagram showing a multiprocessor.
Figure 21:
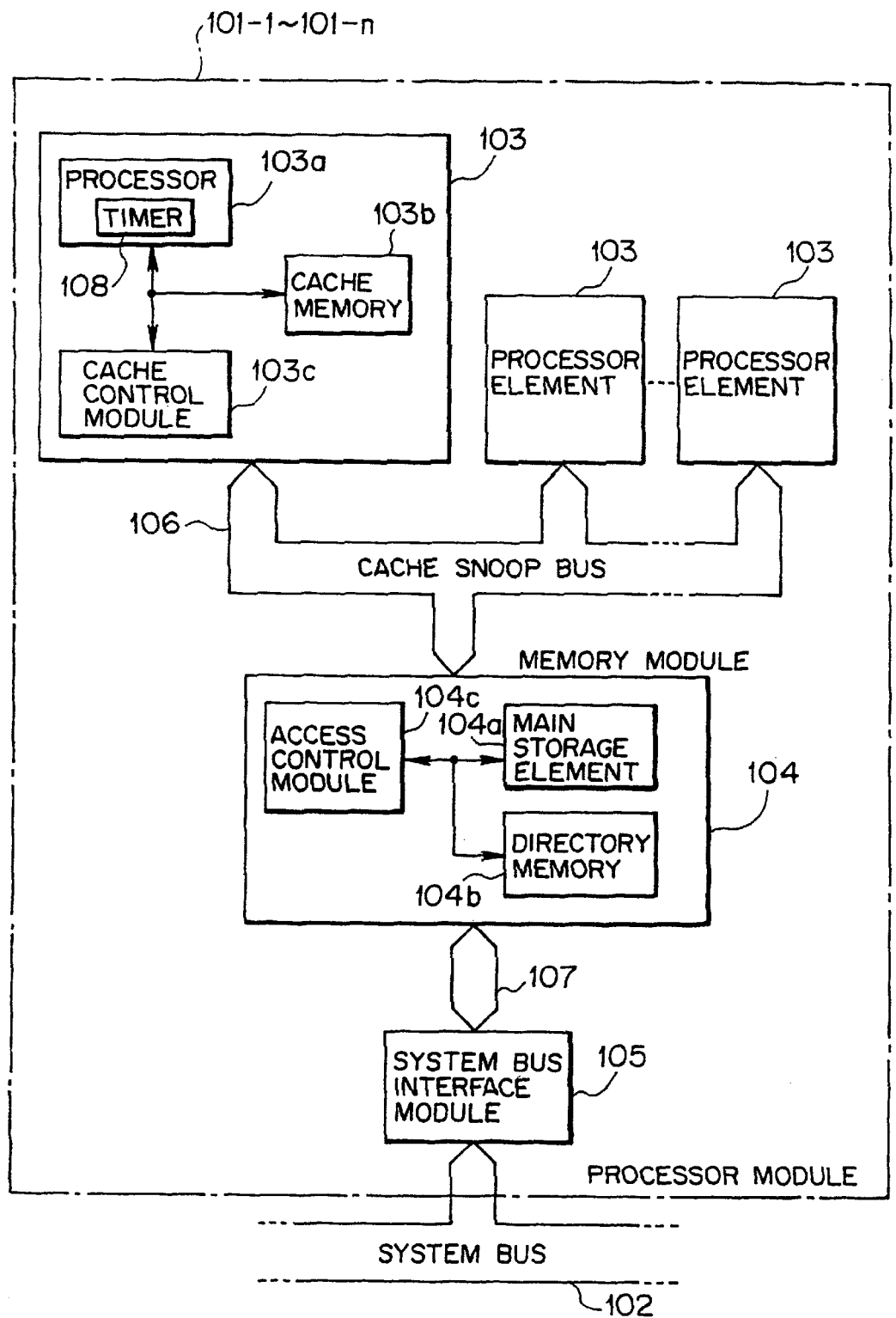
FIG. 21 is a block diagram showing the major section of the multiprocessor shown in FIG. 20.

The bus control unit 67 selects a request among the four bus requests stored in the transmission-side command queues 64-1 to 64-4 using a suitable algorithm while it outputs a bus use right capture request req to the bus arbitrating device (not shown) (refer to the time z1 to z3 in FIG. 19).

When the bus control unit 67 outputs a bus use right capture request and then receives the notification grt of the capture of the bus use right from the bus arbitrating device (not shown) (refer to the time z to the time z3 in FIG. 19), it transmits the command selected via the output selector 68 onto the split bus 62. The bus use right is canceled on completion of the command transmission (refer to the time z4 to the time z6).

When the receiver 63 receives the command packet from the split bus 62, the command decoder 71 checks for the device address forming the command packet and the like.

When it is judged that the device address of the received command packet is the command for the receiver 63 including the command decoder 71 itself and that any one of the reception-side command queues 70-1 to 70-4 is free, the command decoder 71 notifies the bus control unit 72 of the event. The bus control unit 72 stores controllably the receive command to the free command queues 70-1 to 70-4 (refer to the time z4 to the time z16 in FIG. 19).

When judging that the received command is not for the device including the command decoder 71 itself, the command decoder 71 ignores the command. When the received command is for the device including the command decoder 71 itself, the reception-side command queues 70-1 to 70-4 may be occupied. In this case, the command decoder 71 notifies the reception-side transmitter 61 of the event.

The bus control unit 72 requests the receive queue control unit 73 to perform a memory access control to commands stored in the reception-side command queues 70-1 to 70-4.

The receive queue control unit 73 selects a memory access request from the four reception-side command queues 70-1 to 70-4 via the memory selector 74 by using a suitable algorithm and then outputs an actual memory access command to the memory control unit 77.

Furthermore, when it is judged that the memory access corresponding to the selected command can be prepared, the memory control unit 77 notifies the receive queue control unit 73 of the event. The receive queue control unit 73 outputs controllably the command information to the encoder 75 by outputting a select signal to the memory selector 74.

That is, when a new memory access request occurs in response to the command input from the split bus 62, the memory control unit 77 judges that the memory access can be prepared if there is no preceding access or two data buffers 78-1 and 78-2 are released. Then the memory control unit 77 notifies the receive queue control unit 73 of the event.

The receive queue control unit 73 corresponds controllably requests stored in the reception-side command queues 70-1 to 70-4 to free data buffers 78-1 and 78-2. For example, it is assumed that the content of the reception-side command queue 70-1 is combined with the free data buffer 78-1.

When the memory access can be prepared by corresponding the request stored in the reception-side command queues 70-1 to 70-4 to the free data buffers 78-1 and 78-2, the receive queue control unit 73 extracts the address, command ID, or the like of the transmission source from the content of the reception-side command queue 70-1 by outputting a select signal to the memory selector 74, and then outputs it to the encoder 75.

At that time, the receive queue control unit 73 the outputs a command transmission request to the bus control unit 72. Like the bus control unit 67, the bus control unit 72 which has received the command transmission request captures the bus use right (refer to the bus use right capture request req, the bus use right capture notification grt, and the time z5 to the time z7 in FIG. 19).

The encoder 75 creates a data request command packet being a transfer request of the data corresponding to the bus command, based on the address and command ID of the transmission source transmitter 61 from the memory selector 74. The data request command packet dreq is requested to the transmitter 61 via the split bus 62 by using the bus use right captured as described above (refer to the time z7 and the time z8 in FIG. 19).

When the data request command packet dreq is received, the transmitter 61 transmits sequentially the continuous pieces of data d1 to d6 after a predetermined (promised) fixed period of time, based on the bus use right captured in the data request command transfer (refer to the time z9 to the time z15 in FIG. 19).

That is, in the transmitter 61 which has received the data request command from the receiver 63, the decoder 69 checks for the device address, command ID, or the like forming the data request command.

When the received data request command is the data request command for the transmitter 61 itself, the bus control unit 67, the bus control unit 67 selects the data d1 to d6 requested by the data request command from any one of the transmission-side data queues 65-1 to 65-4 via the output selector 68 and then transmits it to the receiver 63 without performing the bus use right capture operation.

The data transmission start timing from the transmitter 61 is set (promised) to a suitable bus cycle between the transmitter 61 and the receiver 63 according to an incremental operation.

In the receiver 63, when a requested data transfer starts, the bus control unit 72 stores sequentially data into the data buffer (in this case, the data buffer 78-1) currently being processed (the time z10 to the time z16 in FIG. 19). Further, when data corresponding to the number of requested words has been completely received, the bus control unit 72 releases the bus use right.

FIG. 19 shows the state of the reception-side command queue 70-1 in the receiver 63 and the state of the reception-side data queue 78-1. That is, as shown in FIG. 19, after the command packet is stored into the reception-side command queue 70-1, the situation becomes a data wait state (refer to the time z4 to z10 in FIG. 19). Then transfer packets are sequentially stored from the beginning of the data packet reception (refer to the time z10 to the time z16 in FIG. 19). Thereafter, the memory access process requested at the time all the packets have been received is started.

Thereafter, when a series of data transfers have completed, the bus control unit 72 notifies the receive queue control unit 73 of the event. The receive queue control unit 73 which has received the event judges that data corresponding to the command in the reception-side command queue 70-1 has been prepared in the data buffer 78-1.

In that case, if there is no preceding memory access, an actual memory access starts by controlling the memory control unit 77. If there is a preceding memory access, an actual memory access starts after completion of the memory access.

As described above, in the data transfer system according to the fourth embodiment of the present invention, the bus control unit 67 selects data stored in the transmission-side data queues 65-1 to 65-4 based on the commands transmitted from the encoder 75 and then controls the output selector 68 to be transmitted to the receiver 63. Hence, the buffer capacity for the data reception can be reduced without sacrificing the data transfer performance of the split bus 62, whereby the hardware cost of the data transfer system can be reduced. Particularly, in an increased level of multiplexing of the split bus 62 or a widened bus band, the reduced number of buffers contributes to reducing the hardware cost of the whole system.

In the above-mentioned embodiment, the split bus 62 in four multiplex mode has been described in detail. However, the present invention should not be limited only to the above-described embodiments. The system can be made in different multiplex modes.

What is claimed is:

1. A multiprocessor comprising:
   a plurality of processor groups mutually connected via a first bus, each including at least one processor;
   a main storage memory for storing various kinds of data, said main storage memory being shared by each of processors forming each of said plurality of processor groups connected via a second bus;

a cache memory arranged to each of said processors, for storing various kinds of data in said main storage memory in cache lines;

a cache control unit for controlling a data read/write operation between each of said processors and said cache memory in a copy-back mode;

a directory memory for storing the registration status of data stored in said main storage memory to said cache memory; and a directory control unit for storing the registration status of said cache memory into said directory memory in cache lines formed with a plurality of sublines when the value stored in said cache memory and the value stored in said main storage memory are in the same shared state and for updating no value stored in said main storage memory when said processor rewrites the value stored in said cache memory and for controlling to store the status of said cache memory and a destination holding a latest value into said directory memory in sublines in the case of a dirty status where the value stored in said cache memory is the latest value and the value stored in said main storage memory is an old value;

said processor including an elapsed time counting unit for counting an elapsed time between the time an access signal is transmitted to said main storage memory and the time a response signal is received, and for outputting a time-out signal when a response signal is not received after said counted elapsed time has exceeded a predetermined time-out time;

said directory control unit including a cache-access-issuance information returning unit for returning to a processor as an access source in the event that access to said cache memory has occurred in said main storage memory to be accessed;

said processor as an access source including a time-out time resetting unit for resetting said time-out time predetermined in said elapsed time counting unit in response to notification from said cache-access-issuance information returning unit;

said elapsed time counting unit recounting an elapsed time based on the time-out time reset in said time-out time resetting unit.

2. The multiprocessor according to claim 1, wherein said cache-access-issuance information returning unit returns a dedicated command regarding access occurrence to said cache memory, to said processor at said access source.

3. The multiprocessor according to claim 1, wherein said cache-access-issuance information returning unit adds identification information regarding said processor at said access source to an access command to said cache memory, and then transmits said access command to both said cache memory and said processor at said access source, and returns the event that access has occurred to said cache memory, to said processor at said access source.

4. A memory accessing method for a multiprocessor, said multiprocessor including a main storage memory, a plurality of processors for sharing said main storage memory, a cache memory for storing various kinds of data stored in said main storage memory within each of said plurality of processors in cache lines and a directory memory for storing the registration status of data stored in said main storage memory to said cache memory, comprising the steps of:

counting an elapsed time between the time an access signal is transmitted to said main storage memory and the time a response signal is received, and outputting a time-out signal when a response signal is not received after said counted elapsed time has exceeded a predetermined time, by means of said processor;

notifying a processor as an access source of the event that access to said cache memory has occurred in said main storage memory accessed; and changing an elapsed time to output said time-out signal into a response wait timer value having a sufficient time for access to said cache memory when said processor at said access source receives a notification of the event that access to said cache memory has occurred, to perform a recounting operation.

* * * * *